US008038533B2

(12) United States Patent
Tsuchiyama et al.

(10) Patent No.: US 8,038,533 B2
(45) Date of Patent: Oct. 18, 2011

(54) GAME SYSTEM USING PARENT GAME MACHINE AND CHILD GAME MACHINE

(75) Inventors: Yoshinori Tsuchiyama, Kyoto (JP); Akira Tahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1350 days.

(21) Appl. No.: 10/834,072

(22) Filed: Apr. 29, 2004

(65) Prior Publication Data
US 2005/0026695 A1 Feb. 3, 2005

(30) Foreign Application Priority Data

May 9, 2003 (JP) ................................ 2003-132261
May 9, 2003 (JP) ................................ 2003-132393
May 9, 2003 (JP) ................................ 2003-132394

(51) Int. Cl.
*A63F 9/00* (2006.01)
(52) U.S. Cl. ........................................................ 463/42
(58) Field of Classification Search .................. 463/42
See application file for complete search history.

(56) References Cited

U.S. PATENT DOCUMENTS

| | | | | | |
|---|---|---|---|---|---|
| 3,809,395 | A | * | 5/1974 | Allison et al. | 463/2 |
| 4,296,930 | A | * | 10/1981 | Frederiksen | 463/31 |
| 5,221,083 | A | * | 6/1993 | Dote | 463/32 |
| 5,558,577 | A | * | 9/1996 | Kato | 463/36 |
| 6,132,315 | A | * | 10/2000 | Miyamoto et al. | 463/43 |
| 6,139,434 | A | * | 10/2000 | Miyamoto et al. | 463/32 |
| 6,540,614 | B1 | * | 4/2003 | Nishino et al. | 463/40 |
| 6,599,196 | B2 | * | 7/2003 | Kikukawa et al. | 463/43 |
| 6,921,336 | B1 | * | 7/2005 | Best | 463/32 |
| 7,024,501 | B1 | * | 4/2006 | Wright | 710/72 |
| 7,193,165 | B2 | * | 3/2007 | Kawanobe et al. | 200/5 R |
| 2002/0010026 | A1 | * | 1/2002 | York | 463/47 |
| 2002/0055384 | A1 | * | 5/2002 | Armstrong | 463/37 |
| 2002/0072410 | A1 | * | 6/2002 | Tanaka et al. | 463/37 |
| 2003/0092493 | A1 | * | 5/2003 | Shimizu et al. | 463/43 |
| 2003/0100375 | A1 | * | 5/2003 | Wakae et al. | 463/43 |
| 2003/0220142 | A1 | * | 11/2003 | Siegel | 463/37 |
| 2004/0023719 | A1 | * | 2/2004 | Hussaini et al. | 463/37 |
| 2004/0063482 | A1 | * | 4/2004 | Toyoda | 463/11 |
| 2004/0092309 | A1 | * | 5/2004 | Suzuki | 463/32 |
| 2004/0162139 | A1 | * | 8/2004 | Blanco | 463/35 |
| 2004/0229695 | A1 | * | 11/2004 | Hussaini et al. | 463/38 |

(Continued)

FOREIGN PATENT DOCUMENTS

JP 2000-061141 2/2000

(Continued)

*Primary Examiner* — Melba Bumgarner
*Assistant Examiner* — Seng H Lim
(74) *Attorney, Agent, or Firm* — Nixon & Vanderhye P.C.

(57) ABSTRACT

A game system includes a parent game device and a plurality of child game devices connected thereto. The parent game device displays a common screen on a CRT, and each of the plurality of child game devices displays an individual screen on an LCD provided for each child device. The parent game device detects a degree of progress of a game of each child game device, selects for each child game device predetermined display information data out of a plurality of display information data on the basis of the detected degree of progress of the game, and creates different parent game device data for each child device on the basis of the display information data. Each child game device generates image data for displaying the individual screen on the LCD on the basis of the parent game device data received from the parent game device.

13 Claims, 47 Drawing Sheets

U.S. PATENT DOCUMENTS

| | | | |
|---|---|---|---|
| 2004/0235566 A1* | 11/2004 | Hussaini et al. | 463/37 |
| 2005/0113158 A1* | 5/2005 | Sterchi et al. | 463/3 |
| 2005/0119053 A1* | 6/2005 | Suzuki et al. | 463/42 |
| 2005/0153761 A1* | 7/2005 | Sterchi et al. | 463/3 |
| 2005/0153762 A1* | 7/2005 | Sterchi et al. | 463/3 |
| 2005/0153763 A1* | 7/2005 | Sterchi et al. | 463/3 |
| 2005/0153764 A1* | 7/2005 | Sterchi et al. | 463/3 |
| 2005/0272497 A1* | 12/2005 | Sterchi et al. | 463/3 |
| 2006/0079326 A1* | 4/2006 | Love | 463/31 |
| 2006/0205459 A1* | 9/2006 | Rehkemper et al. | 463/1 |
| 2006/0246969 A1* | 11/2006 | Penello et al. | 463/1 |
| 2006/0258464 A1* | 11/2006 | Kawanobe et al. | 463/46 |
| 2007/0015577 A1* | 1/2007 | Hsu | 463/37 |
| 2007/0093293 A1* | 4/2007 | Osnato | 463/36 |

FOREIGN PATENT DOCUMENTS

| | | |
|---|---|---|
| JP | 2000-167250 | 6/2000 |
| JP | 2000-334170 | 12/2000 |
| JP | 2001-137536 | 5/2001 |

* cited by examiner

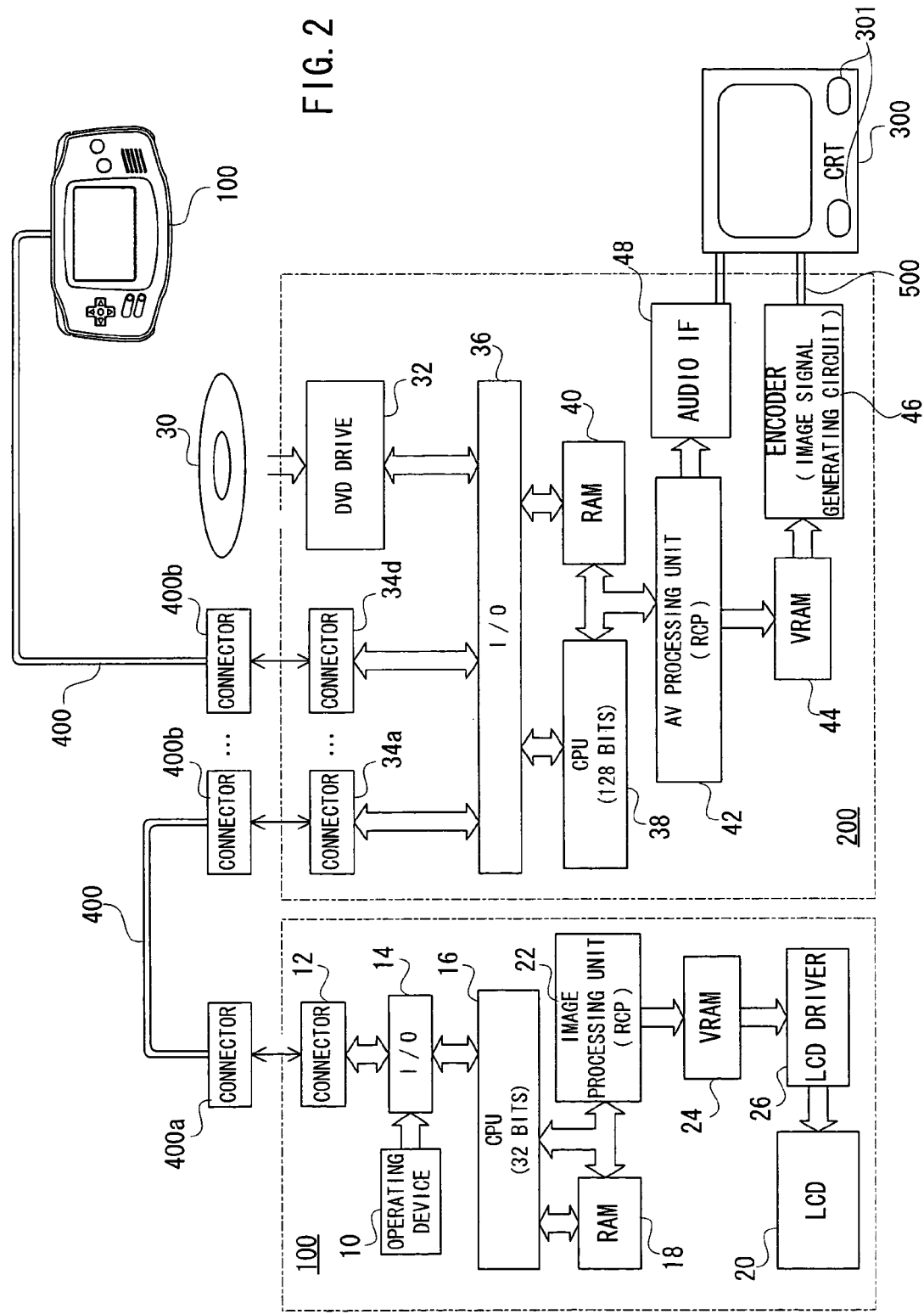

FIG. 3

GAME PROGRAM FOR VIDEO GAME APPARATUS (PARENT DEVICE) — 30c

- GAME ENVIRONMENT CONSTRUCTION PROGRAM
  - CONTROLLER PORT CONFIRMING PROGRAM
  - EYES CHANGING PROGRAM
- GAME PLAYING PROGRAM
  - DATA CREATING PROGRAM
  - DATA TRANSMITTING PROGRAM
  - CONTROLLER DATA RECEIVING PROGRAM
  - FACILITATOR OBJECT OPERATING PROGRAM
  - PLAYER OBJECT OPERATING PROGRAM
  - PLAYER OBJECT STATE DETECTING PROGRAM
  - RANKING DETECTING PROGRAM
  - DISPLAYING INFORMATION DATA SELECTING PROGRAM
  - PLAYER OBJECT DESIGNATING PROGRAM
  - SOUND DATA SELECTING PROGRAM
  - ITEM DATA SELECTING PROGRAM
  - ITEM ARRANGING POSITION SPECIFYING PROGRAM
  - ITEM ARRANGING PROGRAM
  - ENDING PROCESSING PROGRAM
  - OTHER PROGRAMS
- IMAGE DISPLAYING PROGRAM
- SOUND OUTPUT PROGRAM

GAME DATA FOR VIDEO GAME APPARATUS (PARENT DEVICE) — 30a

- IMAGE DATA
  (PLAYER OBJECT, FACILITATOR OBJECT, ITEM DATA, TREASURE BOX, BACKGROUND OBJECT, AND ETC.)
- SOUND DATA
  (FACILITATOR SOUND, SOUND EFFECT, BGM, AND ETC.)

GAME PROGRAM FOR MOBILE GAME APPARATUS (CHILD DEVICE) — 30d

- GAME PLAYING PROGRAM
  - DATA RECEIVING PROGRAM
  - CONTROLLER DATA CREATING PROGRAM
  - CONTROLLER DATA TRANSMITTING PROGRAM
  - PLAYER OBJECT OPERATING PROGRAM
  - ITEM DISPLAYING PROCESS PROGRAM
  - OTHER PROGRAMS
- IMAGE DISPLAYING PROGRAM
- SOUND OUTPUT PROGRAM

GAME DATA FOR MOBILE GAME APPARATUS (CHILD GAME DEVICE) — 30d

- IMAGE DATA
  (PLAYER OBJECT, FACILITATOR OBJECT, ITEM DATA, TREASURE BOX, DISPLAYED INFORMATION DATA, BACKGROUND OBJECT, AND ETC.)
- SOUND DATA (SOUND EFFECT, BGM, AND ETC.)

FIG. 9

FACILITATOR OBJECT ANGLE TABLE

| CONDITION | ANGLE P1 | ANGLE P2 | ANGLE P3 | ANGLE P4 |
|---|---|---|---|---|
| ONE CHILD DEVICE IS CONNECTED | 0 dig. | — | — | — |
| TWO CHILD DEVICES ARE CONNECTED | −45 dig. | +45 dig. | — | — |
| THREE CHILD DEVICES ARE CONNECTED | −50 dig. | 0 dig. | +50 dig. | — |
| FOUR CHILD DEVICES ARE CONNECTED | −60 dig. | −20 dig | +20 dig | +60 dig. |

FIG. 13
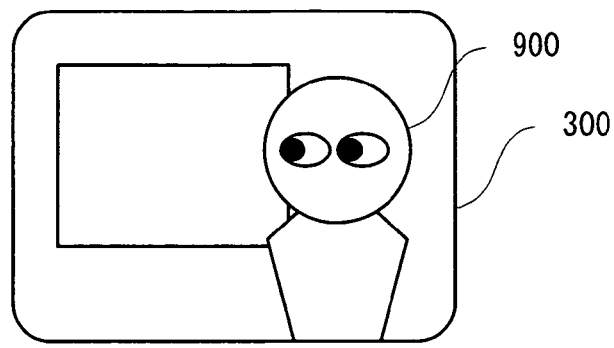
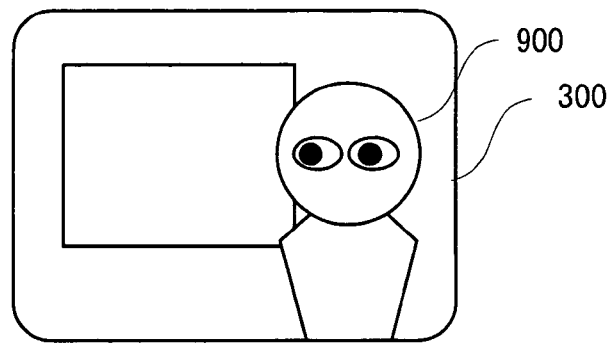
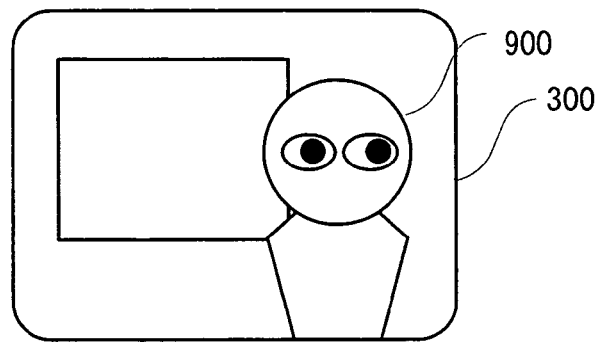
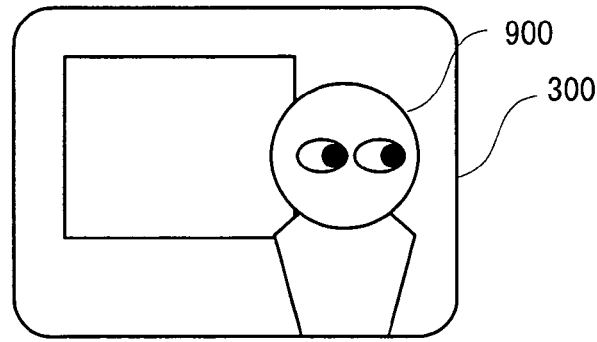

FIG. 25
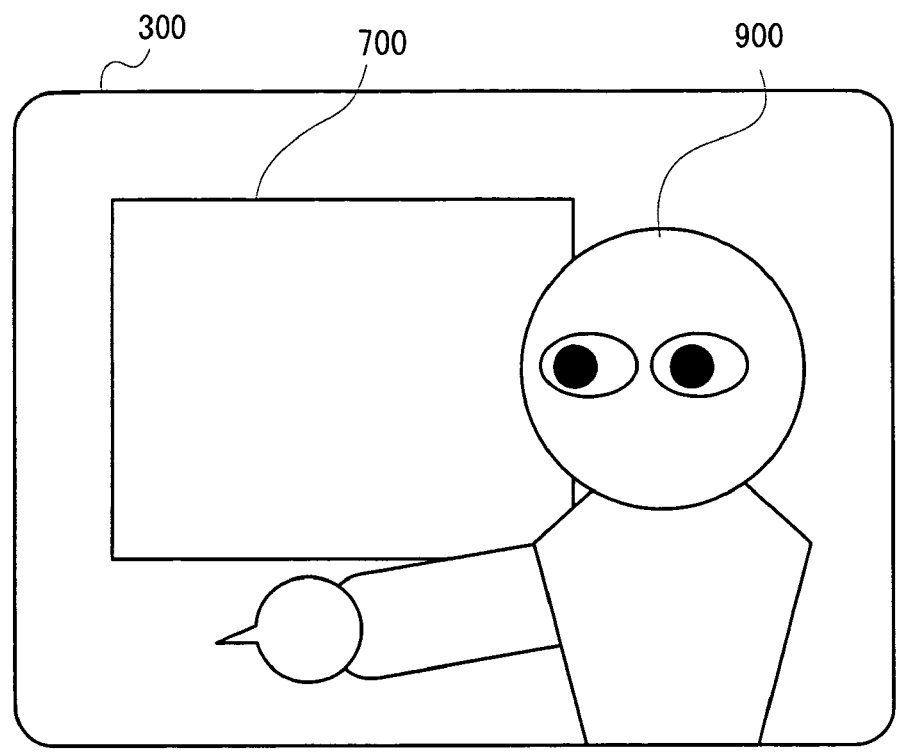
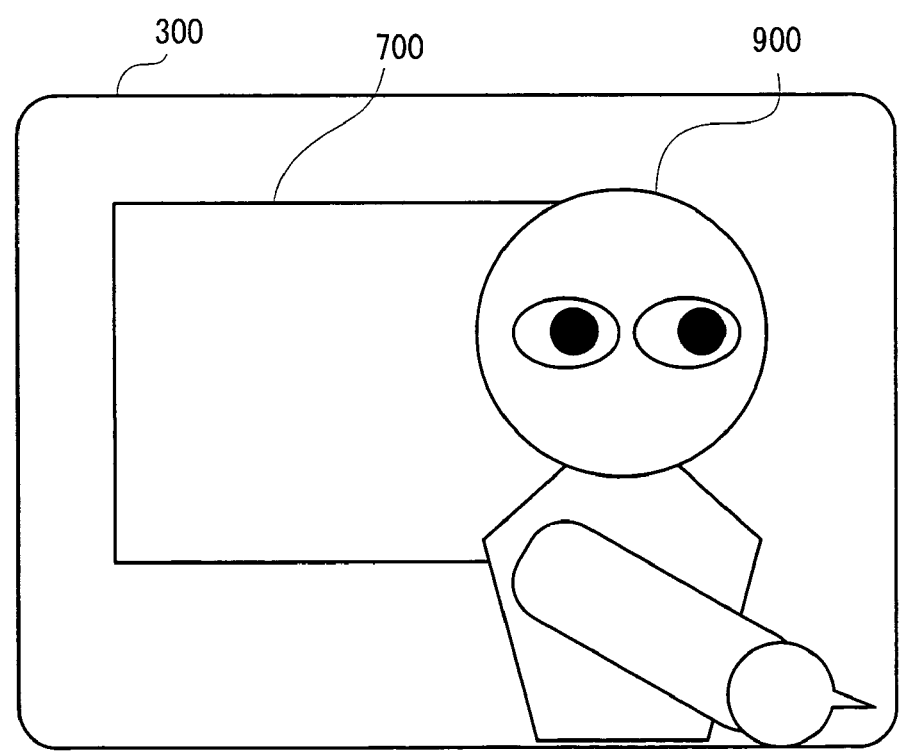

FIG. 27
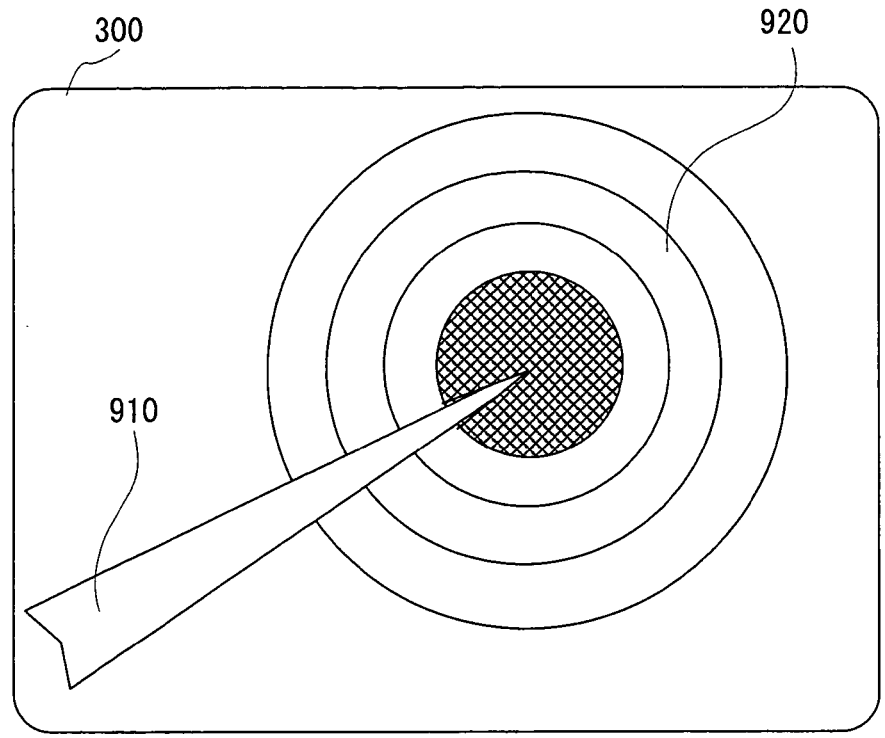
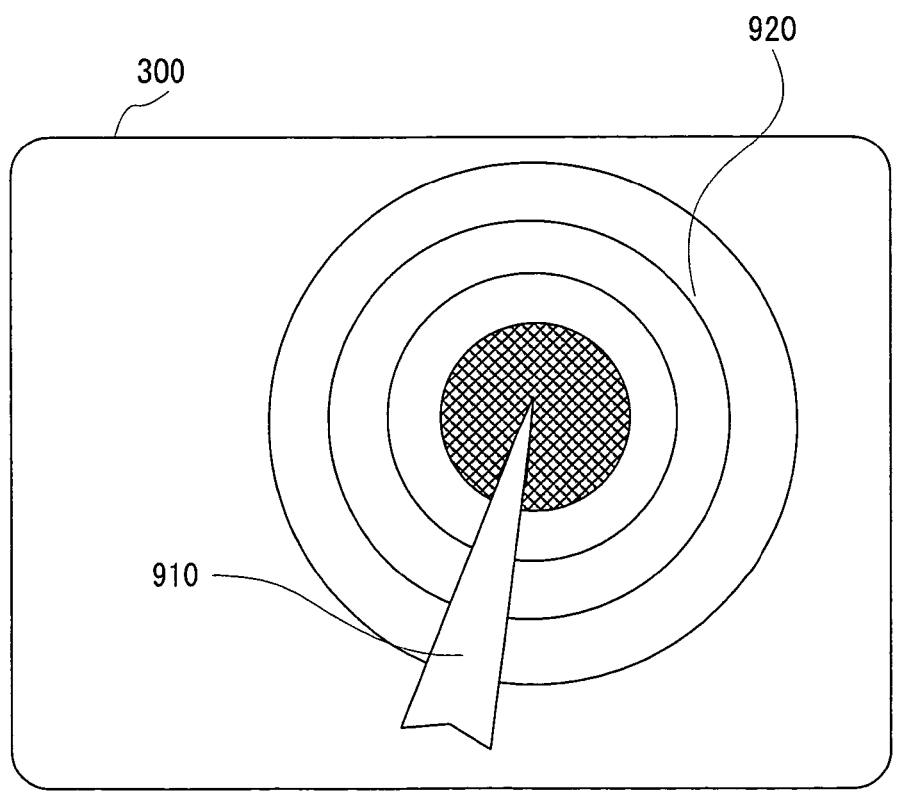

FIG. 28
DATA FROM CHILD DEVICE TO PARENT DEVICE
AT A TIME OF NAME INPUT
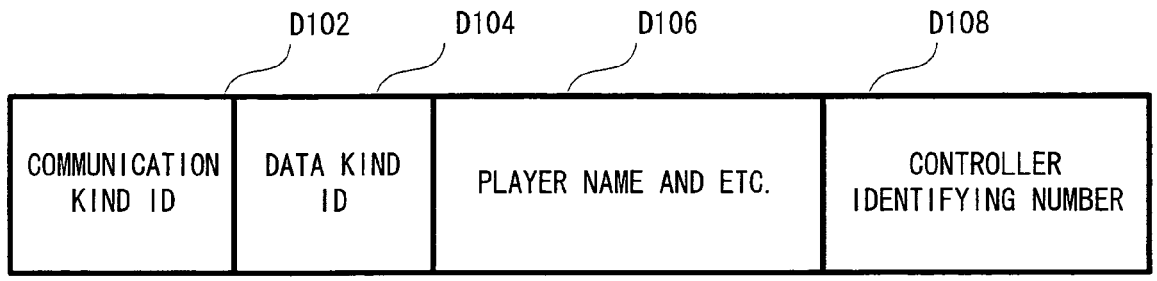
AT A TIME OF PLAYING GAME
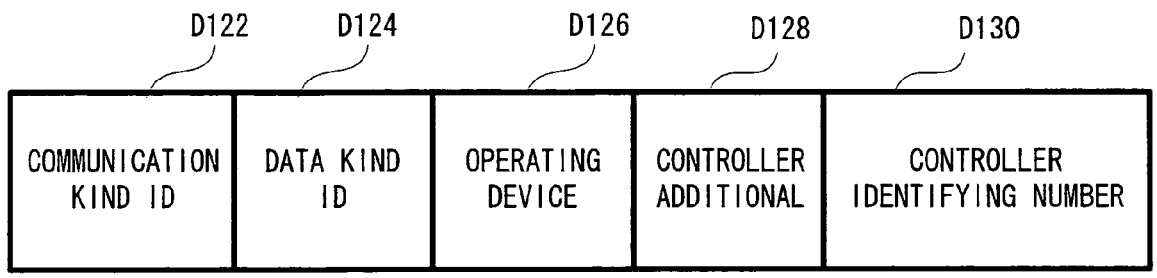
DATA FROM PARENT DEVICE TO CHILD DEVICE
AT A TIME OF TRANSMITTING INITIAL INFORMATION
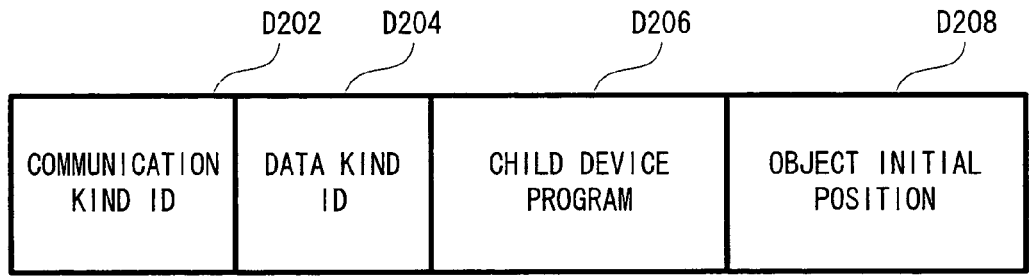
AT A TIME OF PLAYING GAME
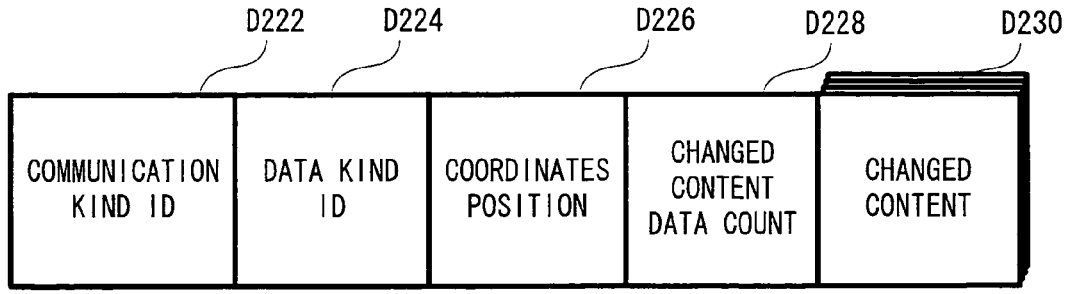

FIG. 37
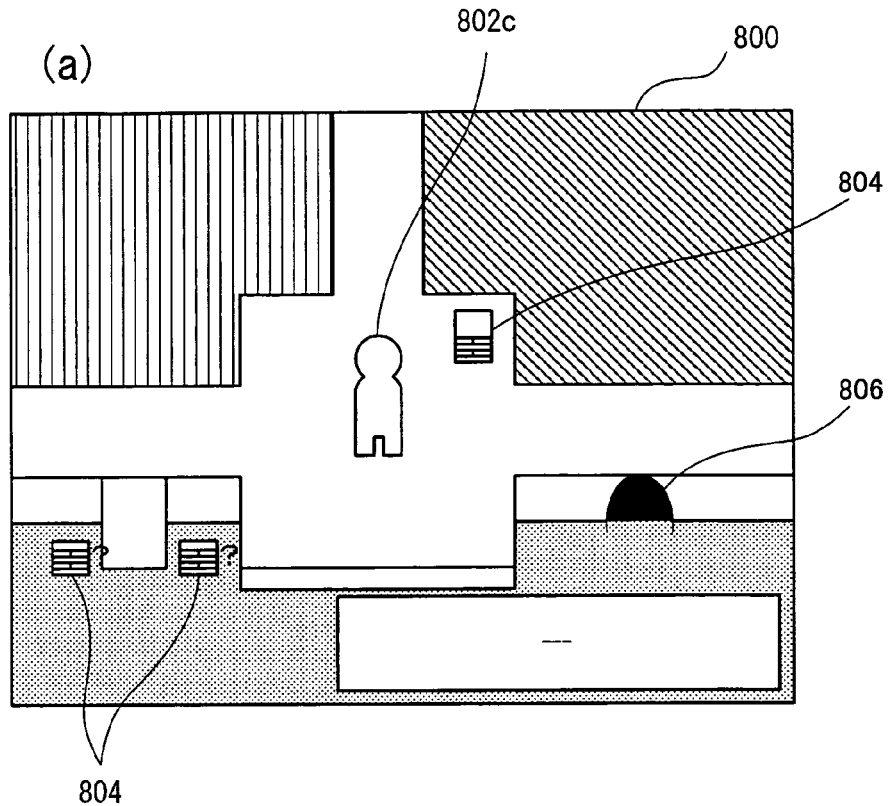
(a)
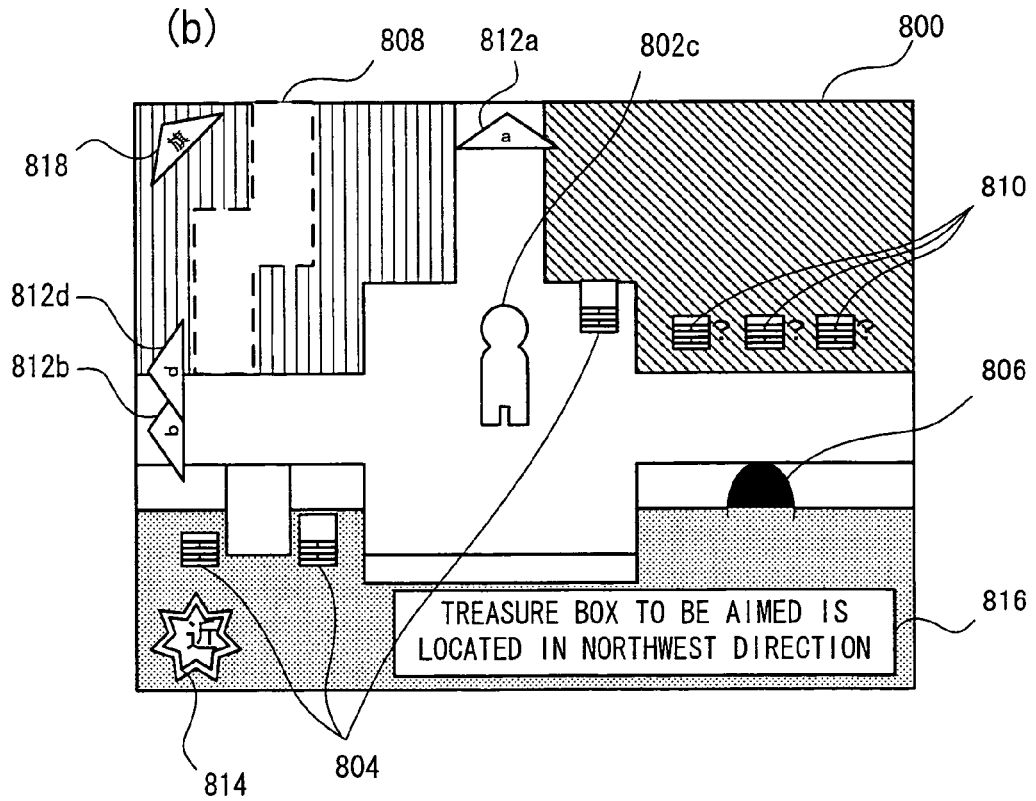
(b)
TREASURE BOX TO BE AIMED IS LOCATED IN NORTHWEST DIRECTION

FIG. 38  INDIVIDUAL SCREEN DISPLAYING TABLE (a)

| DISPLAY LEVEL | DISPLAY CONDITION | RANKING OF APPLIED PLAYER | STANDARD DISPLAY | DISPLAY 1 | DISPLAY 2 | DISPLAY 3 | DISPLAY 4 | DISPLAY 5 | DISPLAY 6 |
|---|---|---|---|---|---|---|---|---|---|
| 1 | NO EVENT | ALL | ○ | × | × | × | × | × | × |
| 2 | EVENT 4 | FIRST RANKING | ○ | ○ | × | × | × | × | × |
| 3 | EVENT 4 | SECOND RANKING | ○ | ○ | ○ | ○ | × | × | × |
| 4 | EVENT 4 | THIRD RANKING | ○ | ○ | ○ | ○ | ○ | × | × |
| 5 | EVENT 4 | LAST IN RANKING | ○ | ○ | ○ | ○ | ○ | ○ | × |
| 6 | EVENT 2 | LAST IN RANKING | ○ | ○ | ○ | ○ | ○ | ○ | ○ |

(b)

| STANDARD DISPLAY | STANDARD SCREEN DISPLAY |
|---|---|
| DISPLAY 1 | DISPLAY GLASS PASSAGE ON WATER |
| DISPLAY 2 | DISPLAY HIDDEN TREASURE BOX ON DIFFERENT FLOOR |
| DISPLAY 3 | DISPLAY DIRECTION OF COMPETITOR |
| DISPLAY 4 | DISPLAY CLOSENESS OF FLAG |
| DISPLAY 5 | INSTRUCT DIRECTION OF TREASURE BOX |
| DISPLAY 6 | DISPLAY DIRECTION OF AIMED FLAG |

FIG. 40  EVENT TABLE 0 (Event-Table) ...NORMAL PROCESS/NORMALLY GENERATING EVENT

| EVENT 0 | | MOVEMENT CORRESPONDING TO EVENT |
|---|---|---|
| STATUS CHANGING PROCESS | | · CONTROLLER INPUT INFORMATION OF EACH PLAYER<br>· COORDINATES POSITION OF PLAYER OBJECT (S2100) |
| PARENT DEVICE SOUND PROCESS | FACILITATOR SOUND CHANGING PROCESS | NONE |
| | SOUND EFFECT GENERATING PROCESS | NONE |
| | BGM CHANGING PROCESS | NONE |
| PARENT DEVICE SCREEN PROCESS | FACILITATOR OPERATION PROCESS | LOOK AT THE FRONT (0°)<br>(WHEN FACILITATOR MOVEMENT BUFFER IS AVAILABLE) (S2102) |
| | OTHER SCREENS PROCESS (EXCEPT FOR FACILITATOR) | DISPLAY DISPLAYED POSITIONS OF ALL PLAYER OBJECTS IN ENTIRE MAP ON THE BASIS OF RESPECTIVE COORDINATES POSITIONS (S2104) |
| CHILD DEVICE SCREEN CHANGING PROCESS | | SCREEN WITH DISPLAYED RANGE RENDERING COORDINATES POSITION OF EACH PLAYER OBJECT CENTER (S2106) |

FIG. 41

| EVENT GENERATING CONDITION | OBJECT OF CHECK | EVENT GENERATED |
|---|---|---|
| ①WHEN FIRST FLAG IS OBTAINED | MAIN PROGRAM | EVENT 1 |
| ①WHEN RANKING POINT BETWEEN PLAYER IN FIRST RANKING AND LAST PLAYER IN RANKING IS EQUAL TO OR MORE THAN 100 POINTS<br>②WHEN THE CONDITION DOES NOT OCCUR | MAIN PROGRAM | EVENT 2 |
| ①BONUS TIME OCCURS | MAIN PROGRAM | EVENT 3 |
| ①SPECIAL EVENT TIME OCCURS | MAIN PROGRAM | EVENT 4 |
| ①WHEN LAST FLAG IS OBTAINED | MAIN PROGRAM | EVENT 5 |
| ①WHEN TRANSCEIVER IS UTILIZED | INPUT FROM CHILD DEVICE | EVENT 6 |
| ... | ... | ... |

208a, 208b, 208c, 208d, 208e, 208f

DISPLAY MESSAGE WHEN FIRST CHECK POINT (FLAG) IS OBTAINED (FACILITATE COVERED LIVE

FIG. 43    EVENT TABLE 1 (Event-Table) ···OBTENTION OF FIRST FLAG

| EVENT 1 | | MOVEMENT CORRESPONDING TO EVENT |
|---|---|---|
| STATUS CHANGING PROCESS | | · CHANGE POSSESSOR OF FIRST FLAG TO PLAYER WHO OBTAINS FLAG<br>· 10 POINTS ARE ADDED TO PLAYER WHO OBTAINS FLAG — S3112 |
| PARENT DEVICE SOUND PROCESS | FACILITATOR SOUND CHANGING PROCESS | MESSAGE 1 IS SET TO FACILITATOR SOUND BUFFER<br>MESSAGE 1="CONGRATULATION. A. YOU GET FIRST FLAG" — S3114 |
| | SOUND EFFECT GENERATING PROCESS | SOUND EFFECT 1 IS SET TO SOUND EFFECT BUFFER<br>SOUND EFFECT 1=[FLAG OBTAINING FANFARE] — S3116 |
| | BGM CHANGING PROCESS | NONE |
| PARENT DEVICE SCREEN PROCESS | FACILITATOR OPERATION PROCESS | SET FACILITATOR MOVEMENT PATTERN 1 IN FACILITATOR MOVEMENT BUFFER<br>FACILITATOR MOVEMENT PATTERN 1<br>=LOOK AT PLAYER WHO OBTAINS FLAG AND SMILE FOR ONE SECONDS — S3118 |
| | OTHER SCREEN PROCESS (EXCEPT FOR FACILITATOR) | LIGHT COLOR OF FIRST FLAG ON AND OFF AND THEN CHANGE IT TO COLOR INDICATING PLAYER WHO OBTAINS FLAG — S3120 |
| CHILD DEVICE SCREEN CHANGING PROCESS | | ①SET FLAG INDICATIVE OF DISPLAYING EFFECT 1 SCREEN ON CHILD DEVICE SCREEN (OF ONLY PLAYER WHO OBTAINS FLAG)<br>EFFECT 1=DISPLAY MESSAGE OF "CONGRATULATION!" FOR FIVE SECONDS<br>②UPDATE THE NUMBER OF OBTAINED FLAGS ON CHILD DEVICE SCREEN (ALL PLAYERS)<br>③UPDATE COLOR OF FLAG ON CHILD DEVICE SCREEN — S3122 |

FIG. 45  EVENT TABLE 2 (Event-Table) ···SUPPORT NAVIGATION OF LAST PLAYER IN RANKING

| EVENT 2 | | MOVEMENT CORRESPONDING TO EVENT | |
|---|---|---|---|
| STATUS CHANGING PROCESS | | SET CORRELATIVE VALUE | S3212 |
| PARENT DEVICE SOUND PROCESS | FACILITATOR SOUND CHANGING PROCESS | SET MESSAGE 2 IN FACILITATOR SOUND BUFFER<br>MESSAGE 2=" A. ADVANCE TO NORTHWEST DIRECTION" | S3214 |
| | SOUND EFFECT GENERATING PROCESS | NONE | S3216 |
| | BGM CHANGING PROCESS | SET BGM 2 IN BGM OUTPUT BUFFER<br>BGM 2 = URGING FANFARE | S3218 |
| PARENT DEVICE SCREEN PROCESS | FACILITATOR OPERATION PROCESS | SET FACILITATOR MOVEMENT PATTERN 2 IN FACILITATOR MOVEMENT BUFFER<br>FACILITATOR MOVEMENT PATTERN 2<br>= LOOK AT LAST PLAYER IN RANKING WITH WORRIED FACE | S3220 |
| | OTHER SCREEN PROCESS (EXCEPT FOR FACILITATOR) | TURN COLOR OF FRAME OF SCREEN TO RED.<br>RESTORE TO NORMAL COLOR AFTER COMPLETION OF EVENT | S3222 |
| CHILD DEVICE SCREEN CHANGING PROCESS | | SET INDIVIDUAL SCREEN DISPLAY OF PLAYER 600A TO DISPLAY LEVEL 6<br>SET INDIVIDUAL SCREEN DISPLAY INFORMATION ON THE BASIS OF DISPLAY LEVEL 6 | |

FIG. 47    EVENT TABLE 3 (Event-Table) ···SET ITEM DEPENDING ON RANKING

| EVENT 3 | | MOVEMENT CORRESPONDING TO EVENT | |
|---|---|---|---|
| STATUS CHANGING PROCESS | | · SET ITEMS IN TREASURE BOX NEAREST TO PLAYER IN THIRD RANKING | S3312 |
| PARENT DEVICE SOUND PROCESS | FACILITATOR SOUND CHANGING PROCESS | SET MESSAGE 3 IN FACILITATOR SOUND BUFFER MESSAGE 3="ADD ITEM IN TREASURE BOX" | S3314 |
| | SOUND EFFECT GENERATING PROCESS | SET SOUND EFFECT 3 TO SOUND EFFECT BUFFER SOUND EFFECT 3=ITEM ADDITION ALARM | S3316 |
| | BGM CHANGING PROCESS | NONE | |
| PARENT DEVICE SCREEN PROCESS | FACILITATOR OPERATION PROCESS | SET FACILITATOR MOVEMENT PATTERN 3 IN FACILITATOR MOVEMENT BUFFER FACILITATOR MOVEMENT PATTERN 3=INSTANTLY LOOK AT PLAYER IN THIRD RANKING AND THEN LOOK AT FIXED POSITION | S3318 |
| | OTHER SCREEN PROCESS (EXCEPT FOR FACILITATOR) | NONE | |
| CHILD DEVICE SCREEN CHANGING PROCESS | | CHANGE TREASURE BOX IN WHICH ITEMS ARE SET SO AS TO BE COVERED WITH LID | S3320 |

FIG. 49  EVENT TABLE 4 (Event-Table) ···CHANGE SCREEN OF EACH PLAYER DEPENDING ON RANKING

| EVENT 4 | | MOVEMENT CORRESPONDING TO EVENT | |
|---|---|---|---|
| STATUS CHANGING PROCESS | | NONE | |
| PARENT DEVICE SOUND PROCESS | FACILITATOR SOUND CHANGING PROCESS | SET MESSAGE 4 IN FACILITATOR SOUND BUFFER<br>MESSAGE 4=" LUCKY TIME FOR PROVIDING INFORMATION TO PLAYER IN LOWER RANKING" | S3422 |
| | SOUND EFFECT GENERATING PROCESS | NONE | |
| | BGM CHANGING PROCESS | NONE | |
| PARENT DEVICE SCREEN PROCESS | FACILITATOR OPERATION PROCESS | SET FACILITATOR MOVEMENT PATTERN 4 IN FACILITATOR MOVEMENT BUFFER<br>FACILITATOR MOVEMENT PATTERN 4<br>=LOOK OVER ALL PLAYER AND THEN LOOK AT A FIXED POINT | S3424 |
| | OTHER SCREEN PROCES (EXCEPT FOR FACILITATOR) | NONE | |
| CHILD DEVICE SCREEN CHANGING PROCESS | | SET INDIVIDUAL SCREEN DISPLAY INFORMATION OF EACH PLAYER ON THE BASIS OF SET DISPLAY LEVEL | S3426 |

FIG. 51

EVENT TABLE 5 (Event-Table)
...GAME END PROCESSING CAUSED BY OBTAINING LAST FLAG

| EVENT 5 | | MOVEMENT CORRESPONDING TO EVENT |
|---|---|---|
| STATUS CHANGING PROCESS | | · CHANGE POSSESSOR OF NINTH FLAG TO "PLAYER WHO OBTAINS FLAG"<br>· ADD 120 POINTS TO "PLAYER WHO OBTAINS FLAG" (S3502) |
| PARENT DEVICE SOUND PROCESS | FACILITATOR SOUND CHANGING PROCESS | SET MESSAGE 5 IN FACILITATOR SOUND BUFFER MESSAGE 5 =" THANK YOU FOR YOUR WORK. GAME OVER" (S3504) |
| | SOUND EFFECT GENERATING PROCESS | SET SOUND EFFECT 5 TO SOUND EFFECT BUFFER SOUND EFFECT 5=" ENDING FANFARE" (S3506) |
| | BGM CHANGING PROCESS | SET BGM 5 TO BGM OUTPUT BUFFER BGM 5=" ENDING THEME" (S3508) |
| PARENT DEVICE SCREEN PROCESS | FACILITATOR OPERATION PROCESS | SET FACILITATOR MOVEMENT PATTERN 5 IN FACILITATOR MOVEMENT BUFFER FACILITATOR MOVEMENT PATTERN 5 =FACILITATOR FACES FRONT AND TAKES BOW (S3510) |
| | OTHER SCREEN PROCESS (EXCEPT FOR FACILITATOR) | PERFORM BLACKOUT OF MAP SCREEN (S3512) |
| CHILD DEVICE SCREEN CHANGING PROCESS | | SET INDIVIDUAL SCREEN DISPLAY OF ALL PLAYERS TO ENDING STATE (S3514) |

FIG. 53 EVENT TABLE 6 (Event-Table) ···ITEM OF TRANSCEIVER IS UTILIZED

| EVENT 6 | | MOVEMENT CORRESPONDING TO EVENT |
|---|---|---|
| STATUS CHANGING PROCESS | | NONE |
| PARENT DEVICE SOUND PROCESS | FACILITATOR SOUND CHANGING PROCESS | SET MESSAGE 6 IN FACILITATOR SOUND BUFFER MESSAGE 6 = " FLAG TO BE OBTAINED NEXT IS ON YOUR RIGHT" — S3612 |
| | SOUND EFFECT GENERATING PROCESS | SET SOUND EFFECT 6 TO SOUND EFFECT BUFFER SOUND EFFECT 6=" MYSTERIOUS FANFARE" — S3614 |
| | BGM CHANGING PROCESS | NONE |
| PARENT DEVICE SCREEN PROCESS | FACILITATOR OPERATION PROCESS | SET FACILITATOR MOVEMENT PATTERN 6 IN FACILITATOR MOVEMENT BUFFER FACILITATOR MOVEMENT PATTERN 6 =TURN ON PLAYER UTILIZING THE TRANSCEIVER — S3616 |
| | OTHER SCREEN PROCESS (EXCEPT FOR FACILITATOR) | NONE |
| CHILD DEVICE SCREEN CHANGING PROCESS | | DISPLAY MESSAGE OF "LISTEN TO HINT" WITH RESPECT TO PLAYER UTILIZING ITEM — S3618 | ately
GAME SYSTEM USING PARENT GAME MACHINE AND CHILD GAME MACHINE

FIELD OF THE INVENTION

The technology herein relates to a game system. More specifically, the technology herein relates to a game system for operating on each child device a plurality of player objects appearing in a single virtual space by use of a plurality of child game devices connected to a parent game device.

BACKGROUND AND SUMMARY OF THE INVENTION

A game apparatus capable of individually controlling four racing cars is disclosed in a Japanese Patent Laying-open No. 2000-6114, laid-open on Feb. 29, 2000. In the game apparatus of this first example of prior art, in a racing game where a plurality of racing cars run a predetermined course to compete for a ranking. The time differences between the plurality of racing cars passing through an arbitrarily-located check point is calculated. When the time difference between the plurality of racing cars at the check point becomes more than a predetermined time period, the engine output and grip of tires of successive racing cars are changed to reduce the time difference.

Another example of prior art allowing a plurality of players to play a game by viewing a common screen displayed by a parent game device and individual screens displayed on respective child devices is disclosed in a Japanese Patent Laying-open No. 2000-334170 laid-open, on Dec. 5, 2000. In the game system of this second prior art, in a role playing game, for example, an entire virtual world is displayed on the common screen, and a display range including each player object is shown on each individual screen.

In the first prior art, the successive racing cars increase in performance depending on the time difference between the plurality of racing cars at the check point, but this does not individually present the support information to each player in accordance with the degree of progress of the game of each player object, and this does not cause each player to make a determination for advancing through the game based on the display of support information. Furthermore, this does not arrange an item near an arbitrary player object on the basis of the degree of the progress of the game of each player object to cause the player to search the item. Thus, there is a problem because the monotony of the game makes the game uninteresting.

In the second prior art, information may be known to each of the players in common is displayed on the common screen, and information known only to a specific player is displayed on the individual screen. However, the support information based on the degree of the progress of the game is never displayed on the individual screen, nor is an item arranged near the arbitrary player object. Accordingly, the second prior art has the same problem as the first prior art.

A third prior art featuring live coverage of the racing game executed by the plurality of game apparatuses is disclosed in a Japanese Patent Laying-open No. 2000-167250, laid-open on Jun. 20, 2000.

However, the third prior art broadcasts the state of the game to be executed by each game apparatus by sound, and merely imitates a television broadcast coverage. In addition, even though the television broadcast coverage is imitated, it was not conceived that the broadcast coverage would influence the state of the game.

In addition, a fourth prior art is disclosed in Japanese Patent Laying-open No. 2001-137536, laid-open on May 22, 2001. The fourth prior art is a baseball game, where a field for playing the baseball game and an announcer are shown on the display, live.

However, in the fourth prior art, the announcer merely faces front, and does not speak to the player. Even though the fourth prior art imitates broadcast coverage, the effect on the player is not taken into account.

Therefore, it is a primary feature of the present exemplary illustrative embodiment to provide a novel game system.

A first feature of the present exemplary illustrative embodiment is to provide a game system in which required information is individually displayed with respect to each player on the basis of degree of progress of the game of each player object.

Another first feature of the present exemplary illustrative embodiment is to provide a game system for controlling an arrangement position of an item on the basis of the degree of progress of the game of each player object.

A second feature of the present exemplary illustrative embodiment is to provide a game system in which sound is utilized to influence the progress of the game.

A third feature of the present exemplary illustrative embodiment is to provide a game system in which the objects can be differentiated for each player.

A first exemplary illustrative embodiment for the first feature is a game system (FIG. 1) in which a plurality of child game devices (reference numeral representative of a relevant or corresponding portion or component in this illustrative embodiment is "100", hereinafter, the same is applied) are connected to a parent game device (200). The parent game device displays a common screen on a first display (300), the plurality of child game devices each display an individual screen on a second display (20) provided on each child game device, and whereby, a plurality of players (600a-600d) can perform a game to attain a predetermined purpose by moving player objects (702a-702d, 802a-802d) in a virtual space by operating the respective child game devices while viewing the common screen and the individual screen.

Each of the child game devices includes an operating means (10a-10c, 10l, 10r) for being operated by a player, a first transmitter (16, 30c, S710, S822) for transmitting child game device data created on the basis of an operated state by the operating means to the parent game device, a first receiver (16, 30c, S700, S714, S812) for receiving parent game device data from the parent game device, and a first image data generator (16, 22, 30c, S716, S814) for generating first image data to display the individual screen on the second display on the basis of the parent game device data received by the first receiver.

The parent game device includes a second receiver (38, 30a, S132, S202) for receiving each of the child game device data transmitted from the first transmitter, a second image data generator (38, 42, 30a, S220) for generating second image data to display the common screen on the first display on the basis of each of the child game device data received by the second receiver, a game progress degree detector (38, 30a, S3200, S3300, S3402, S3520) for detecting a degree of progress of the game of each player object, a display information data storage device (30d, FIG. 38) for storing a plurality of display information data relating to the progress of the game, a display information data selector (38, 30a, S3222, S3404, S3426) for selecting predetermined display information data out of the plurality of display information data for each player object on the basis of the degree of progress of the game of each player object detected by the game progress degree detector, a parent game device data creator (38, 42, 30a, S212) for creating parent game device data differing for each child game device on the basis of each of the child game device data received by the second receiver and the display information data for each player object selected by the display information data selector, and a second transmitter (38, 30a, S214) for transmitting the parent game device data created by the parent game device data creator to the first receiver provided to the corresponding child game device.

The game progress degree detector detects a ranking of each player object, the parent game device further comprises a player object designator (38, 30a, S3200, S3300) for designating an arbitrary player object on the basis of the game progress degree detector, wherein the display information data selector selects display information data relating to the progress of the game out of the plurality of display information data with respect to the designated player object.

The parent game device includes a sound data storage device (30b) for storing a plurality of sound data relating to the progress of the game, a sound data selector (38, 30a, S3214, S3314) for selecting sound data relating to the progress of the game out of the plurality of sound data with respect to the designated player object, and a sound data outputting device (38, 30a, S240) for outputting the sound data selected by the sound data selector.

The parent game device may further comprise an item data storage device (30b) for storing a plurality of item data relating to the progress of the game, an item data selector (38, 30a, S3304) for selecting an arbitrary item data out of the plurality of item data on the basis of a state of the designated player object, an item arranging position specifier (38, 30a, S3302) for specifying an arbitrary position in close to a coordinates position of the designated player object as an item data arranging position, and an item data arranger (38, 30a, S3312) for arranging the selected item data at the position specified by the item arranging position specifier.

It is appropriate that the sound data selector selects sound data indicating that the item data is arranged by the item data arranger.

It is appropriate that the player object designator designates a player object in a lower ranking.

Another exemplary illustrative embodiment for the first feature is a game system (FIG. 1) in which a plurality of players (600a-600d) perform a game to attain a predetermined purpose by moving respective player objects (702a-702d, 802a-802d) appearing in a virtual space while viewing a common screen displayed on a display (300), comprising an operating means (10a-10c, 10l, 10r) for being operated by each player; an image data generator (38, 42, 30a, S220) for generating image data to display the common screen on the display on the basis of an operation state of the operating means; a game progress degree detector (38, 30a, S3200, S3300, S3402, S3520) for detecting a degree of progress of the game of each player object; a player object designator (38, 30a, S3200, S3300) for designating an arbitrary player object on the basis of the game progress degree detector; an item data storage device (30b) for storing a plurality of item data relating to the progress of the game; an item data selector (38, 30a, S3304) for selecting an arbitrary item data out of the plurality of item data on the basis of a state of the designated player object; an item arranging position specifier (38, 30a, S3302) for specifying an arranging position of the item data based on a coordinate position of the designated player object; and an item data arranger (38, 30a, S3312) for arranging the selected item data at the position specified by the position specifier.

It is appropriate that the game progress degree detector detects a ranking of each of player objects, the player object designator designates a player object in a lower ranking on the basis of the game progress degree detector, and the item arranging position specifier specifies an arbitrary position in close to the coordinates position of the designated player object as an arranging position.

Another exemplary illustrative embodiment for the first feature is a control method in a game system in which a plurality of child game devices are connected to a parent game device, the parent game device displays a common screen on a first display, the plurality of child game devices each display an individual screen on a second display provided on each child game device, and whereby, a plurality of players can perform a game to attain a predetermined purpose by moving player objects in a virtual space by operating an operating means provided in the respective child game devices while viewing the common screen and the individual screen, and the parent game device comprises a display information data storage device for storing a plurality of display information data relating to a progress of the game, wherein each of the child game devices may execute the following steps of: (a) transmitting child game device data created on the basis of an operating state by the operating means to the parent game device, (b) receiving parent game device data from the parent game device; and (c) generating first image data to display the individual screen on the second display on the basis of the parent game device data received in step (b); the parent game device may execute the following steps of: (d) receiving each of the child game device data transmitted in step (a): (e) generating second image data to display the common screen on the first display on the basis of each of the child game device data received in step (d); (f) detecting the degree of progress of the game of each player object; (g) selecting for each player object predetermined display information data from the plurality of display information data on the basis of the degree of progress of the game of each of the player objects detected in step (f); (h) creating parent game device data differing for each child game device on the basis of each of the child game device data received in step (d) and the display information data selected for each player object in step (g); and (i) transmitting the parent game device data created in step (h) to each of the corresponding child game devices.

A further exemplary illustrative embodiment for the first feature is a control method of a game system in which a plurality of players perform a game to attain a predetermined purpose by moving respective player objects appearing in a virtual space by operating an operating means while viewing a common screen displayed by a display, and an item data storage device for storing a plurality of item data relating to progress of the game is provided, comprising the following steps of: (a) generating image data for displaying the common screen on the display on the basis of an operating state of the operating means; (b) detecting a degree of progress of the game of each player object; (c) designating an arbitrary player object on the basis of the degree of progress of the game; (d) selecting arbitrary item data out of the plurality of item data on the basis of a state of the designated player object; (e) specifying and arranging the position of the item data on the basis of a coordinate position of the designated player object; and (f) arranging the selected item data at the position specified in step (e).

According to an exemplary illustrative embodiment of the first feature, since display information data differing for each player is displayed on the individual screen of each child game device on the basis of degree of progress of the game of each player object, it is possible to support each player by individually displaying support information depending on the degree of progress of the game of each player. Accordingly, each player advances in the game by viewing and determining the support information individually displayed; therefore, it is possible to engage in an interesting game with long-lasting appeal.

Where the information for supporting the progress of the game of a specific player is displayed on the individual screen of the player, respective players move closer to one another as the game progresses, capable of creating a competitive game state.

Where information for supporting the progress of the game of a specific player is applied by a sound, the respective players move closer to one another as the game progresses, capable of creating a competitive game state.

Where the item relating to the progress of the game is arranged in a position close to the specific player object, the proximity allows the player to easily find the item, capable of creating a state in which the item is easily obtained for advantageously advancing the game.

A player can easily know that the item relating to the progress of the game is arranged in a position close to the specific player object by an informing sound.

Where a player object of a lower ranking is designated, a game state in which the player object in the lower ranking is benefited is created to catch up with a player object in the upper ranking, capable of creating a competitive game development.

Where the item is arranged at the position based on the coordinate position of an arbitrary player object on the basis of the degree of the progress of the game of each player object, the item arranged in association with the player can be pursued, capable of creating an interesting game.

Since the item relevant to the progress of the game is arranged in a position close to the player object in the lower ranking, the player object in the lower ranking can easily find the item, capable of creating a state where the item for advantageously advancing the game is easily obtained.

An exemplary illustrative embodiment for the second feature is a game system in which a plurality of child game devices (100) are connected to a parent game device (200), the plurality of child game devices each display an individual screen on a first display (20) provided on each child game device, the parent game device displays a common image on a second display (300), and whereby, a plurality of players can perform a game to attain a predetermined purpose by moving player objects (702c, 802c) in a virtual space by operating the respective child game devices while viewing the common screen and the individual screen, wherein each of the child game devices includes an operating means (10, 10a, 10b, 10c, 10l, 10r) for being operated by a player, a first transmitter (16, 14, 12, S710) for transmitting child game device data (D126) created on the basis of an operating state by the operating means to the parent game device, a first receiver (12, 14, 16, S714) for receiving parent game device data (D222-D230) from the parent game device, and a first image data generator (16, 22, 24, 26, S716) for generating individual image data to display the individual image on the first display on the basis of the parent game device data received by the first receiver, and the parent game device includes a second receiver (34a-34d, 36, 38, S202) for receiving the child game device data transmitted from the first transmitter, a parent game device data creator (38, S212) for creating the parent game device data on the basis of the plurality of child game device data received by the second receiver, a second transmitter (38, 36, 34a-34d, S214) for transmitting the parent game device data created by the parent game device data creator to respective of the first receiver provided to the plurality of child game devices, a second image data generator (38, 42, 44, 46, S220) for generating a common image to be displayed on the second display on the basis of the respective child game device data received by the second receiver, a sound data storage device (40, 40i) for storing a plurality of sound data, a player object state detector (38, S3300, S3420, S3602) for detecting a state of each player object, an action determining device (38, S3214, S3314, S3612) for determining for each player object what is an action required for attaining the predetermined purpose on the basis of the state of said each player object detected by the player object state detector, a sound data selector (38, S3214, S3314, S3612) for selecting sound data including information required to inform a relevant player of a required action determined by the action determining device out of the plurality of sound data stored in the sound data storage device, and a sound data outputting device (38, 42, 48, S240) for outputting sound data of predetermined sound data stored in the sound data storage device on the basis of the sound data selector.

According to the present exemplary illustrative embodiment, the information for attaining the purpose is applied by a sound for each player object by the parent game device, and therefore, it is possible to provide a novel facilitating aspect of the game.

The common image data generator includes a facilitator object data generator (S226) for displaying on the second display a facilitator object that acts as if it generates a sound generated by the sound data, and the facilitator object data generator generates a facilitator object in a different manner (S3218, S3318, S3616) depending on which player the sound data selected by the sound data selector is directed to.

This makes it possible to clarify which player object the facilitator object instructs an action to attain the purpose.

It is appropriate that the facilitator object data generator generates a facilitator object turning on a different direction depending on which player the sound data selected by the sound data selector is directed to.

This makes it possible to clarify which player object the facilitator object instructs an action for attaining the purpose.

The child device data includes inquiry data (D128) for inquiring what action is required for attaining the predetermined purpose on the basis of an operating state of the operating means, and the action determining device determines (S3612), when the second receiver receives the inquiry data, what action is required for attaining the predetermined purpose based on a state of the player object that made an inquiry.

This makes it possible to provide the information with the player requiring the information, capable of effectively outputting the sound data.

The child game device further includes an item generator (S38, S800) for generating an item utilized during the game when a predetermined game state comes, and the child game device data includes the inquiry data in response to a predetermined operation of the operating means when the item is generated by the item generator.

This makes it possible to provide the information with only the child device to which the item occurs out of the plurality of child devices, capable of improving a facilitating aspect of the game.

The required action may be a destination, and the required information may be a direction to the destination.

This makes it possible to realize a novel orienteering game.

Another exemplary illustrative embodiment for the second feature is a control method in a game system in which a plurality of child game devices are connected to a parent game device, where the plurality of child game devices each display an individual screen on a first display provided for each child game device, the parent game device displays a common screen on a second display, and whereby, a plurality of players can perform a game to attain a predetermined purpose by moving player objects in a virtual space by operating the respective child game devices while viewing the common screen and the individual screen. Each child game device includes an operating means being operated by a player, a first transmitter for transmitting child game device data created on the basis of an operating state by the operating means to the parent game device, a first receiver for receiving parent game device data from the parent game device, and a first image data generator for generating individual image data to display the individual image on the first display on the basis of the parent game device data received by the first receiver, comprising the following steps of (a) receiving the child game device data transmitted from the first transmitter; (b) creating the parent game device data on the basis of the plurality of child game device data; (c) transmitting the parent game device data created step (b) to the respective first receiver provided to the plurality of child game devices; (d) generating a common image to be displayed on the second display on the basis of each of the child game device data received in step (a); (e) detecting the state of each player object; (f) determining for each player object what action is required for attaining the predetermined purpose on the basis of the state of each said player object detected in step (e); (g) selecting sound data including information required to inform a relevant player of the required action determined in step (f) out of a plurality of sound data; and (h) outputting predetermined sound data on the basis of step (g).

Another exemplary illustrative embodiment of the second feature is a game system in which a plurality of player objects are respectively controlled by a plurality of players, comprising: a plurality of operating means (10, 10*a*, 10*b*, 10*c*, 10*l*, 10*r*) provided for each player; a plurality of first displays (20) provided for each player; a sound generator (301) provided in common for each of the players; a player object controller (38, S204) for performing a movement control of each of the player objects in response to an operation of each of the operating means; a first image data generator (16, 22, 24, 26, S716) for generating, on the basis of the state of movement of each of the player objects to be controlled by the player object controller, individual image data to display an individual image on the first display provided to the player operating the player object; a sound data storage device (40, 40*i*) for storing a plurality of sound data relating to a content of a game operation to be performed by the player operating the player object; a sound data selector (38, S3214, S3314, S3612) for selecting sound data from the sound data storage device according to a state of the player object; and a sound data output device (38, 42, 48, S240) for outputting the sound data selected by the sound data selector to the sound generator.

According to the present exemplary illustrative embodiment, a plurality of players each obtain the required information by sound, capable of obtaining a novel facilitating aspect of the game.

A further exemplary illustrative embodiment for the second feature is a game system in which a plurality of player objects are respectively controlled by a plurality of players, where a control method of a game system in which a plurality of operating means provided for each player, a plurality of first displays provided for each player, a sound data storage device provided in common with each of the players, and a sound generator provided in common with each of the players, comprising following steps of: (a) performing a movement control of each of the player objects in response to an operation of each of the operating means; (b) generating, on the basis of the state of movement of each of the player objects to be controlled in step (a), individual image data to display an individual image on the first display provided to the player operating the player object; (c) selecting sound data relating to a content of a game operation to be performed by the player operating the player object from the sound data storage according to a sate of the player object; and (d) outputting the sound data selected in step (c) to the sound generator.

The exemplary illustrative embodiment for the third feature is a game apparatus that is operated by a player, which is connected with a plurality of operating devices (100) outputting operating information as operation data, and executes a game by displaying an image on a display (300), comprising: a plurality of connectors (34*a*-34*d*) for being connected with the operating devices; a connected state detector (38, S116) for detecting which connector out of the plurality of connectors the operating device is connected to; an object data output device (38, 42, 44, 46, S220) for outputting object data to display an object (900 or 910) on the display; a direction determining device (38, S122) for assigning a direction proper for each player in correspondence to a connected state detected by the connected state detector; an object data determining device (38, S3218, S3318, S3616) for determining, when an event to be executed for each player occurs, object data output by the object data output device depending on which direction a player relating to the event is assigned to by the direction determining device; and an image data output device (38, 42, 44, 46, S220) for outputting image data to display an image on the display on the basis of the object data to be output by the object data output device.

According to the present exemplary illustrative embodiment, a manner of the object can be differentiated for each player, and thus, the player feels an affinity for the game, and enjoys playing the game, devoting himself to the game world.

It is appropriate that the plurality of connectors are aligned, and the direction determining device determines a direction to be assigned for each player operating the operating device connected to the connector in an order of alignment of the connector.

This makes it possible to change the manner of the object for each player depending on the position where the plurality of players operate, allowing the player to easily confirm to which player the event occurs by viewing the object.

It is appropriate that the direction determining device changes the direction depending upon the number of operating devices connected to the connector.

This makes it possible to change the direction depending on the number of operating devices connected to the connector, capable of making the manner of the object precisely correspond to the manner of the player.

It is appropriate that a direction of the object is set, and the object data determining device determines the object data such that the object is turned to a direction of the player corresponding to the event.

This makes it possible to direct the object to the player, allowing the player to more easily confirm to which player the event occurs by viewing the object.

It is appropriate that the object is an object (900) representative of a person including eyes, and the object data determining device determines the object data such that eyes of the object are turned to a direction of the player corresponding to the event.

This makes it possible to direct the object to the player, allowing the player to more easily confirm to which player the event occurs by viewing the object.

It is appropriate that the object is an object (910) representative of a weapon, and the object data determining device determines the object data such that a firing position of the weapon is determined depending on a direction of the player corresponding to the event.

This makes it possible to differentiate the firing position of the weapon for each player, allowing the player to easily confirm which player fires the weapon by viewing the object.

Another exemplary illustrative embodiment for the third feature is a control method of a game apparatus that is operated by a player, which connects a plurality of operating devices outputting operating information as operation data with a plurality of connector, and executes a game by displaying an image on a display, comprising the following steps of: (a) detecting which connector out of the plurality of connectors the operating device is connected to; (b) outputting object data to display an object on the display; (c) a direction determining device for assigning a direction proper for each player in correspondence to a connected state detected in step (a); (d) determining, when an event to be executed for each player occurs, object data to be output in step (b) depending on which direction a player relating to the event is assigned to in step (c); and (e) outputting image data to display an image on the display on the basis of the object data to be output in step (b).

BRIEF DESCRIPTION OF THE DRAWINGS

These and other features and advantages will be better and more completely understood by reference to the following detailed description of exemplary illustrative embodiments in conjunction with the drawings of which:

FIG. 2 is a block diagram showing the game system of one illustrative embodiment;

FIG. 3 is an illustrative view showing a memory map of a DVD-ROM;

FIG. 9 is an illustrative view showing one example of a facilitator angle table;

FIG. 13 is an illustrative view of an enlarged CRT in FIG. 12;

FIG. 21 shows a positional relationship between the facilitator object 900 and the player 600a;

FIG. 25 is an illustrative view showing a display example in which the facilitator object 900 turns his eyes as well as his arm, his hand, and his entire body in the direction of the player;

FIG. 27 is an illustrative view showing a display example of not the facilitator object 900 but a target with a laser beam;

FIG. 28 is an illustrative view showing a data column or row of communication data between the child device 100 and the parent device 200;

FIG. 37 is an illustrative view showing one example of an individual screen to be displayed on a liquid crystal display of the child device;

FIG. 38 is an illustrative view showing one example of an individual screen displaying table;

FIG. 40 is an illustrative view showing an event 0 processing subroutine in FIG. 30;

FIG. 41 is a table view showing an event generating condition;

FIG. 43 is an illustrative view showing an event table 1 processing subroutine in FIG. 42;

FIG. 45 is an illustrative view showing an event table 2 processing subroutine in FIG. 44;

FIG. 47 is an illustrative view showing an event table 3 processing subroutine in FIG. 46;

FIG. 49 is an illustrative view showing an event table 4 processing subroutine in FIG. 48;

FIG. 51 is an illustrative view showing an event table 5 processing subroutine in FIG. 50;

FIG. 53 is an illustrative view showing an event table 6 processing subroutine in FIG. 52.

DETAILED DESCRIPTION

Figure 1:
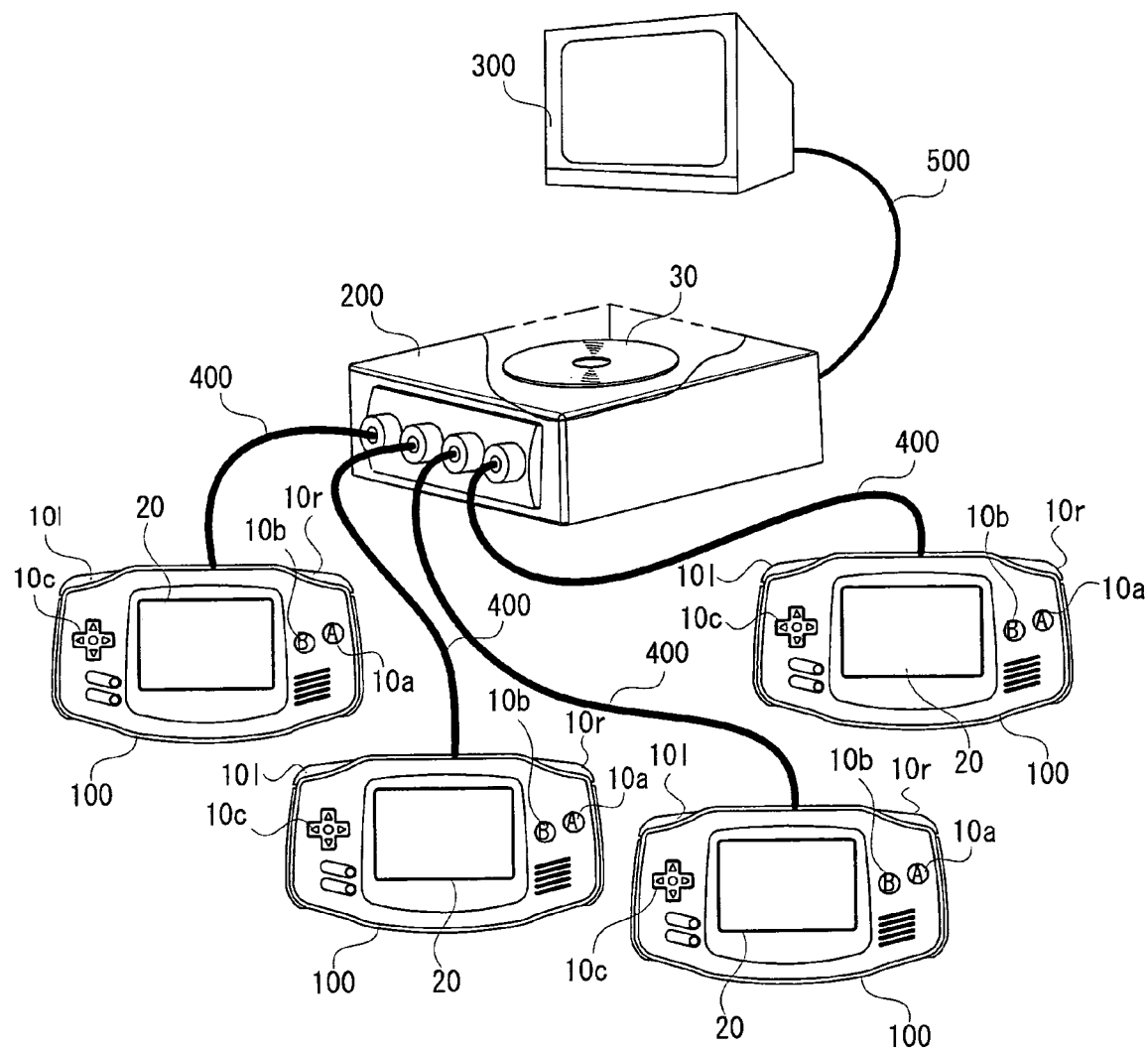
FIG. 1 is an appearance view for showing an exemplary illustrative game system.

With reference to FIG. 1, a game system of this exemplary illustrative embodiment includes one game apparatus, or a plurality (one to four, in this exemplary embodiment) of portable game apparatuses, 100 (each of which functions as a child game device, and hereinafter referred to as "child device 100"), and one video game apparatus 200 (that functions as a parent game device, and hereinafter referred to as "parent device 200"). The video game apparatus 200 is connected with the respective child devices 100 by respective communication cables 400, and connected with a CRT 300 by a video cable 500. A DVD-ROM 30 storing a game program is attached to the parent device 200. The game program provides a predetermined game world to a player through execution thereof by the parent device 200 and the respective child devices 100. Each of the child devices 100 functions as a game controller, and the player performs a game operation by use of his own child device 100.

It is noted that the child device 100 and the parent device 200 are game machines "NINTENDO GAME CUBE (trademark)" and "GAMEBOY ADVANCE (trademark)" that are manufactured and sold by the assignee of the present invention.

The game world is displayed on the LCD 20 (liquid crystal display) provided on each of the child devices 100 and the CRT 300 may be a television or liquid crystal display. On each of the LCDs 20 is displayed a game world different for each player (individual game screen), and on the CRT 300 is displayed a game world in common with the respective players (common game screen). That is, the LCD 20 functions as an individual display, and the CRT 300 functions as a common display. Thus, each player plays a game by viewing the CRT 300 and his own LCD 20.

In the game of this exemplary illustrative embodiment, one or a plurality of player objects (also called player character or player characters) appear in correspondence with the number of the players in a two-dimensional or three-dimensional space. A player object or character is operatively assigned for each child device 100 one-by one,—and each player moves his own player character toward an arbitrary direction by operating a direction instructing key (cross key) 10c provided on the child device 100. Furthermore, when obtaining an item, etc. during the game, the player plays the game by performing an operation corresponding to the item, etc. by use of an A button 10a, a B button 10b, an L button 10l, or an R button 10r.

The common screen to be displayed on the CRT 300 is formed by the two-dimensional space or the three-dimensional space. For example, a plane image based on a viewpoint viewing the two-dimensional space from directly above is displayed on the CRT 300, and the player can visually confirm where each of the player objects exists by the plane image. Additionally, on the LCD 20 of the child device 100, a predetermined restricted surrounding of the player object assigned to the player himself is displayed. That is, only the game space narrower than the game space to be displayed on the CRT is displayed on the individual game screen.

The child device 100 and the parent device 200 are specifically configured as shown in FIG. 2. The child device 100 is provided with a connector 12, and the parent device 200 is provided with a plurality of connectors 34a-34d. The connector 12 is connected to a CPU 16 via an I/O interface 14, and the connector 34 is connected to a CPU 38 via an I/O interface 36. Connectors 400a and 400b provided at both ends of the communication cable 400 are respectively connected to the connectors 12 and 34, and this allows communication between the CPU 16 and the CPU 38.

The I/O interface 36 of the parent device 200 is connected with a DVD drive 32. The DVD-ROM 30 stores game program/data for parent device 200 and game program/data for child device 100, and these program/data are read by the DVD drive 32. A description of a memory map of the DVD-ROM 30 is made in detail below.

The game program/data for parent device 200 is stored in a RAM 40. A description of a memory map of the RAM 40 is made in detail below.

The CPU 38 operates on the basis of the program stored in the RAM 40.

An AV (audio and video) processing unit 42 develops in VRAM 44 the display image data to be displayed on the CRT 300 on the basis of the image data stored in the RAM 40, and outputs to an audio IF 48 the sound data for generating a sound from a speaker 301 on the basis of the sound data stored in the RAM 40. The display image data is a two-dimensional dot image obtained by photographing by use of a virtual camera an object (facilitator object, player object, background object, and etc.) consisting of polygons and existing in a virtual three-dimensional space with pasted textures.

An encoder (image signal generating circuit) 46 reads the image data including the player object and the facilitator object from the VRAM 44, and converts the read image data into a composite video signal. The converted composite video signal is applied to the CRT 300 via the video cable 500 to display the common game screen on the CRT 300.

The audio IF 48 converts the sound data output from the AV processing unit 42 into a sound signal and outputs it to the speaker via a cable.

The game program/data for child device 100 transmitted to the child device 100 is stored in a RAM 18 by the CPU 16. A description of a memory map of the RAM 18 is made in detail later.

When a game is started, the CPU 18 requests an image processing unit 22 to perform image processing in order to display the individual game screen in an initial state on the LCD 20. Furthermore, an operating state of the A button 10a, the B button 10b, the L button 10l, the R button 10r or the direction instructing key 10c that is provided on the operating device 10 is transmitted to the parent device 200. In addition, upon receiving controller data from the parent device 200, the image processing unit 22 is requested to update an image in accordance with the received controller data.

The image processing unit 22 renders in the VRAM 24 an image of two-dimensional space viewed from a player's own character on the basis of the image game, etc., stored in the RAM 18 according to the instruction of the CPU 16. An LCD driver 26 drives the LCD 20 according to the image data rendered in the VRAM 24 to display an individual game screen on the LCD 20.

With reference to FIG. 3, the DVD-ROM 30 includes a game program area for parent device 30a, a game data area for parent device 30b, a game program area for child device 30c, and a game data area for child device 30d.

Stored in the game program area for parent device 30a is a game environment construction program, a game playing program, an image displaying program, a sound output program, etc.

The game environment construction program is a program for executing a process in a step S100 described later, and includes a controller port confirming program and an eyes changing program.

The controller port confirming program is a program for executing a process in step S110 described below, and for confirming whether or not the child devices 100 are connected to the connectors 34a-34d of the parent device 200. The eyes changing program is a program for executing a process in step S140 described below, and for controlling the direction of the eyes of the facilitator object displayed on the CRT 300.

The game playing program is a program for executing a process in step S200 described below, and includes a data creating program, a data transmitting program, a controller data receiving program, a facilitator object operating program, a player object operating program, a player object status detecting program, a ranking detecting program, a display information data selecting program, a player object designating program, a sound data selecting program, an item data selecting program, an item arrangement position specifying program, an item arranging program, an ending processing program, and other programs.

The data creating program is a program for creating a data column or row (parent device data) shown in a lower alignment (the third and fourth alignments from the top) in FIG. 28. The data transmitting program is a program for transmitting the parent device data created by the data creating program to each of child devices 100. The controller data receiving program is a program for receiving the controller data (child device data) transmitted from each child device 100. The controller data is a data column or row shown in an upper alignment (the first and second alignments from the top) shown in FIG. 28. The facilitator object operating program is a program for displaying an action of the facilitator object on the CRT 300. The player object operating program is a program for performing movement process, etc., of each player object according to the controller data received from each child device 100. The player object status detecting program is a program for detecting a state of the player object in order to select the sound data of what the facilitator object has to talk about. In a case where the facilitator object instructs with a sound a direction of a flag to be obtained next when viewed from an arbitrary player object, for example, a current position of the player object is detected. The ranking detecting program is a program for detecting the ranking (degree of progress of the game) of each player object on the basis of a ranking point of each player object. The display information data selecting program is a program for selecting a display level shown in FIG. 38 on the basis of the ranking of each player object. The player object designating program is a program for designating an arbitrary player object (in the lower ranking) on the basis of the ranking of each player object. The sound data selecting program is a program for selecting the sound data of the content to be spoken by the facilitator object, a sound effect, a BGM, etc. The item data selecting program is a program for selecting from the game data for parent device 60b item data to be added to a treasure box on the basis of the possessed items of the designated player object shown in FIG. 39. The item arrangement position specifying program is a program for specifying an arrangement position of the item on the basis of a coordinate position of the designated player object. For example, the item arrangement position specifying program specifies a treasure box located nearest to the position of coordinates of the last player object in the ranking as the arrangement position of the item. The item arranging program is a program for arranging the item selected by the item data selecting program at a position specified by the item arrangement position specifying program. The ending processing program is a program for performing a process to end the game. The other programs are other programs for performing a process required to advance the game.

The image displaying program is a program for executing a process in step S220 described below, and for displaying various objects such as the facilitator object, the background object, etc., on the CRT 300, displaying the player object on the basis of the controller data received from each child device 100, and so forth.

The sound outputting program is a program for executing a process in step S240 described below, and a program for performing a sound output processing of the facilitator object, a sound effect output processing, a BGM output processing, etc.

Stored in the game data area for parent device 30b is image data and sound data. The image data includes the player object, the facilitator object, the item data, the treasure box, the background object, etc. The item data includes a plurality of kinds of item data relating to the progress of the game. The sound data includes the sound data of the content spoken by the facilitator object, the sound effect, the BGM, etc., and a plurality kinds of sound data are stored. The sound data spoken by the facilitator object includes a plurality of sound data relating to the progress of the game.

Stored in the game program for the child device 30c is a game playing program, an image displaying program, a sound output program, etc.

The game playing program is a program for performing a game playing process in the child device 100, and includes a data receiving program, a controller data creating program, a controller data transmitting program, a player object operating program, an item displaying processing program, and other programs.

The data receiving program is a program for receiving data (parent device data) transmitted from the parent device 200 shown in the lower alignment in FIG. 28. The controller data creating program is a program for creating data column (child device data) shown in the upper alignment shown in FIG. 28 in response to an operation of each player. The controller data transmitting program is a program for transmitting the controller data created by the controller data creating program to the parent device 200. The player object movement program is a program for performing a movement process, etc. for each player object in accordance with the data received from the parent device 200. The item displaying process is a program for performing a process in step S800 described below, and a program for displaying an item (treasure) box on the child device 100. The other programs are programs for performing a process required to progress through the game.

The image displaying program is a program for executing a process in steps S716 and S814 described below, and for displaying the individual game screen on the LCD 20 on the basis of data received from the parent device 200.

The sound outputting program is a program for performing a sound effect output processing, a BGM output processing, etc.

Stored in the game data area for child device 30*d* is image data and sound data. The image data includes a player object, an item data, a treasure box, display information data, a background object, etc. The item data includes various kinds of item data. The display information data includes, as shown in FIG. 38, a plurality of support information data (display 1-display 6) for supporting the progress of the game. The sound data includes the sound effect, the BGM etc., and a plurality of sound data is stored.

It is noted that the program stored in the game program area for child device 30*c* and the data stored in the game data area for child device 30*d* are transferred to each of the child devices 100 and executed by the CPU 16 of each of the child devices 100.

Figure 4:
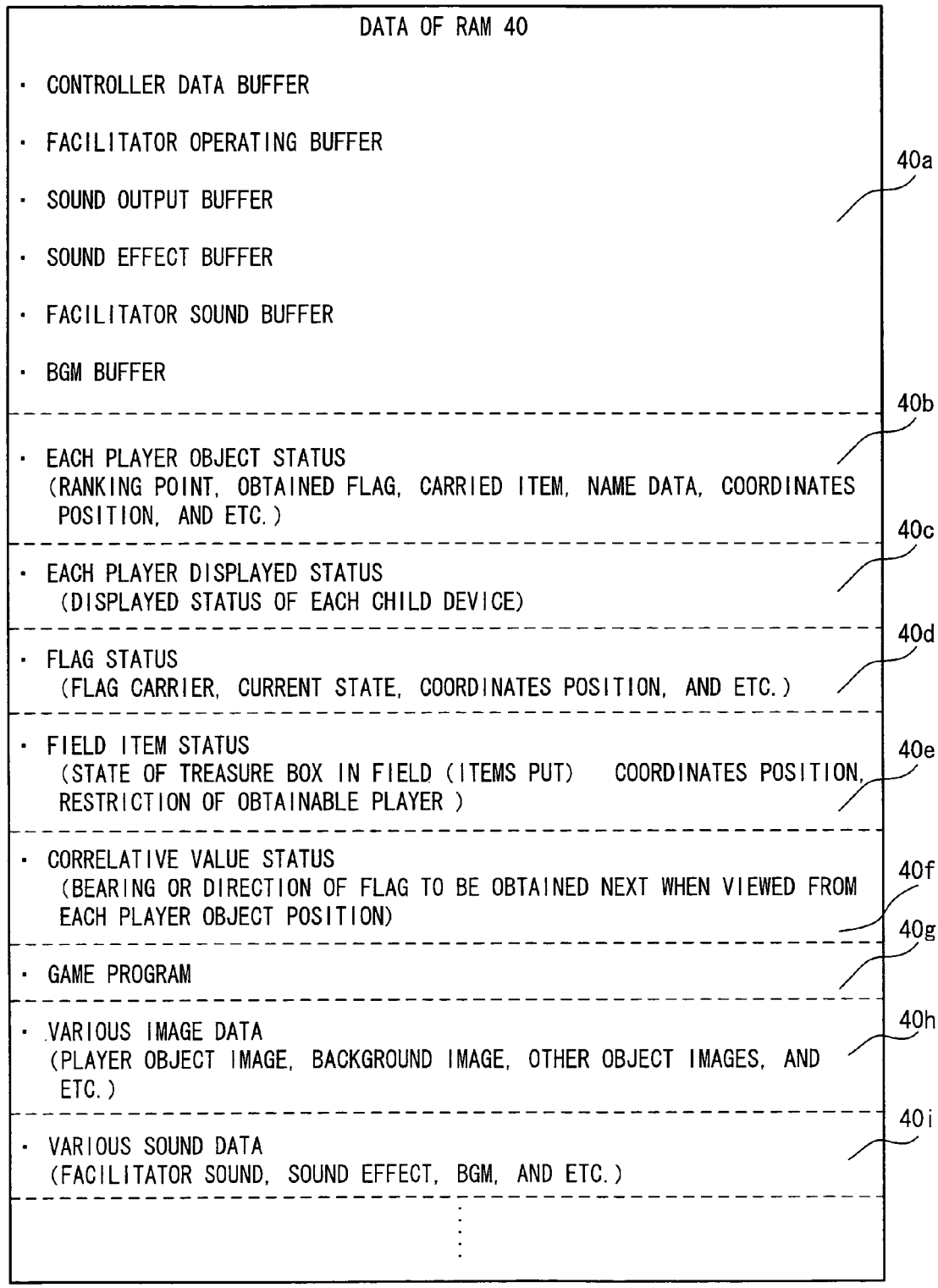
FIG. 4 is an illustrative view showing a memory map of a RAM of a parent game device.

With reference to FIG. 4, the RAM 40 is provided with a buffer area 40*a*, an individual player object status area 40*b*, an individual player display status area 40*c*, a flag status area 40*d*, a field item status area 40*e*, a correlative value status area 40*f*, a game program area 40*g*, an image data area 40*h*, and a sound data area 40*i*.

The buffer area 40*a* comprises a controller data buffer, a facilitator operating buffer, a sound output buffer, a sound effect buffer, a facilitator sound buffer, and a BGM buffer. The image data, the sound data, etc., are written to a corresponding buffer as necessary.

The individual player object status area 40*b* is divided into a plurality of areas for each player object, and into each storing area is written a ranking point, an obtained flag, a carried item, name data, a coordinate position (X, Y, Z), etc., for each player object. For the three-dimensional display game, data of an X coordinate, a Y coordinate, and a Z coordinate are stored in the coordinate position data while for the two-dimensional display game, only the X and Y coordinates are appropriate.

A displayed status of each player to be displayed on the LCD 20 of the child device 100 is written into the individual player display status area 40*c*.

Data of the carrier of a flag, a current state of the flag, a coordinate position of the flag (X, Y, Z), etc., are written into the flag status area 40*d*.

A status of the treasure box existing within the field (e.g., which item is included), a coordinate position (X, Y, Z), and a restriction of players capable of obtaining the treasure box are written into the field item status area 40*e*.

Data relating to a bearing or a direction of the flag to be obtained next when being viewed from a position of each player object is written into the correlative value status area 40*f*.

All or part of the program read from the game program area for parent device 30*a* is stored in the game program area 40*g*.

All or part of the image data such as the player object, the background object, etc., read from the game data area for parent device 30*b* is stored in the various image data area 40*h*.

All or part of the sound data such as the sound of the facilitator, the sound effect, the BGM, etc., read from the game data area for parent device 30*b* is stored in the various sound data area 40*i*.

Figure 5:
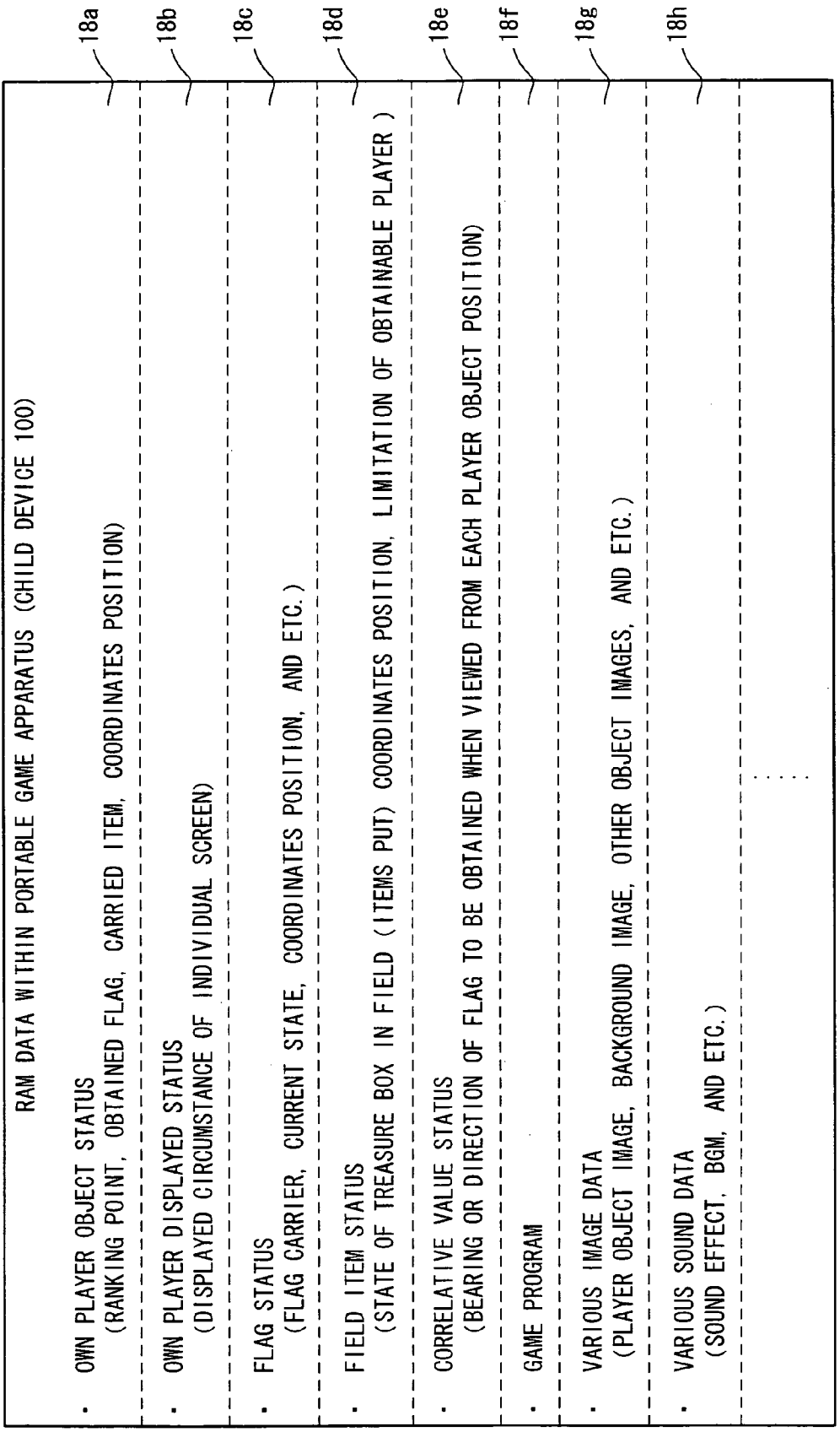
FIG. 5 is an illustrative view showing a memory map of a RAM of a child game device.

With reference to FIG. 5, the RAM 18 is provided with an own player object status area 18*a*, an own player displayed status area 18*b*, a flag status area 18*c*, a field item status area 18*d*, a correlative value status area 18*e*, a game program area 18*f*, a various image data area 18*g*, a various sound data area 18*h*, etc.

The flag status area 18*c* and the field item status area 18*d* operate the same as in the above-described flag status area 40*d* and the field item status area 40*e*, respectively.

A ranking point, an obtained flag, a carried item, name data, a coordinate position (X, Y, Z) etc., of the player object operated by the player of his own are written into the own player object status area 18*a*. A displayed circumstance to be displayed on the LCD 20 of the child device 100 operated by him is written into the own player displayed status area 18*b*. Data relating to the bearing or the direction of the flag to be obtained next when being viewed from the position of the player object operated by the player of his own is written into the correlative value status area 18*e*. All or part of the program read from the game program area for child device 30*c* is stored in the game program area 18*f*. All or part of the image data such as the player object, the background object, etc., read from the game data area for child device 30*d* is stored in the various image data area 18*g*. All or part of the sound data such as the sound effect, the BGM, etc., read from the game data area for child device 30*d* is stored in the various sound data area 18*h*.

First, before describing flowcharts, the content of the game of this exemplary illustrative embodiment will be described. The game utilized in this exemplary illustrative embodiment is an orienteering game. A game field (game world) and a facilitator object are displayed on the CRT 300 connected to the stationary parent device 200. The parent device 200 is connected with one or a plurality of child devices 100, and displayed on the LCD 20 of each of the child devices 100 are each player object and the game field of its limited surrounding. The player basically performs a movement operation of the player object by viewing the LCD 20 of the child device 100 operated by him to perform the game by sometimes viewing the CRT 300. The game field is a virtual space in which the player object moves, and is a field to perform the orienteering in this exemplary illustrative embodiment. The orienteering in this illustrative embodiment is a game in which the player moves in the game field and enjoys a competition between the players by obtaining the flag located at each check point before another player object does, by obtaining the most flags, and so forth. In addition, the flags have numerals 1-9, and, as a rule, each of the player objects has to obtain the flags from 1 to 9, in order. Only one flag is sought after at a given time, and in case that flag is obtained by any one of the player objects, a next flag has to be obtained. The facilitator object is an object (character) for speaking to each of the players, and advances the game by indicating where the flag exists, where the treasure box with the items exists, and so forth, depending on the state of each player.

Figure 6:
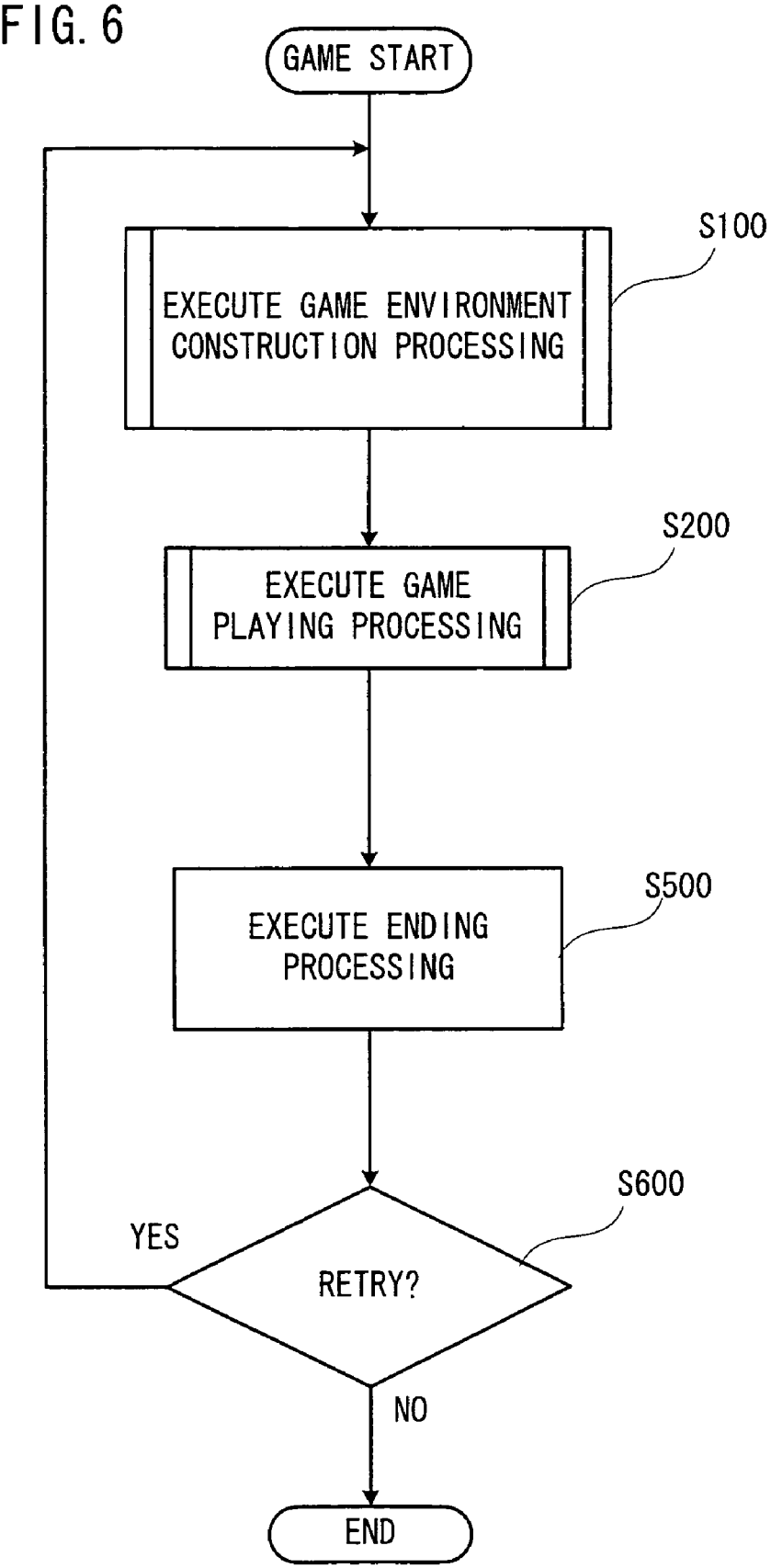
FIG. 6 is a flowchart showing a main routine of one example of a game processing on the parent game device side.

Now, a description of the present illustrative embodiment is made in detail by use of flowcharts. First, with reference to an operation flowchart of the CPU 38 of the parent device 200 shown in FIG. 6, the game environment construction processing is performed in step S100. Describing the game environment construction processing in detail with reference to FIG. 7, the CPU 38 executes an initial display in step S102. The initial display creates image data to display an initial screen of the game on the CRT 300. Furthermore, various parameters (factors) are set to default values.

In step S110, a controller port confirming process is performed. The controller port includes the connectors 34*a*-34*d*.

Figure 8:
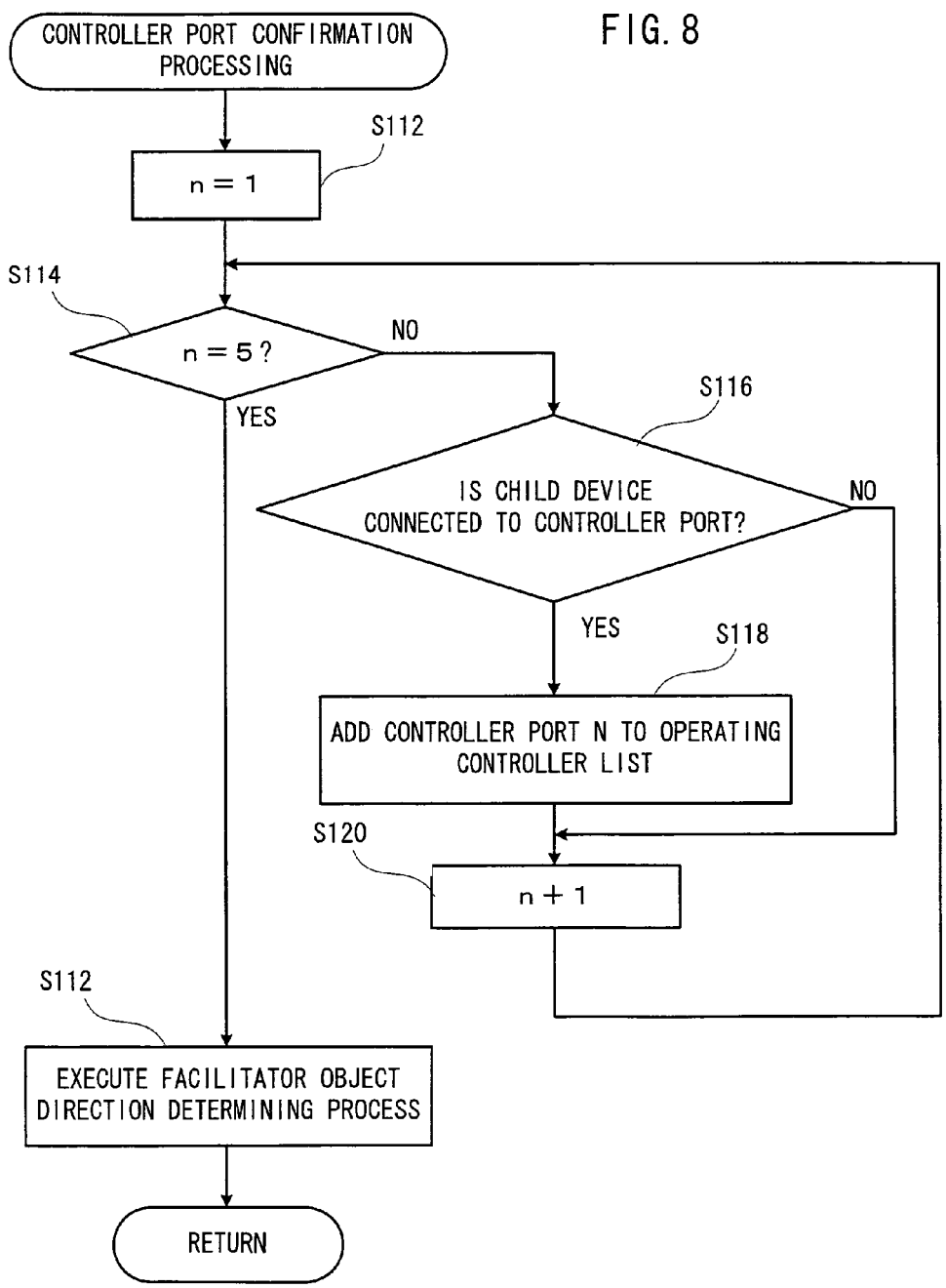
FIG. 8 is a flowchart showing a controller port confirming processing subroutine in FIG. 7.

More specifically, a description is made by use of a sub flowchart in FIG. 8. The CPU 38 sets a variable n to 1 in step S112. Next, in step S114, it is determined whether or not the variable n is 4. Since n is equal to 1, the process proceeds to step S116. In step S116, it is determined whether or not the controller port 1 (connector 34*a*) is connected with the child device 100. More specifically, a data transmission instructing signal is transmitted to each of the connectors 34*a*, and it is determined that a connection is not established if no data is received from the child device 100. When the connector 34*a* is connected with the child device 100, the process proceeds to step S118, and when the connector 34*a* is not connected with the child device 100, the process proceeds to step S120.

In step S118, the controller port 1 (connector 34*a*) is added to an operating controller list. For example, assuming that the operating controller list in a state where no child device 100 is connected is rendered "0000", and the operating controller list in a state where only the connector 34*a* is connected with the child device 100 is rendered "1000".

In the following step S120, the variable n is incremented by one to change the variable n to 2. After executing the process in the step S120, the process returns to step S114. The process in steps S114-S120 is performed when the variable n is equal to 2 the same as when n is equal to 1, and the process is repeated until the variable n is equal to 5. In this case, the controller port 2, the controller port 3, and the controller port 4 are the connectors 34*b*, 34*c*, and 34*d*, respectively. Furthermore, a state where only the connector 34*a* and the connectors 34*b* are connected with the child devices 100 is "1100". Thus, when the controller port 1 is connected with the child device 100, the fourth digit of the operating controller list is rendered "1", when the controller port 2 is connected with the child device 100, the third digit of the operating controller list is rendered "1", when the controller port 3 is connected with the child device 100, the operating controller list of the second digit is rendered "1", and when the controller port 4 is connected with the child device 100, the operating controller list of the first digit is rendered "1". It is noted that the operating controller list is not limited to a four-digit numerical value, and any list capable of showing whether or not the child device is connected is appropriate.

In step S114, when it is determined that the variable n is equal to 5, the process proceeds to the step S122. In step S122, a facilitator object direction determining process is performed. More specifically, with reference to a facilitator object angle table, on the basis of the operating controller list, when the only one child device 100 is connected, an angle with respect to a player 600*a* is set to 0 degrees. When the two child devices 100 are connected, an angle with respect to the player 600*a* is −45 degrees, and an angle with respect to a player 600*b* is +45 degrees. When the three child devices 100 are connected, an angle with respect to the player 600*a* is −50 degrees, an angle with respect to the player 600*b* is 0 degrees, and an angle with respect to a player 600*c* is +50 degrees. When the four child devices 100 are connected, an angle with respected to the player 600*a* is −60 degrees, an angle with respect to the player 600*b* is −20 degrees, an angle with respect to the player 600*c* is +20 degrees, and an angle with respect to a player 600*d* is +60 degrees. The purpose of the angle is described by use of FIGS. 10 through 23.

Figure 10:
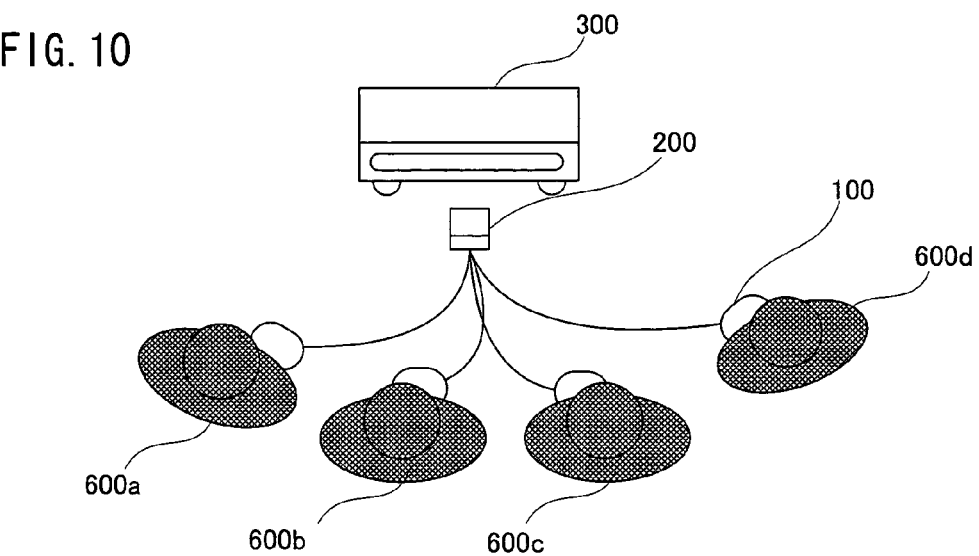
FIG. 10 is an illustrative view viewed from above a state where a parent device is connected to a CRT, and four players have child devices to respectively operate.

FIG. 10 is a view from above showing a state where the television (CRT 300) is connected to the video game apparatus (parent device 200), and the four players 600*a*-600*d* have and operate the respective portable game apparatuses (child device 100). In playing a four-player battle game, the players are normally lined up side-by-side and play a game by viewing the portable game apparatus while viewing the television on which the common screen is displayed.

Figure 11:
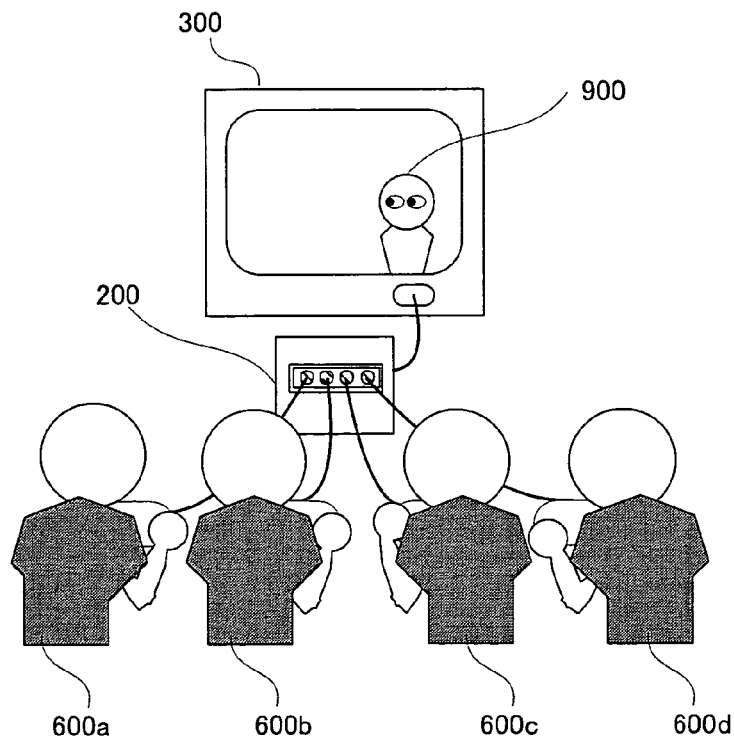
FIG. 11 is an illustrative view showing the state of FIG. 10 viewed from the rear of the players.

FIG. 11 is a view of the state in FIG. 10 shown from the rear of the players 600*a*-600*d*. Thus, the players 600*a*-600*d* play the game side-by-side, viewing the television. Additionally, the facilitator object 900 is an object utilized in the present exemplary illustrative embodiment, and displayed on the CRT 300 so as to face the players 600*a*-600*d*.

Figure 12:
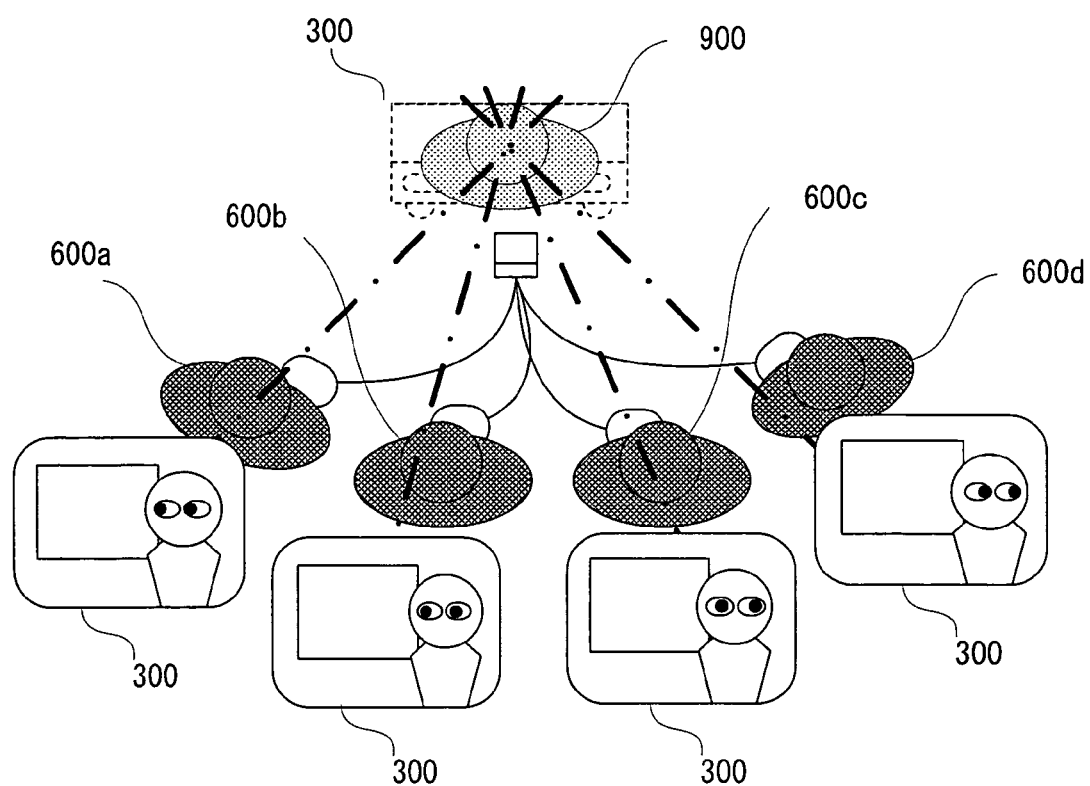
FIG. 12 is a view showing how eyes of a facilitator object 900 are changed for each player.

FIG. 12 is a view showing how the eyes of the facilitator object 900 are changed for each player 600*a*-600*d*. In a scene where the facilitator object 900 speaks to the player 600*a*, as shown in the uppermost drawing in FIG. 13 (enlarged view of the CRT 300 in FIG. 12), the facilitator object 900 is displayed on the CRT 300 such that its eyes (sight line) make a large movement toward the left direction. In a scene where the facilitator object 900 speaks to the player 600*b*, as shown in the second drawing from the top in FIG. 13, the facilitator object 900 is displayed on the CRT 300 such that its eyes (sight line) make a small movement toward the left direction. In a scene where the facilitator object 900 speaks to the player 600*c*, as shown in the third drawing from the top in FIG. 13, the facilitator object 900 is displayed on the CRT 300 such that its eyes (sight line) make a small movement toward the right direction. In a scene where the facilitator object 900 speaks to the player 600*d*, as shown in the lowermost drawing in FIG. 13, the facilitator object 900 is displayed on the CRT 300 such that its eyes (sight line) make a large movement toward the right direction. Thus, an angle formed with the sight line (eyes) of the facilitator object 900 with respect to the player 600*a* (assuming that a vertically forward direction to the CRT 300 is 0 degrees, and a clockwise direction is positive in FIG. 12) is an angle P1 as decided in FIG. 9 where the four child devices 100 are connected. An angle when the facilitator object 900 views the player 600*b* is an angle P2, an angle when the facilitator object 900 views the player 600*c* is an angle P3, and an angle when the facilitator object 900 views the player 600*d* is an angle P4.

Figure 14:
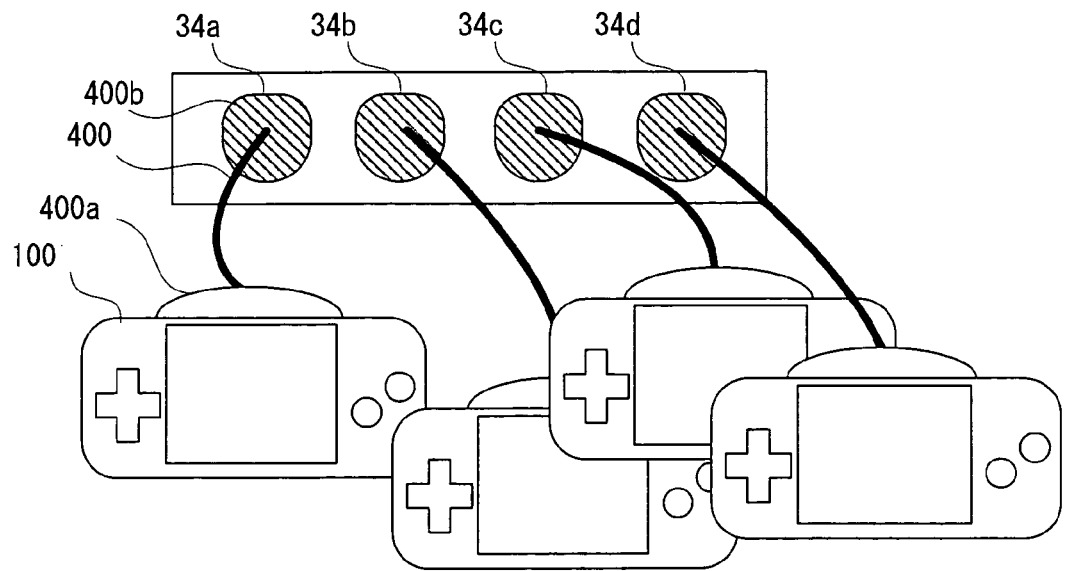
FIG. 14 is an illustrative view showing a connected state between child devices 100 and a parent device 200 by connecting connectors 34a-34d to connectors 400b.
Figure 15:
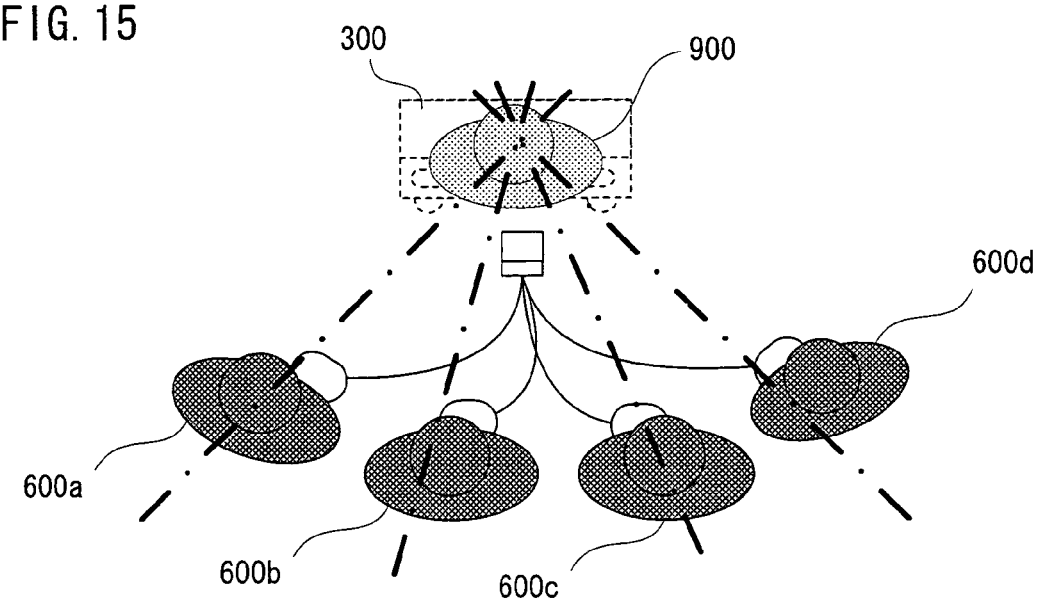
FIG. 15 shows a positional relationship between the facilitator object 900 and the players 600a-600d.

FIG. 14 is a view in which all the connectors 34*a*-34*d* aligned on the front surface of the parent device 300 are connected with the connectors 400*b* for connecting the parent device 300 with the child devices 100. It is noted that the connectors 400*b* are electrically connected to the connectors 400*a* via the cables 400, and the connectors 400 are connected to the child devices 100.

Where the connectors 34*a*-34*d* are connected with the child devices 100 as shown in FIG. 14, a relationship between the facilitator object 900 and the players 600*a*-600*d* is as shown in FIG. 15. In this case, with reference to the facilitator object angle table in FIG. 9, as shown in FIG. 12, a direction (angle) of the player 600*a* viewed from the facilitator object 900 is −60 degrees, a direction (angle) of the player 600*b* viewed from the facilitator object 900 is −20 degrees, a direction (angle) of the player 600*c* viewed from the facilitator object 900 is +20 degrees, and a direction (angle) of the player 600*d* viewed from the facilitator object 900 is +60 degrees. These angles indicate a direction when the facilitator object views any one of the players 600*a*-600*d*.

Figure 16:
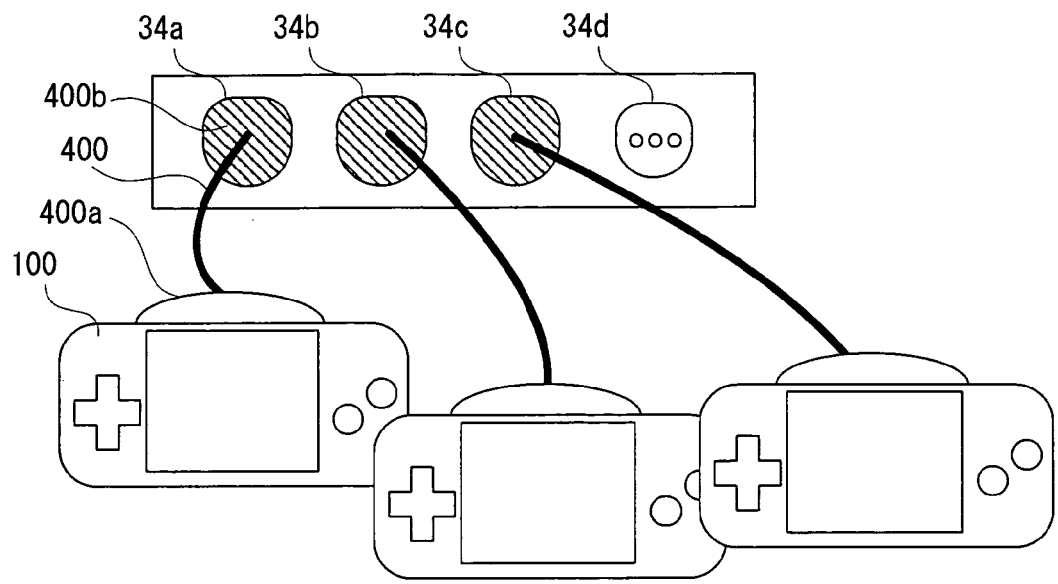
FIG. 16 is an illustrative view showing a connected state between the child devices 100 and the parent device 200 by connecting the connectors 34a-34c to the connectors 400b.
Figure 17:
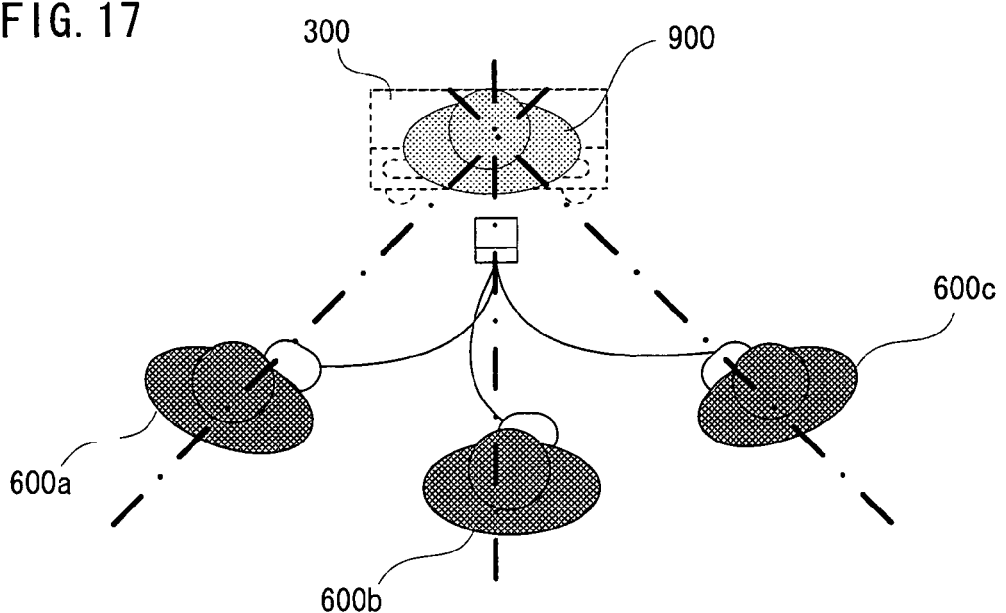
FIG. 17 shows a positional relationship between the facilitator object 900 and the players 600a-600c.
Figure 18:
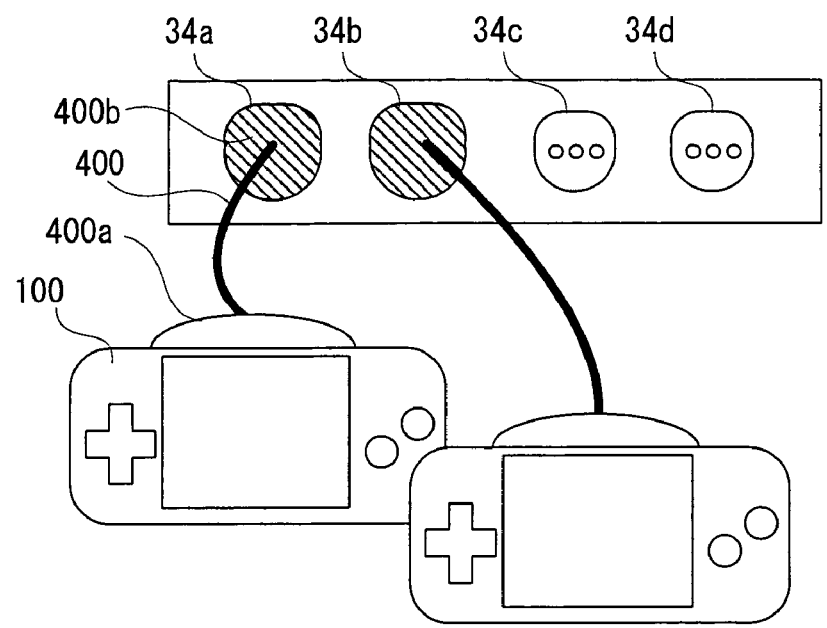
FIG. 18 is an illustrative view showing a connected state between the child devices 100 and the parent device 200 by connecting the connectors 34a-34b to the connectors 400b.
Figure 19:
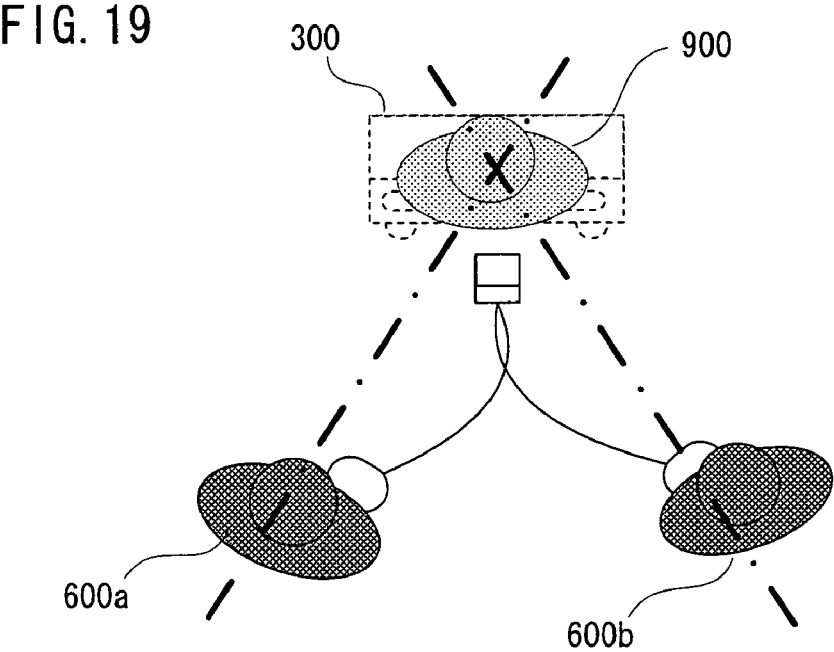
FIG. 19 shows a positional relationship between the facilitator object 900 and the players 600a-600b.

FIG. 16 is a view of a state where the connectors 34*a*-34*c* out of the connectors 34*a*-34*d* are connected to the connectors 400*b* for connecting the parent device 300 and the child device 100. In a state where the connectors 34*a*-34*d* are connected to the child devices 100 as shown in FIG. 16, a relationship between the facilitator object 900 and the players 600*a*-600*c* is as shown in FIG. 17. In this case, with reference to the facilitator object angle table in FIG. 9, a direction (angle) of the player 600*a* viewed from the facilitator object 900 is −50 degrees, a direction (angle) of the player 600*b* viewed from the facilitator object 900 is 0 degrees, and a direction (angle) of the player 600c viewed from the facilitator object 900 is +50 degrees, FIG. 18 is a view of a state where the connectors 34a and 34b out of the connectors 34a-34d are connected to the connectors 400b for connecting the parent device 300 and the child device 100. In a state where the connectors 34a-34d are connected to the child devices 100 as shown in FIG. 18, a relationship between the facilitator object 900 and the players 600a and 600b is as shown in FIG. 19. In this case, with reference to the facilitator object angle table in FIG. 9, a direction (angle) of the player 600a viewed from the facilitator object 900 is −45 degrees, and a direction (angle) of the player 600b viewed from the facilitator object 900 is +45 degrees.

Figure 20:
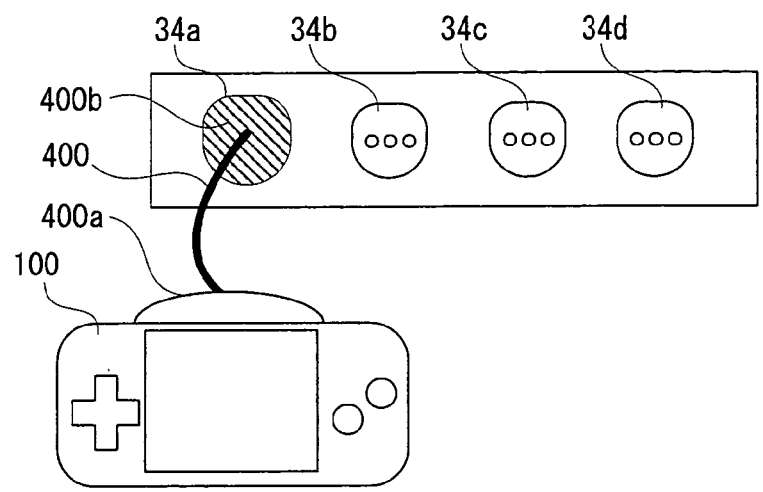
FIG. 20 is an illustrative view showing a connected state between the child device 100 and the parent device 200 by connecting the connector 34a to the connector 400b.
Figure 21:
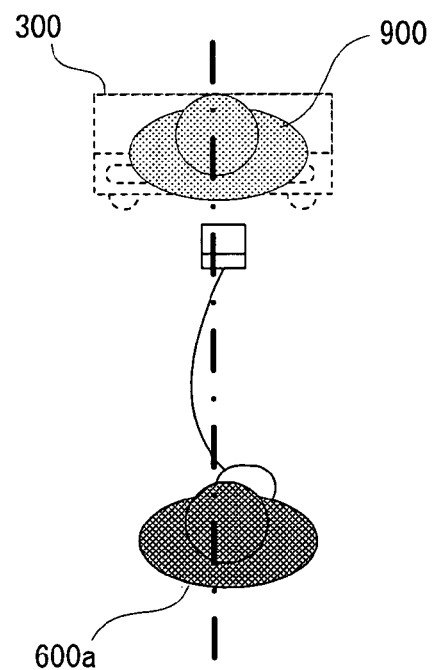

FIG. 20 is a view of a state where only the connector 34a out of the connectors 34a-34d is connected to the connectors 400b for connecting the parent device 300 and the child device 100. In a state where the connectors 34a to 34d are connected to the child devices 100 as shown in FIG. 20, a relation between the facilitator object 900 and the players 600a is as shown in FIG. 21. In this case, with reference to the facilitator object angle table in FIG. 9, a direction (angle) of the player 600a viewed from the facilitator object 900 is 0 degrees.

Figure 22:
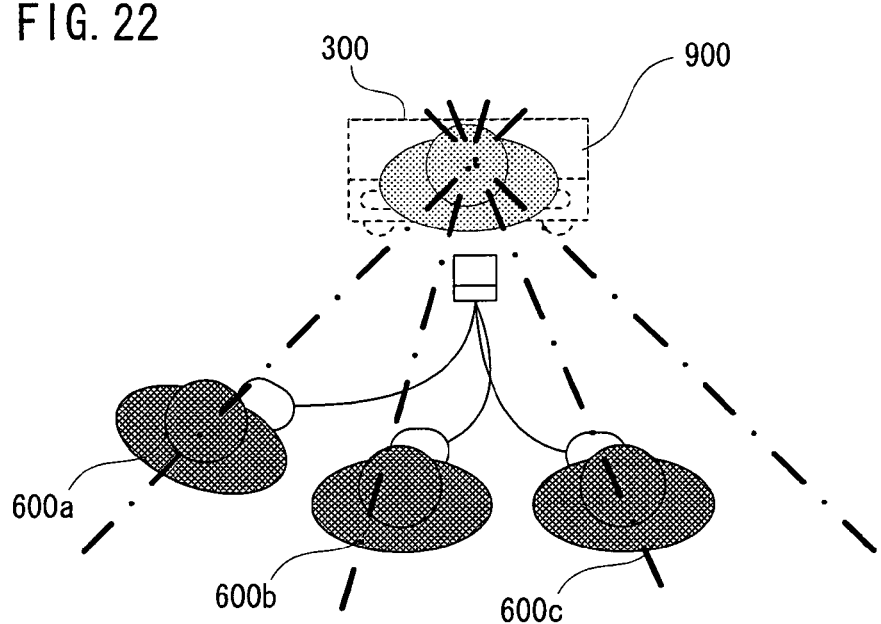
FIG. 22 is an illustrative view showing another exemplary illustrative embodiment of a positional relationship between the facilitator object 900 and the players 600a-600c.
Figure 23:
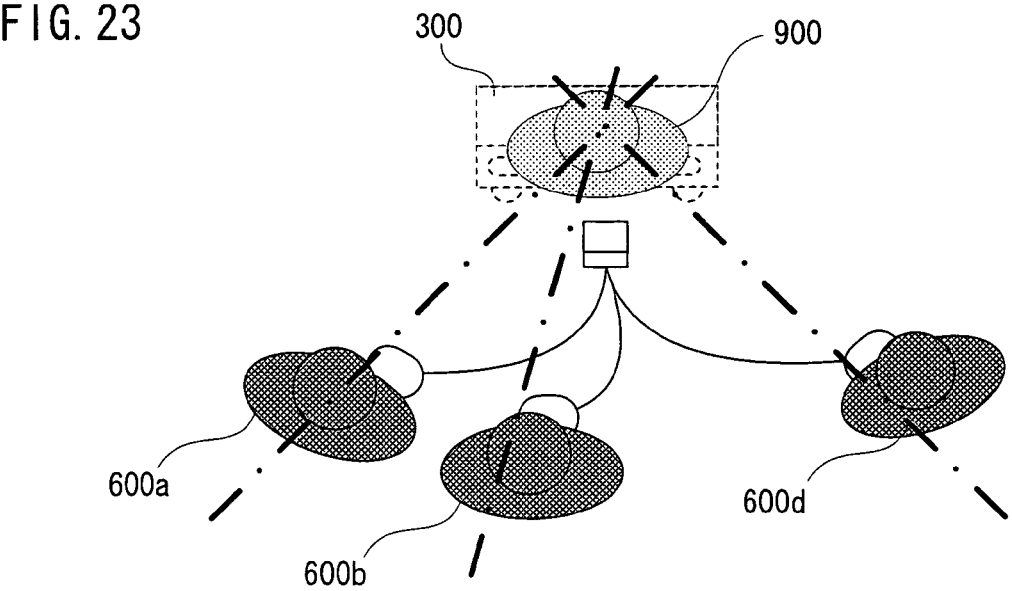
FIG. 23 an illustrative view showing another exemplary illustrative embodiment of a positional relationship between the facilitator object 900 and the players 600a-600c.

FIGS. 22 and 23 show examples of an angle determination method different from the facilitator object angle table in FIG. 9. Describing the difference, regardless of the number of the child devices 100 connected to the parent device 200, a direction of the sight line or eyes of the facilitator object 900 is determined by utilizing an angle when the four child devices 100 are connected. More specifically, if the connector 34a is connected with the child device 100, a direction of the sight line or eyes of the facilitator object 900 turned on the player 600a is −60 degrees. If the connector 34b is connected with the child device 100, a direction of the sight line or eyes of the facilitator object 900 turned on the player 600b is −20 degrees. If the connector 34c is connected with the child device 100, a direction of the sight line or eyes of the facilitator object 900 turned on the player 600c is +20 degrees. If the connector 34d is connected with the child device 100, a direction of the sight line or eyes of the facilitator object 900 turned on the player 600d is +60 degrees. If some connectors out of the connectors 34a-34d are not connected with the child devices 100, indicating that the players corresponding to the connectors do not exist, the facilitator object 900 does not turn its sight line or eyes in the direction corresponding to the players. For example, when the connectors 34a-34c are connected with the child devices 100, by respectively corresponding the angle of −60 degrees, the angle of −20 degrees, and the angle of +20 degrees to the player 600a, the player 600b, and the player 600c, the angles formed by the direction of the sight line or eyes of the facilitator object 900 with respect to each of players is determined. As shown in FIG. 23, if the connectors 34a, 34b, and 34d are connected with the child devices 100, by respectively corresponding the angle of −60 degrees, the angle of −20 degrees, and the angle of +60 degrees to the player 600a, to the player 600b, and to the player 600c, the angles formed by the direction of the sight line or eyes of the facilitator object 900 with respect to each of players are determined.

As described above, an optimal angle table may be selectable depending upon the game apparatus or the game content, and is not limited to the form or the angle (direction) of this exemplary illustrative embodiment. Furthermore, there is no need for preparing one kind of angle table for one game; a plurality of angle tables are prepared and changeable depending on a positional relationship with the player. More specifically, an arrangement selection screen is displayed on the CRT 300. For example, a "straight expansive arrangement", a "straight unexpansive arrangement", and a "fun-like arrangement" are displayed. Then, which arrangement the player would like to select is determined by the operating device 10, and the angle table corresponding to the arrangement is selected. In this case, in the angle table, for the "straight expansive arrangement", an angle between the player 600a and the player 600d is rendered wider, for the "straight unexpansive arrangement", the angle between the player 600a and the player 600d is rendered narrower, and for the "fun-like arrangement", an angle between the player 600a and the player 600b and an angle between the player 600c and the player 600d are rendered narrower than an angle between the player 600b and the player 600c.

Figure 24:
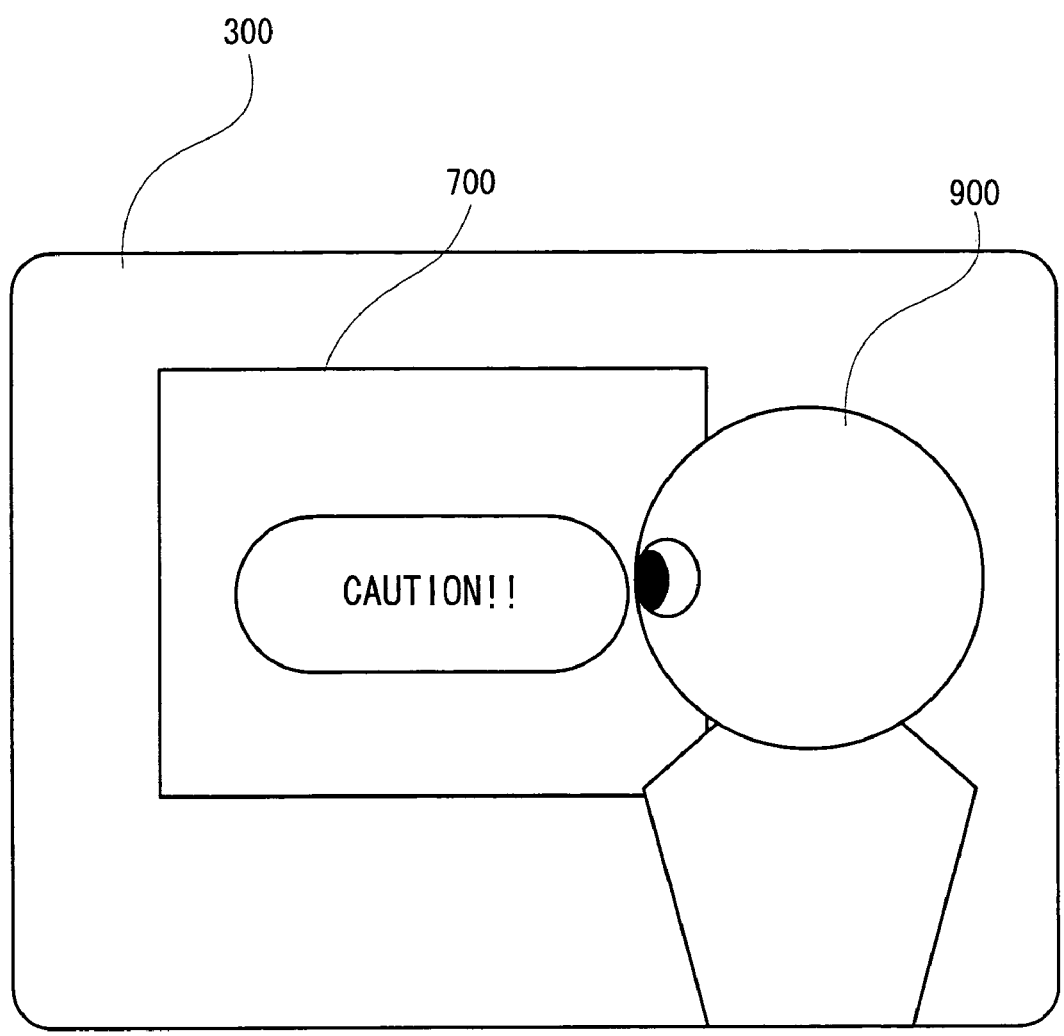
FIG. 24 is an illustrative view showing a display example in which the facilitator object 900 views a direction except for the players.

FIGS. 24 through 27 are examples of another exemplary illustrative embodiment of the facilitator object 900. FIG. 24 is a drawing in which the facilitator object 900 views not the players, but an entire map 700. Thus, the facilitator object 900 sometimes turns to a direction except for the players in correspondence with the progress of the game.

FIG. 25 is a view showing an example in which the facilitator object 900 not only turns his eyes on the players but also changes his body, hands, etc., depending on the player. As shown in an upper drawing in FIG. 25, it is appropriate that the facilitator object 900 is displayed such that he speaks to the player who operates the child device 100 connected to the connector 34a about a message (for example, message to instruct a direction to a next destination), or as shown in a lower view in FIG. 25, it is appropriate that the facilitator object 900 is displayed such that he speaks to the player who operates the child device 100 connected to the connector 34d about a message. In this case, not only are the polygons and the textures of the eyes changed, but also the polygons and the textures of the entire facilitator object 900 are changed.

Figure 26:
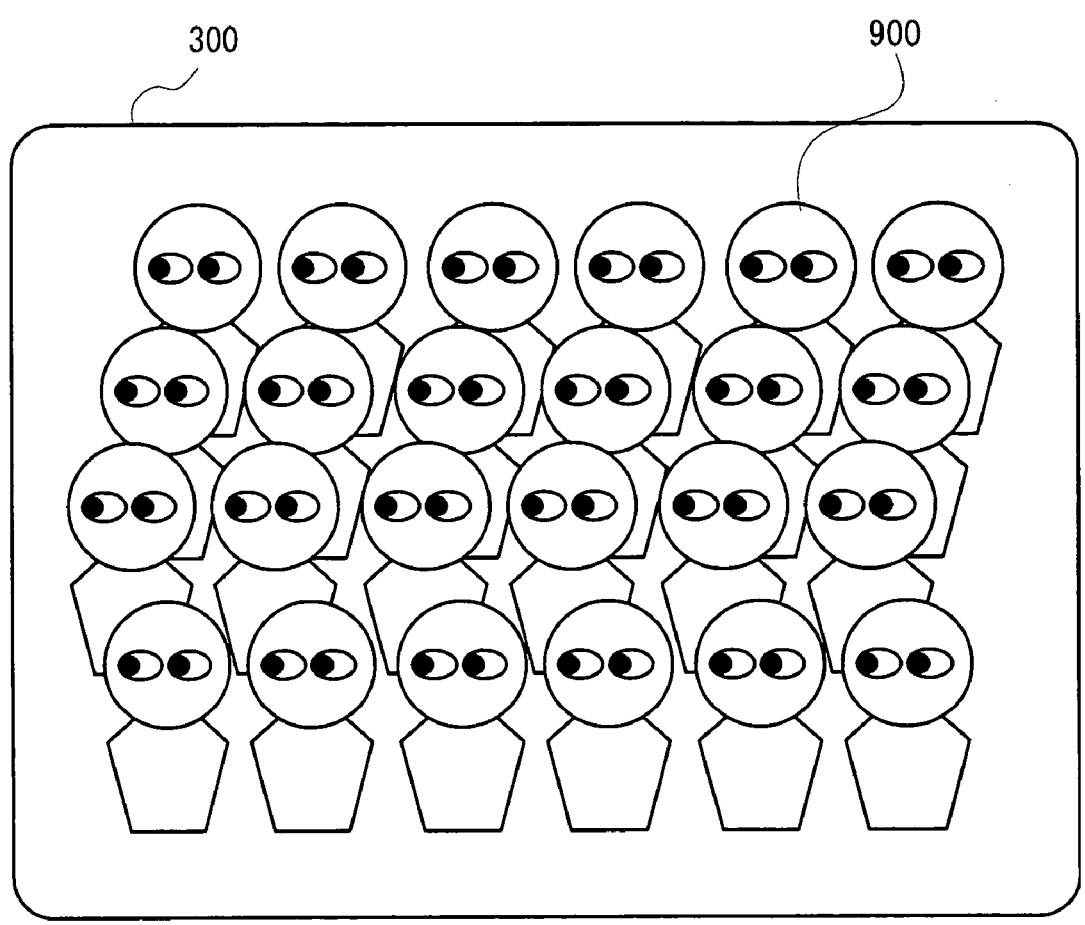
FIG. 26 is an illustrative view showing a display example in which a plurality of facilitator objects 900 turn their eyes to the direction of the player.

FIG. 26 is a display example in a case where a plurality of facilitator objects 900 rather than one facilitator object 900 is prepared. Thus, it is appropriate that the plurality of facilitator objects 900 are prepared, and the sight line or eyes of each of the facilitator objects 900 are changed.

FIG. 27 is a display example in which a target object 920 and a laser object 910 in place of facilitator object 900 are displayed on the CRT 300. This exemplary illustrative embodiment is characterized in that an angle of the sight line or eyes when the facilitator object 900 speaks to the players 600a-600d is changed for each player. On the contrary, FIG. 27 shows an example in which, when the players 600a-600d shoot the laser by operating the child devices, a shooting position of the laser object 910 indicative of a shooting trail of the laser is changed for each player. The upper drawing in FIG. 27 shows a drawing in which the player operating the child device 100 connected to the connector 34a makes an attack with a laser, and the lower drawing in FIG. 27 shows a drawing in which the player operating the child device 100 connected to the connector 34b makes an attack with a laser. Thus, it is appropriate that an object whose angle (direction) is changed for each child device 100 connected to the connectors 34-34d is not limited to the direction of the sight line (eyes) and the body, and the angle of the laser and the angle of another object may be changed.

Returning to FIG. 8, in step S122, the direction of the facilitator object 900 is determined, and then, returning to FIG. 7, the process proceeds to step S130. In step S130, the parent device 200 establishes communication with each of the child devices 100 so as to transmit game program/data for portable game apparatus to each of the child devices 100.

After completion of the transmission processing, name data is transmitted from the child device 100. At this time, a data column or row transmitted from the parent device 200 to the child device 100 (calling the data that is sent and received between the parent device 200 and the child device 100 controller data) is a data column or row shown in the third drawing from the top in FIG. 28. Described in detail, the data column or row is constructed of communication kind ID data D202, data kind ID data D204, program data for child device D206, and object initial position data D208. The communication kind ID data D202 is ID data for indicating from which device the data is transmitted, the child device 100, the parent device 200, or another device. For example, it is appropriate that as the ID data, "00" indicates the child device 100, and "01" indicates the parent device 200. In this case, the data indicates data to be transmitted from the parent device 200. The data kind ID data D204 is data representative of an arrangement for each software. By the data, it is possible to determine how the data column is formatted (arrangement such as the number of bytes, the content of the data, etc.). In this case, the data indicates that the data includes a program for child device and object initial position data. The program data for child device D206 is program data to be executed by the child device 100, such as a player name input program, a game program for playing the game, etc. The object initial position data D208 is data indicative of the initial coordinate positions of the various objects. More specifically, the data indicative of the coordinate position of the player object, the treasure box, the tunnel, etc., is applied.

In step S132, the name data is received from the child device 100 and stored in the each player status area of the RAM 40. At this time, the parent device 200 receives the data column shown in the uppermost drawing in FIG. 28. More specifically, the data column is constructed of communication kind ID data D102, data kind ID data D104, player name and other data D106, and controller identifying number data D108. The communication kind ID data D102 is ID data for indicating that the data is transmitted from the child device 100. The data kind ID data D104 is data indicative of an arrangement for each software, but indicative of including the player name data, etc., in this case. The player name, etc., data D106 is data indicative of the name of the player object (or player). For example, in a case where the player inputs "C" as his name by operating the child device 100, the player name etc., data D106 becomes data indicative of "C". It is appropriate that although as one example, the name is input in this exemplary illustrative embodiment, without directly inputting the name, certain data is received as the player name data D106, and the parent device 200 creates a display or a sound capable of specifying the player. The controller identifying number data D108 is data indicative of an identifying number of the child device 100 connected to the parent device 200. More specifically, the child device 100 stores a unique serial number for each child devices at a stage of manufacture, and transmits the serial number as the controller identifying number data D108.

Next, in step S134, it is determined whether or not the name data is received from all the child devices 100 connected to the parent device 200. When the data is received, the process proceeds to step S136, and when the data is not received, the process returns to step S132 so as to repeat the process of step S132 until the name data of all the child devices 100 are received.

In step S136, the player number (PN) variable is set to 1. Then, in step S140, an eyes changing processing is performed. The process is described in FIG. 29 in detail below. Then, it is determined whether or not the PN is 4 in step S150. If the PN is equal to 4, the game environment construction processing is ended; then, the process proceeds to step S200. If the PN is not equal to 4, the process proceeds to step S152. In step S152, the PN is incremented by one (PN=PN+1), and then, the process returns to step S140 to repeat the process in steps S140-S152. In this exemplary illustrative embodiment, although it is determined whether or not the PN is equal to 4 in step S140, it is preferable that the number of the determinations is changed depending upon the number of the players by determining whether or not the PN is equal to 1 for one player, whether or not the PN is equal to 2 for two players, whether or not the PN is equal to 3 for three players, and so forth.

Figure 29:
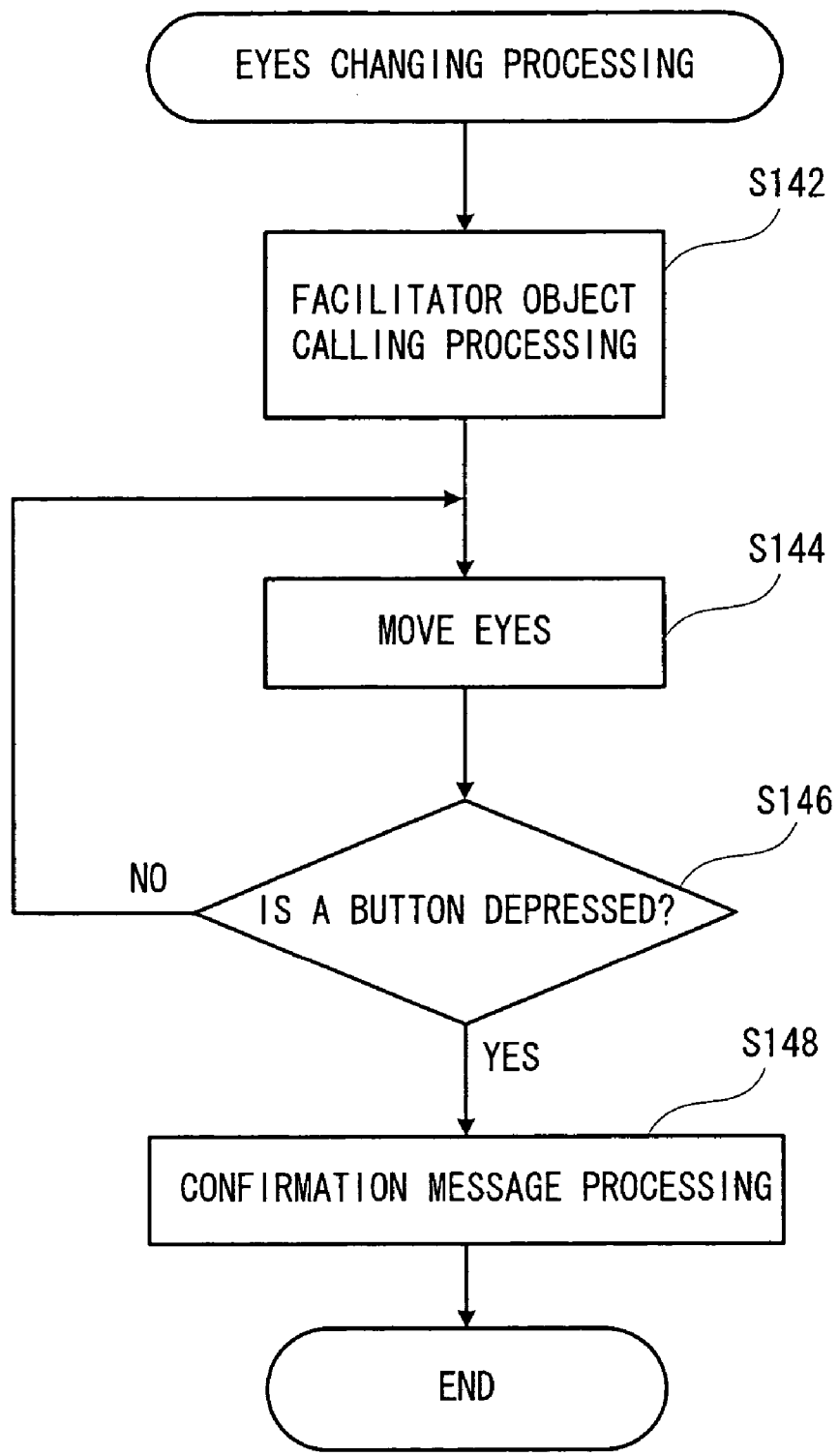
FIG. 29 is a flowchart showing an eyes changing process subroutine in FIG. 7.

The process in step S140 is described in detail in FIG. 29. The CPU 38 instructs the image sound processing unit 42 to output image data for displaying the facilitator object 900 with his sight line (eyes) turned to a player specified by the player number PN on the CRT 300 in step S142, and instructs the AV processing unit 42 to output to the audio IF 48 sound data for generating a sound message for the player by a speaker 301. More specifically, the CPU 38 determines a direction of the player designated by the player number with reference to a direction table, and changes the facilitator object 900 such that his sight line or eyes is turned to the direction thereby to display the facilitator object 900 on the CRT 300. Then, the mouth of the facilitator object 900 is changed as if he speaks, and the sound message such as "PRESS A BUTTON FOR CONTACT WITH MY EYES" etc., is generated from the speaker 301.

Next, in step S144, the process for moving the sight line (eyes) of the facilitator object 900 right and left is performed. When the sight line moves, it is determined whether or not the player designated by the player number depresses the A button. More specifically, data indicative of an input condition out of the controller data received from the child device 100 operated by the player designated by the player number is detected to determine whether or not the A button is depressed. If the A button is depressed, the process proceeds to step S148 while if the A button is not depressed, the process returns to the step S144 to further move the sight line of the facilitator object 900.

In step S148, the mouth of the facilitator object 900 is changed as if he speaks, and the sound message (e.g., the player number is 1, "YES, PLAYER 1 IS CONFIRMED") is generated from the speaker 301. In addition, by considering the direction of the sight line of the facilitator object 900 at a time the A button is depressed as a direction of the presence of the player designated by the player number, a value of the direction table is rewritten.

Figure 7:
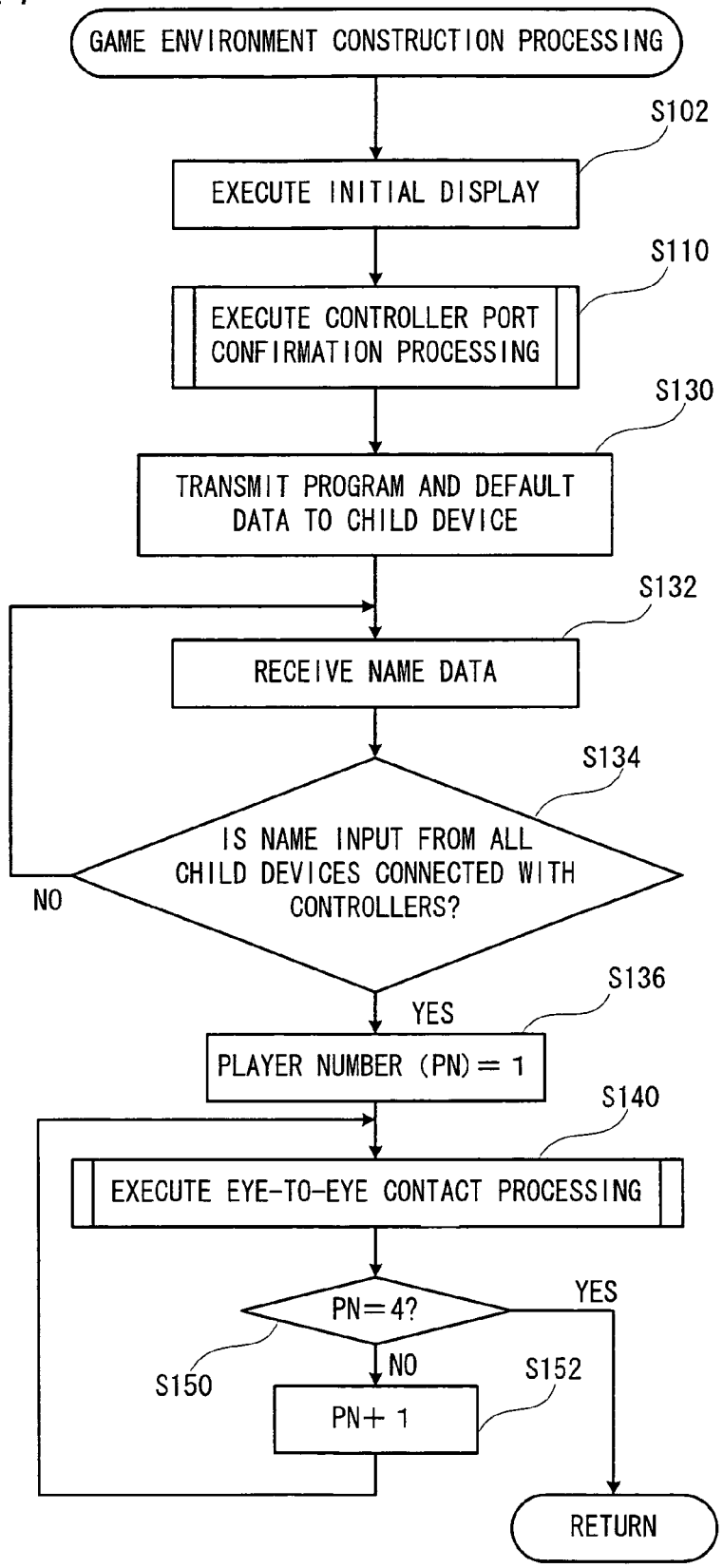
FIG. 7 is a flowchart showing a game environment construction processing subroutine in FIG. 6.

Next, returning to the flowchart in FIG. 7, the process proceeds to step S150. If the PN is equal to 4, the process returns to the flowchart in FIG. 6 so as to proceed to step S200.

Figure 30:
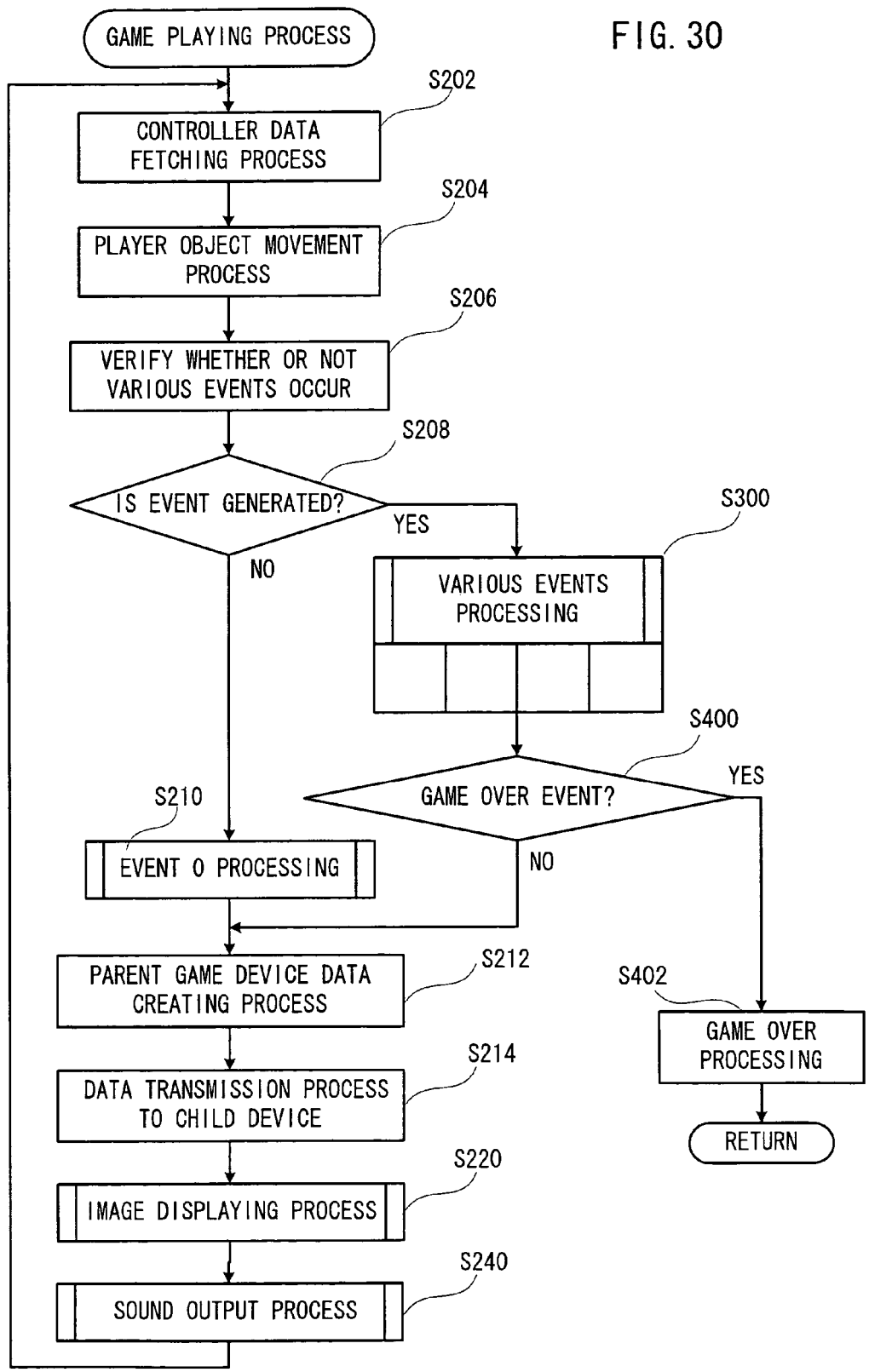
FIG. 30 is a flowchart showing a game playing process subroutine in FIG. 6.

In step S200, the CPU 38 performs a game playing process. More specifically, a description is made by use of FIG. 30. In step S202, a controller data fetching process is performed. More specifically, the data column at the second drawing from the top shown in FIG. 28 is received from each of the child devices 100. The received controller data is stored in the controller data buffer of the RAM 40*a*. The data column 126 is constructed of communication kind ID data D122, data kind ID data D124, operating device data D126, controller additional data D128, and controller identifying number data D130. The communication kind ID data D122 is data similar to the data described in the communication kind ID data D102. The data kind ID data D124 is data similar to the data described in the data kind ID data D104, and data indicating that the operation data, the controller additional data, etc., are included in this case. The operating device data D126 is data indicative of the operation condition (e.g., if depressed, 1, and if not depressed, 0, etc.) of the operating device (up button, down button, left button, right button of the cross key 10c, A button 10a, B button 10b, L switch 10l, R switch 10r, select switch, and start switch) of the child device 100. The controller additional data D128 is data indicative of which item is utilized. More specifically, this is data corresponding to an item generated when an item (transceiver, etc.) is selected or determined. Furthermore, if another data except for the item is required, it may be received as the controller additional data. The controller identifying number data D130 is data similar to the data described in the controller identifying number data D108.

In step S204, a player object moving processing is performed. More specifically, on the basis of the operating device data D126 out of the controller data obtained in step S202, if the up button is depressed, the coordinates position of the player object is changed upwardly, if the down button is depressed, the coordinate position of the player object is changed downwardly, if the left button is depressed, the coordinate position of the player object is changed to the left direction, and if the right button is depressed, the coordinates position of the player object is changed to the right direction.

In step S206, it is determined whether or not various events occur. The content of the events is described in detail in FIG. 41 later.

In step S208, if it is determined that the various events occur, the process proceeds to step S300 while if it is determined that the various events do not occur, the process proceeds to step S210. In step S210, an event 0 processing is performed. This is described in detail later.

Next, in step S212, parent data (data columns D222-D230 in FIG. 28) that are different from each other depending on each child device 100 are created on the basis of the controller data (child device data) (data columns D122-D130 in FIG. 28) and a change set in a child device screen changing process of the event processing (FIG. 40: S2106, FIG. 43: S3122, FIG. 45: S3222, FIG. 47: S3320, FIG. 49: S3426, FIG. 51: S3514, FIG. 53: S3618) described below.

In step S214, a data transmission processing of the parent game device data is performed from the parent device 200 to each of the child devices 100. More specifically, as shown in the fourth drawing from the top in FIG. 28 (D222 to D230), the communication kind ID data D222, the data kind ID data D224, the coordinate position data D226, the number of changed content data D228, the changed content data D230 are transmitted to the child device 100. More specifically, the data column is constructed from the data described below, and creates respective data as successive data by the CPU 38 on the basis of a predetermined rule of each data. The communication kind ID data D222 is data similar to the data described in the communication kind ID data D202. The data kind ID data D224 is data similar to the data described in the data kind ID data D204, and data indicating that player object coordinate data, changed content data, etc., are included in this case. The coordinate position data D226 is data indicative of coordinate positions of the player objects 802a-802d in the game space. On the basis of the data, the coordinate position of the player object to be displayed on the LCD 20 of each of the child devices 100 is determined. The number of changed content data D228 indicates how many changed content data to be described next is present. The changed content data D230 is command data to be performed by each child device 100, and is constructed of a number and a factor.

Figure 31:
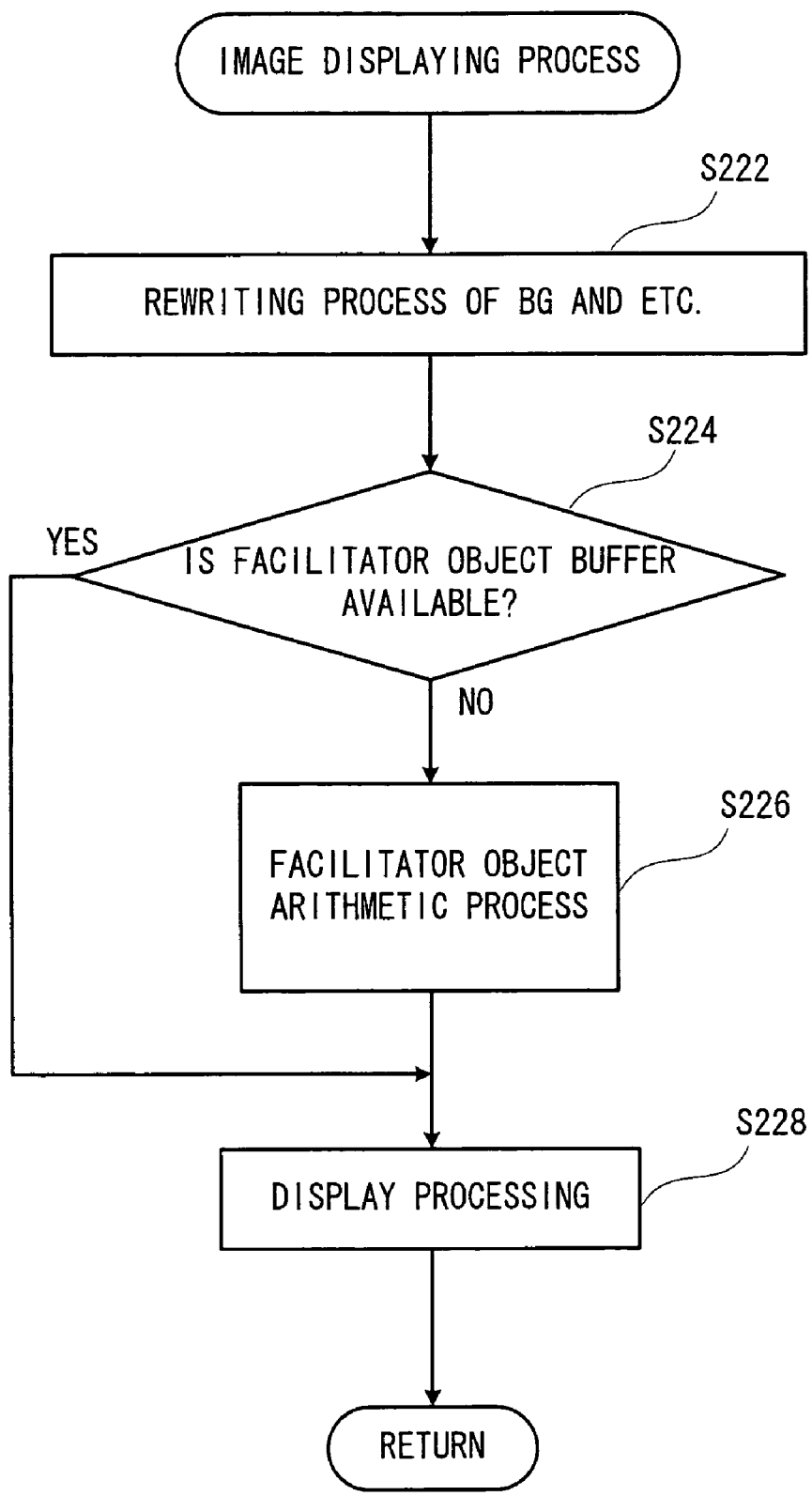
FIG. 31 is a flowchart showing an image displaying process subroutine in FIG. 30.

In step S220, an image displaying process is performed. Describing in detail by use of FIG. 31, the CPU 38 performs a rewrite processing of the BG (background), etc., by outputting an instruction to the AV processing unit 42 in step S222. More specifically, the background object except for the facilitator object 900 is displayed, and the image data for displaying various moving objects including the player objects are created on the basis of the controller data (child device data) received from each child device 100.

In step S224, it is determined whether no data is stored (vacant) or not in the facilitator movement buffer of the buffer area 40a. If the facilitator movement buffer is vacant, the process proceeds to step S228, while if the facilitator movement buffer is not vacant, the process proceeds to step S226. In step S226, a facilitator object arithmetic processing is performed. More specifically, facilitator movement data is obtained from the facilitator movement buffer, and a direction of the body of the facilitator and a facial expression and a direction of the sight line (eyes) of the facilitator object 900 are determined on the basis of the facilitator movement data. In order to form the corresponding facilitator object 900, the coordinates data of the polygons of the facilitator object 900 is determined, and the texture data to be pasted on the polygons is determined. For example, the facilitator object 900 directing its sight line (eyes) to the right as it faces is created by pasting on the part of the eyes of the facilitator object 900 the texture representative of the eyes directed to the right. The facilitator objects 900 having its eyes directed to the front and left directions are also similarly created.

Next, in step S228, the AV processing unit 42 writes to the VRAM 44 the image data for being displayed on the CRT 300, combining the data of the back ground object, the various moving object, and the facilitator object 900 according to an instruction of the CPU 38. The encoder 46 converts the image data written to the VRAM 44 into an image displaying signal to be displayed on the CRT 300 to output it to the CRT 300. After the process in step S328, returning to the flowchart in FIG. 30, the process proceeds to step S240.

Figure 32:
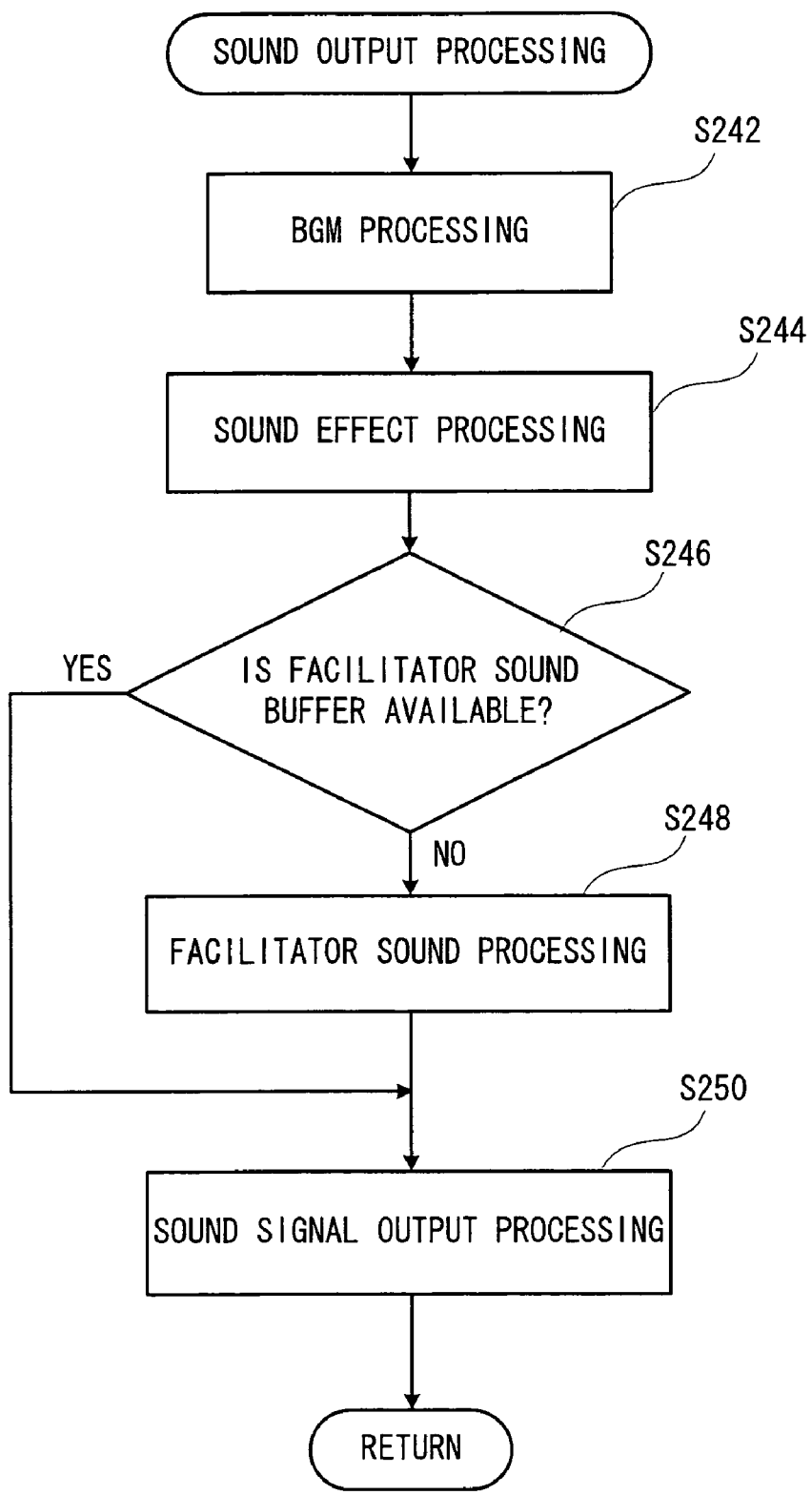
FIG. 32 is a flowchart showing a sound outputting process subroutine in FIG. 30.

In step S240, the CPU 38 instructs the AV processing unit 42 to execute a sound output processing. More specifically, this is described by use of FIG. 32. In step S242, a BGM processing is performed. More specifically, BGM data prepared in a game scene in that situation and for playing-back the BGM from the speaker 301 is read from the BGM buffer so as to be output to a sound output buffer. Then, in step S244, a sound effect processing is performed by reading a sound effect to be sounded in the game scene in that situation from a sound effect buffer to output it to the sound output buffer similarly to the BGM processing.

Next, in step S246, it is determined whether no facilitator sound data is stored in the facilitator sound buffer (vacant in the facilitator sound buffer) or not. If stored, the process proceeds to step S248, and if not stored, the process proceeds to step S250. In step S248, a facilitator sound processing is performed. More specifically, the sound data to be spoken by the facilitator object next is read from the facilitator sound buffer so as to be output to the sound output buffer.

Next, in step S250, a sound output processing is performed. More specifically, the CPU 38 instructs the AV processing unit 42 to output to the audio IF 48 the sound data on the basis of the sound data of the sound output buffer stored in the BGM processing, the sound effect processing, and the facilitator sound processing. The audio IF 48 creates a sound signal to be generated from the speaker 301 on the basis of the input sound data to output it to the speaker 301. After completion of the process in step S250, returning to the flowchart in FIG. 30, the process returns to step S202 so as to repeat the processes in the steps S202-S240.

In a case where the process proceeds from step S208 to step S300, a various events processing is performed in step S300. The event processing is described in detail below.

After completion of the process in step S300, the process proceeds to step S400. In step S400, it is determined whether or not a game over event is generated. If one is not generated, the process proceeds to step S212, whereas if generated, the process proceeds to step S402. In step S402, a process for displaying on the CRT 300 an image indicative of the game over is performed, and a process for outputting to the speaker 301a sound indicative of the game over is performed. Then, the process is returned to FIG. 6 so as to proceed to step S500.

In step S500, the CPU 38 performs an ending process. More specifically, in response to the game over, a process for displaying on the CRT 300 a staff roll and an image for ending is performed, and a process for outputting to the speaker 301a BGM for ending is performed.

After completion of the process in step S500, the CPU 38 performs a retrying process. More specifically, an image such as "RETRY?", "YES OR NO", etc., are displayed on the CRT 300, and it is determined whether or not the game is newly restarted in response to the operation of the operating device 10 by the player. If retried, the process proceeds to step S100 to restart the game while if not retried, the game is ended.

Figure 33:
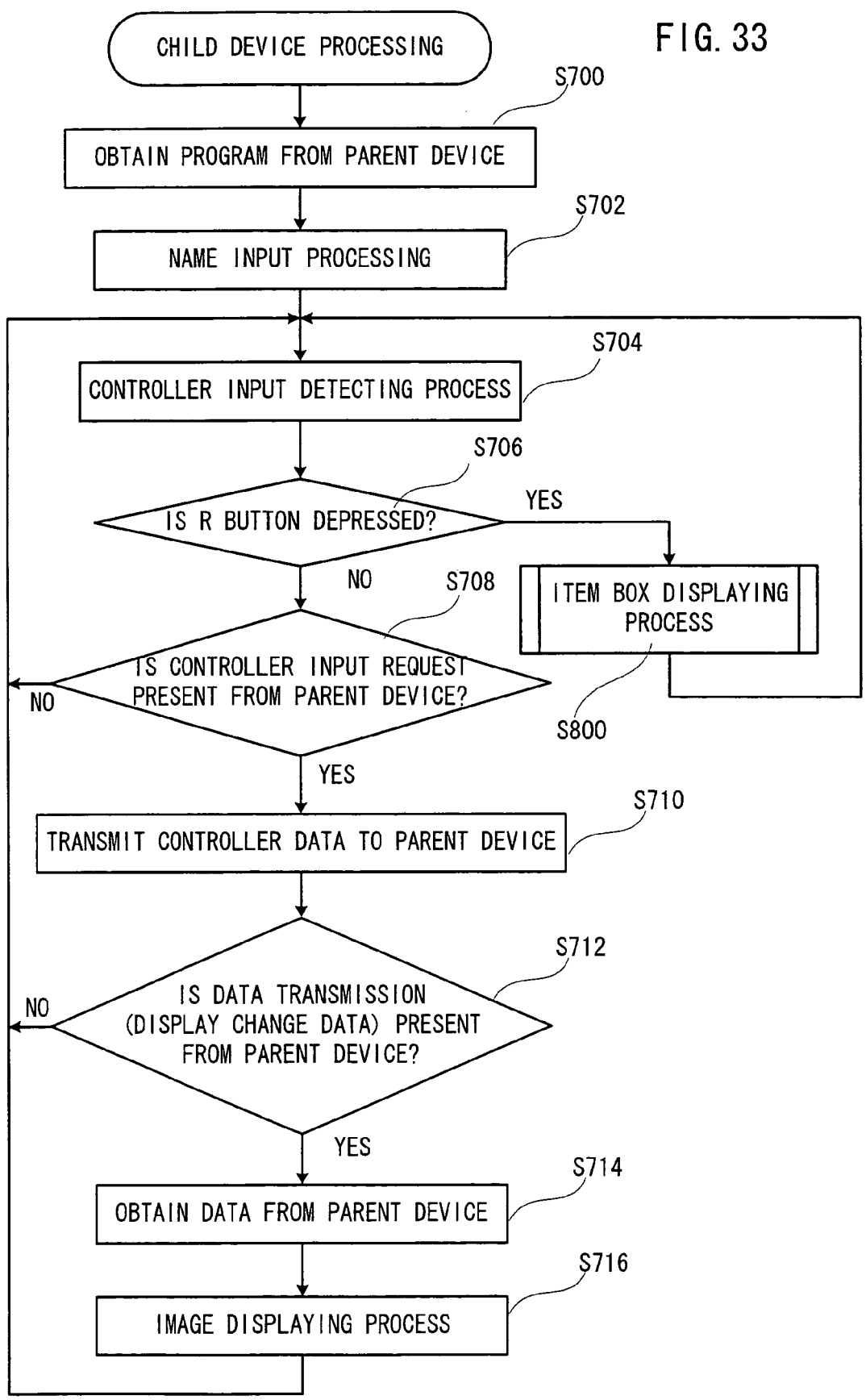
FIG. 33 is a flowchart showing a main routine of one example of the child game device game processing.

Meanwhile, by use of FIG. 33, an operation of the child device 100 is described. In step S700, the game program is received from the parent device 200 to be stored in the game program storing area of the RAM 18. Next, in step S702, the game program stored in the game program storing area is executed to perform a name input processing as a first process. More specifically, the image processing unit 22 is instructed to display a name input screen on the LCD 20 for each child device 100. Viewing the name input screen displayed, the player inputs his name by operating the operating device 10, and then, the name data indicating the input name is transmitted to the parent device 200. The parent device 200 receiving the name data of each child device 100 stores the name data for each player in the each player status storing area of the RAM 40.

In step S704, a controller input detecting process is performed. More specifically, an operating condition of the up, down, left, and right buttons of the cross key 10c, the A button 10a, the B button 10b, the L switch 10l, the R switch 10r, the select switch, and the start switch of the operating device 10 is obtained via the I/O 14 to be stored in the controller data storing area of the RAM 18.

Next, in step S706, it is determined whether or not the R button 10r is depressed, and if not depressed, the process proceeds to step S708.

In step S708, it is determined whether or not an input request is present from the parent device 200. The input request is data indicating that the CPU 38 requests the child device 100 to output the controller data in step S202. If the input request is present, the process proceeds to step S710 while if not, the process returns to step S704.

In step S710, as shown in the data row of the second drawing from the top in FIG. 28 (data row during playing the game out of data transmitted from the child device 100 to the parent device 200), the communication kind ID data D122, the data kind ID data D124, the operating device data D126, the controller additional data D128, and the controller identifying number data D130 are transmitted to the parent device 200 via the I/O 14, the connector 12, the cable 400 and the connector 400b. The CPU 38 of the parent device 200 receives the data output from the connector 400b via the connector 34 and the I/O 36.

In step S712, it is determined whether or not display changing data is output from the parent device 200. The display changing data is data indicating that the CPU 38 requests the child device 100 to change the display in step S214. When the display changing data is received, the process proceeds to step S714, while when not received, the process returns to step S704.

In step S714, as shown in the data row at the bottom of FIG. 28 (the data row during playing the game out of the data from the parent device 200 to the child device 100), the communication kind ID data D222, the data kind ID data D224, the coordinates position data D226, the number of changed content data D228, one or plurality of the changed content data (number+factor) D230 are received from the parent device 200 via the connector 400b, the cable 400, the connector 400a, the connector 12, and the I/O 14. At this time, the CPU 38 of the parent device 200 outputs the data to the connector 400b via the I/O 36 and the connector 34.

Next, in step S716, a screen displaying process is performed. More specifically, the CPU 16 instructs the image processing unit 22 to cause the LCD driver 26 to output the image data stored in the VRAM 24 and to display on the LCD 20 a game screen on which the display changing data (parent device data) received in step S714 is reflected. After completion of the process in step S716, the process returns to step S704 to repeat the process in steps S704-S716.

Figure 34:
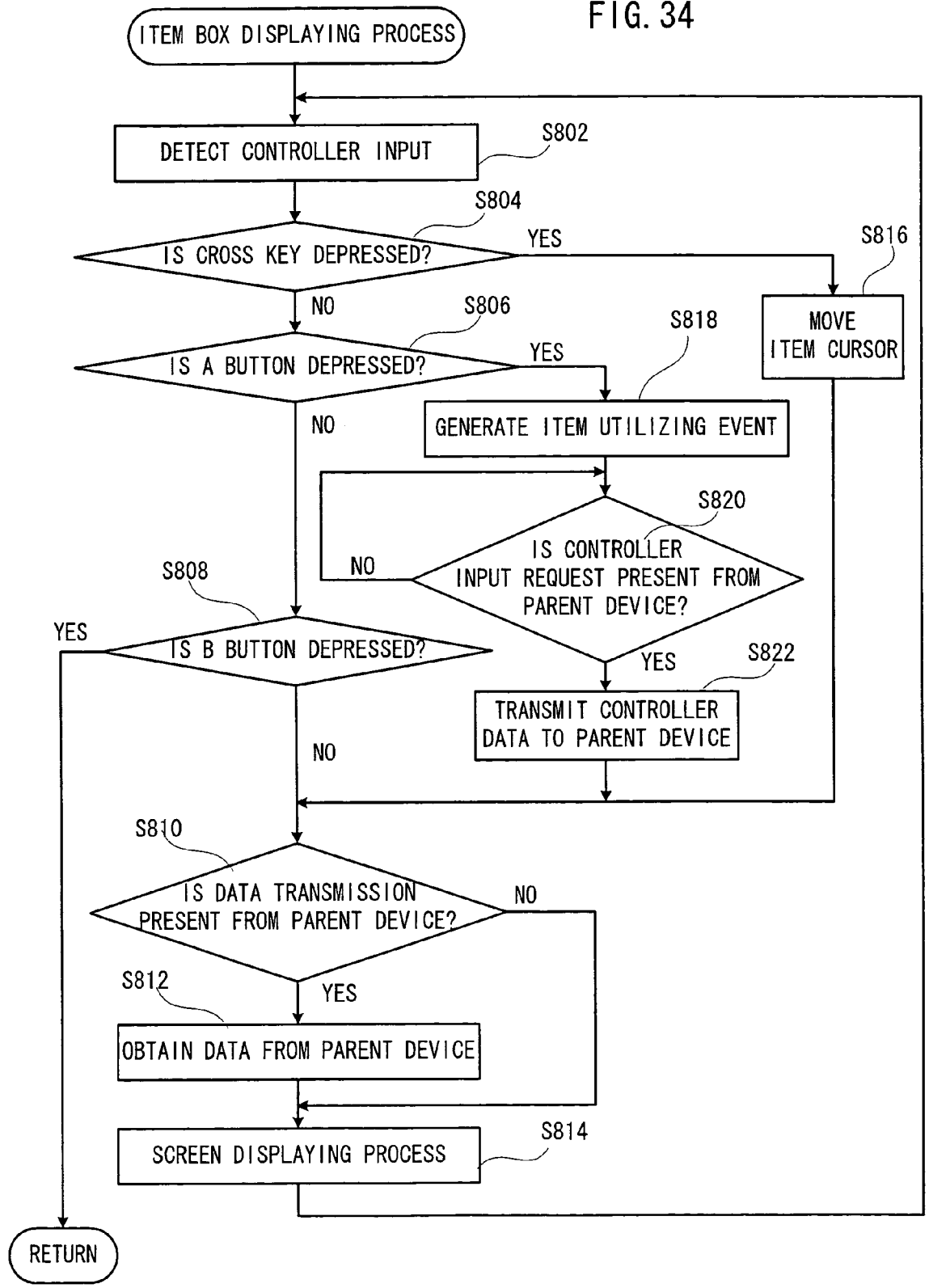
FIG. 34 is a flowchart showing an item box displaying process subroutine in FIG. 33.

On the other hand, in a case where the R button 10R is depressed in step S706, the process proceeds to step S800 so as to perform an item (treasure) box displaying process. More specifically, an operation of the CPU 16 is described in detail by use of FIG. 34.

In step S802, a controller input detecting process is performed similarly to step S704. Next, in step S804, it is determined whether or not the cross key 10c is depressed by the player, and if not depressed, the process proceeds to step S806. More specifically, it is determined whether or not any one of the up button, the down button, the left button, and the right button of the cross key 10c is depressed from the controller data detected in step S802.

In step S806, it is determined whether or not the A button 10a is depressed by the player, and if not depressed, the process proceeds to step S808. More specifically, it is determined whether or not the A button 10a is depressed from the controller data detected in step S802.

In step S808, it is determined whether or not the B button 10b is depressed by the player. If not depressed, the process proceeds to step S810 while if depressed, the process returns to the flowchart in FIG. 33 so as to execute the process in step S704. More specifically, it is determined whether or not the B button 10b is depressed from the controller data detected in step S802.

In step S810, an operation as in step S712 is executed. In step S812, an operation as in step S714 is executed. Next, in step S814, an operation as in step S716 is executed. Then, the process returns to step S802 to execute the process of step S802 and the subsequent steps.

On the one hand, in a case where it is determined that the cross key 10c is depressed in step S804, the process proceeds to step S816. In step S816, a cursor displayed at any one of a plurality of items is moved in response to an input of the cross keys 10c. For example, assuming that five items are displayed in a single row and the cursor is displayed at the third from the right, in a case where the right button of the cross key 10c is depressed, the cursor is moved to the right by one. That is, the cursor is displayed at the second item from the right. Furthermore, in a case where the left button is depressed, the cursor is moved to the left by one. After completion of the process in step S816, the process then proceeds to step S810.

On the other hand, in a case where it is determined that the A button 10a is depressed in step S806, the process proceeds to step S818. In step S818, an item utilizing event is generated. More specifically, taking a case of utilizing a transceiver item as one example, the item utilizing event displays on the LCD 20 an image indicative of a state where radio wave is sent from the transceiver when the player depresses the A button 10a to select the transceiver.

Next, in step S820, an operation as in step S708 is executed.

Then, in step S822, an operation as in step S710 is executed, and the process proceeds to step S810. If the transceiver item is utilized, data of the transceiver item is transmitted to the parent device 200 as the controller additional data in step S822. Thereupon, the facilitator object 900 on the CRT 300 of the parent device 200 is displayed as if he speaks to output a sound indicative of a hint of the game to be performed next by the player from the speaker 301 to the player who selected (utilized) the transceiver item. Furthermore, in step S812, a hint image to be displayed on the LCD 20 is received from the parent device 200.

As described above, the process from steps S802-S822 is repeated until the B button is depressed.

With reference to FIGS. 35 to 38, a display example of a game to be performed in the game system is described.

Figure 35:
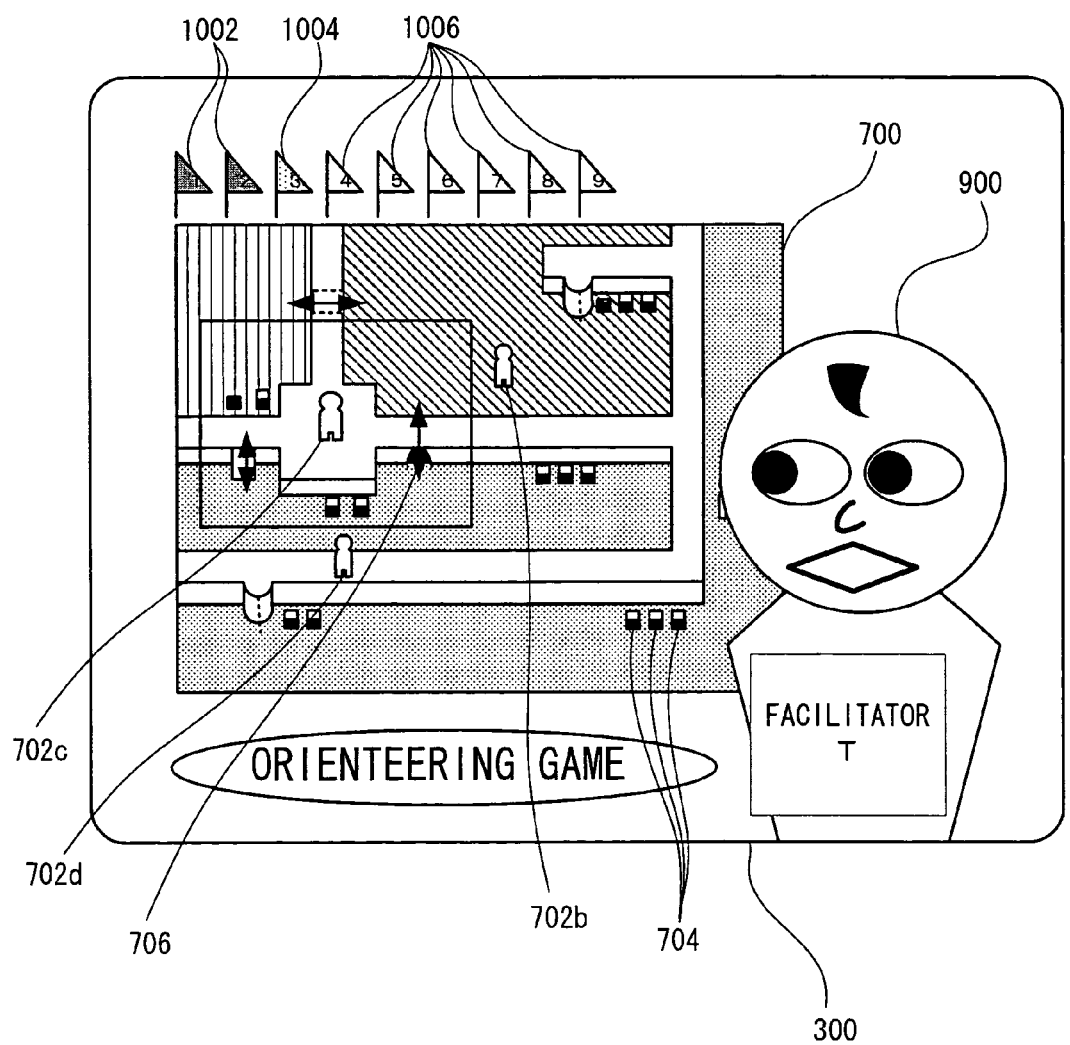
FIG. 35 is an illustrative view showing one example of a common screen to be displayed on the CRT.
Figure 36:
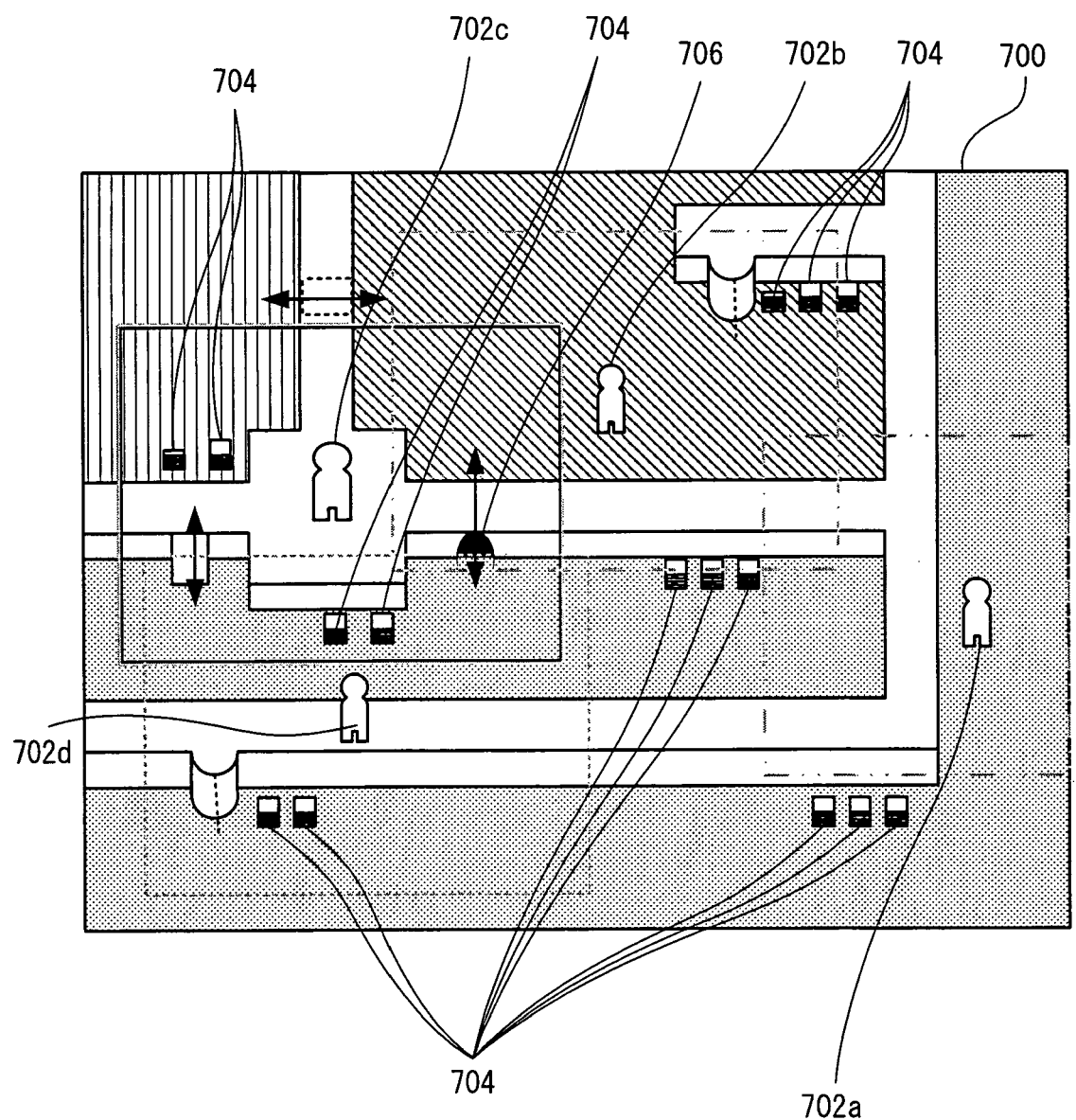
FIG. 36 is an illustrative view showing one example of an entire map.

FIG. 35 shows one example of the common game screen (hereinafter, referred to as "common screen") to be displayed on the CRT 300. FIG. 36 shows one example of the entire map 700 to be displayed on the common screen of the CRT 300. FIG. 37 shows one example of the individual game screen (hereinafter, referred to as "individual screen") 800 to be displayed on the LCD 20 of each child device 100 operated by each of the players 600a-600d. More specifically, FIG. 37 (a) shows one example of the individual game screen 800 to be displayed on the child device 100 of the top player in the ranking. FIG. 37 (b) shows one example of the individual game screen 800 to be displayed on the child device 100 of the last player in the ranking. FIG. 38 shows one example of a display level to be displayed on each of the individual game screen in correspondence to the ranking of each of the players. Specifically, FIG. 38 (a) shows a standard and displays 1 to 6 for each display level, and FIG. 38 (b) a displayed content of the standard and the displays 1 to 6.

On the common game screen shown in FIG. 35, the entire map 700, the facilitator object 900, and flags 1002, 1004, 1006 are displayed.

On the entire map 700, as shown in FIG. 36, player objects 702a-702d that are respectively operated by players 600a-600d participating in the game are displayed on the basis of the respective coordinates positions, and treasure boxes 704 and tunnels 706 are displayed as necessary.

Flags 1002 indicative of the first flag and the second flag are flags that have been obtained by the player 600a, for example, and displayed in a color (e.g., red) corresponding to the player object 702a in order to indicate that these are obtained by the player 600a. A flag 1004 indicative of the third flag is a flag obtained by the player 600b, for example, and displayed in a color (e.g., yellow) corresponding to the player object 702b in order to indicate that it is obtained by the player 600b. Flags 1006 are flags that have not yet been obtained by any player, and displayed in a color (e.g., white) in order to indicate not obtained.

Thus, when the flag is obtained, the flag is displayed in a color corresponding to the player object that has obtained the flag, and therefore, it is possible to simply display which flag is obtained by which player.

It is noted that a displaying method of the obtained flag is not limited to a color. For example, a name, an ID, a symbol, an image, etc., corresponding to the obtained player object is displayed at the corresponding flag.

Furthermore, on the common screen in FIG. 35, a ranking point (score) of each player object having obtained is displayed as necessary.

On the individual screen 800 shown in FIG. 37, a display range different for each of the players 600a-600d is displayed. More specifically, on the individual screen of the child device operated by the player 600a, a map within a predetermined range rendering the player object 802a (the same as the player object 702a) the center is displayed. Similarly, on the individual screens of the players 600b-600d, maps within the predetermined range rendering the player objects 802b-802d (the same as the player objects 702b-702d) at the center are respectively displayed. On the individual display screen 800, the displaying range is changed in correspondence to the movement of each of the player objects 802a-802d. Furthermore, the individual screen 800 has different information to be displayed depending upon the ranking of each of the players 600a-600d. For example, FIG. 37 (a) is one example of the individual screen 800 in a case where the player 600c is ranked first, and FIG. 37 (b) is one example of the individual screen 800 in a case where the player 600c is the ranked last.

On the individual screen 800 of the player 600c shown in FIG. 37 (a), the player object 802c is displayed at the center, and the treasure box 804, the tunnel 806, etc., are displayed within the displaying range and at the viewable position.

On the other hand, on the individual screen 800 of the player 600c shown in FIG. 37 (b), a glass passage 808, a hidden treasure box 810, an arrow 812a indicative of a direction of presence of the player 600a, an arrow 812b indicative of a direction of presence of the player 600b, an arrow 812d indicative of a direction of presence of the player 600d, a mark 814 informing closeness of the flag to be aimed, a message 816 describing a direction of presence of the treasure box to be aimed, and an arrow 818 indicative of a direction of presence of a flag to be aimed that are hint information of supporting the progress of the game are displayed in addition to the treasure box 804 and the tunnel 806 displayed in FIG. 37 (a).

Herein, with reference to FIG. 38, a description is made of a display level to be displayed on the individual screens 800 shown in FIGS. 37 (a) and 37 (b).

FIG. 37 (a) is an example of the individual screen in a case of display level 1. FIG. 37 (b) is an example of the individual screen in a case of display level 6. As shown in FIG. 38 (a), six display levels 1-6 are present, and display level 1 is displayed when no event occurs, where only the standard display is displayed. Display level 2 is displayed on the individual screen of the player in the first ranking when an event 4 later described occurs, where the standard display and display 1 are displayed. Display level 3 is displayed on the individual screen of the player in the second ranking when the event 4 occurs, where the standard display, display 1, display 2, and display 3 are displayed. Display level 4 is displayed on the individual screen of the player in the third ranking when the event 4 occurs, where the standard display, display 1, display 2, display 3, and display 4 are displayed. Display level 5 is displayed on the individual screen of the last player in the ranking when the event 4 occurs, where the standard display, display 1, display 2, display 3, display 4, and display 5 are displayed. Display level 6 is displayed on the individual screen of the last player in the ranking when the event 2 occurs, where the standard display and all of displays 1-6 are displayed.

With reference to FIG. 38 (*b*), a description is made of the displayed content of each of the respective standard display and displays 1-6. The standard display is for displaying a normal individual screen, and corresponds to a display state in FIG. 37 (*a*). Displays 1-6 are for displaying support information to support the progress of the game. Specifically, display 1 is for making a normally invisible glass passage on the water visible. In FIG. 37 (*b*), a glass passage 808 corresponding to display 1 is displayed. Display 2 is for making a normally invisible hidden treasure box on a different floor visible. In FIG. 37 (*b*), the hidden treasure box 810 corresponding to display 2 is displayed. Display 3 is for displaying an arrow indicative of a direction of presence of another player as a competitor. In FIG. 37 (*b*), an arrow 812*a* indicative of the direction of the player 600*a*, an arrow 812*b* indicative of the direction of the player 600*b*, and an arrow 812*d* indicative of the direction of the player 600*d* are displayed. These arrows 812*a*, 812*b*, and 812*d* correspond to display 3. Display 4 informs the player of the closeness to the flag to be aimed. In FIG. 37 (*b*), a mark 814 informing of being closer to the flag to be aimed is displayed, and the mark 814 corresponds to display 4. Display 5 is for displaying a message describing a direction of presence of the treasure box to be aimed. In FIG. 37 (*b*), a message 816 describing a direction of presence of the treasure box to be aimed is displayed, and the message 816 corresponds to display 5. Display 6 is for displaying an arrow 818 indicative of the direction of the flag to be aimed. In FIG. 37 (*b*), the arrow 818 indicative of the direction of the flag to be aimed is displayed, and corresponds to display 6.

Thus, the support information is individually displayed depending upon the ranking of each player, reducing support information to be displayed on the individual screen of the player in the upper ranking, increasing support information to be displayed on the individual screen of the last player in the ranking, and so forth. Furthermore, by individually displaying the support information being advantageous for the player in the lower ranking, it is possible to create a competitive game state where the respective players are closer to one another in the ranking, capable of increasing the interest of the game.

In the above description, although a description is made relating to an example of changing the display level of each of the individual screens on the basis of the ranking of each of the players in a case where a specific event occurs, the display level of the individual screen may be changed depending upon the ranking of each of the players even in a case where the specific event does not occur, i.e., in a normal case. Furthermore, the display level of the individual screen may be changed on the basis of the possessed item (the number and the kind) of each player object and occurrence of the event (times, ordering, timing, state). In addition, although the player objects 702*a*-702*d* to be displayed on the common screen 700 and the player objects 802*a*-802*d* to be displayed on the common screen 800 are illustrated as the same image, these may be illustrated as different images. For example, the player objects 702*a*-702*d* displayed on the common screen 700 are an enlarged image of a face, and the player objects 802*a*-802*d* to be displayed on the individual screen 800 are images representative of an entire body.

Figure 39:
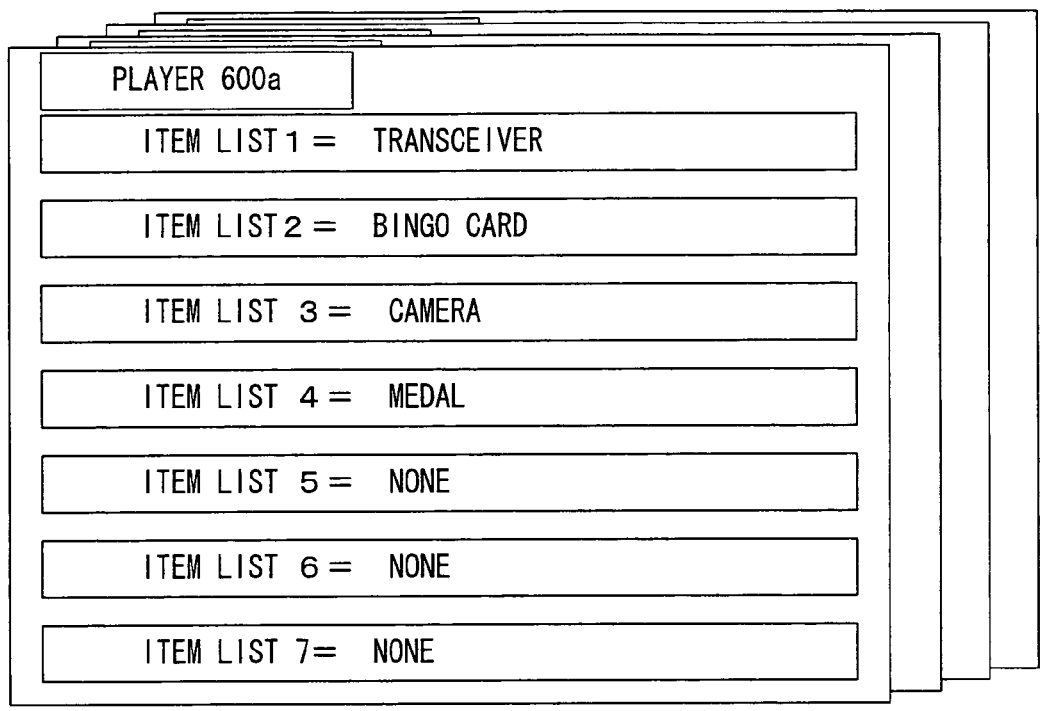
FIG. 39 is an illustrative view showing one example of a carried item's list of the player.

FIG. 39 is an illustrative view showing one example of an item list possessed or carried by each player. As shown in FIG. 39, each player can possess up to seven items. For example, the player 600*a* possesses four items, a "trans- ceiver", a "bingo card", a "camera", and a "medal", and the respective items are stored in item lists 1-4.

With reference to FIG. 40, an event 0 processing in step S210 is described in detail. The event 0 process is a process to be normally executed in response to an operation of each player. In an event table, mainly, four processes of a status changing process, a sound processing for parent device (hereinafter, referred to as "parent device sound processing"), a screen processing for the parent device (hereinafter, referred to as "parent device screen processing"), and an image changing process for child device (hereinafter, referred to as "child device screen changing process") are performed. Furthermore, in the parent device sound processing, three processes of a facilitator sound changing processing, a sound effect generating processing, and a BGM changing processing are performed. In the parent device screen processing, two processes of a facilitator operation processing and another screen processing (screen processing except for the facilitator object 900) are performed. In an event table 0, three processes of a status changing processing, a parent screen processing, and a child device screen changing processing are performed.

More specifically, in the status changing processing shown in step S2100, controller input information of each player and coordinate positions of each player object based on the controller input information are changed. In the facilitator object operation processing shown in step S2102, the facilitator operation buffer 40*a* is set to an available state. At this time, the image of the facilitator object 900 to be displayed on the common screen of the CRT 300 is displayed so as to look at the front (0°). In this case, the facilitator object 900 turns to the front (vertically forward to the CRT 30) irrespective of a direction set for each player. In another screen processing shown in step S2104, displayed positions of all player objects 702*a*-702*d* in the entire map 700 displayed on the common screen are displayed on the basis of the coordinates of each player object status 40*b*, 18*a* of the respective player objects 702*a*-702*d*. In the child device screen changing processing shown in step S2106, an individual screen having the displaying range rendering the coordinates position of each of the player objects 702*a*-702*d* the center is set.

Next, with reference to FIGS. 41 through 53, the processing of various events in step S300 is described in detail. As shown in FIG. 41, for example, a various events occurring condition is six in all in this exemplary illustrative embodiment. In step S206, it is determined whether the various events occur. When it is determined that at least one or more event occurs in step S208, corresponding event processing is performed in step S300.

It is noted that the determination of the event occurring condition may be change independent of the progress of the game. For example, the event 2 may be set to refer to the event table before the final stage of the game, but not to refer to the event table at the final stage. In this case, the event 2 never occurs at the final stage of the game.

An event generating condition is as follows. When the first flag is obtained by any player object, an event 1 (208*a*) is generated. In a case where a ranking point between the player in the first ranking and the last player in the ranking is equal to or more than a 100 point spread, and the condition has not yet occurred, an event 2 (208*b*) is generated. When a bonus time for helping a player in the lower ranking occurs, an event 3 (208*c*) is generated. The bonus time occurs every predetermined time period, for example. When a special event time occurs, an event 4 (208*d*) is generated. The special event time occurs every arbitrary setting time, for example. When the last flag is obtained by any player object, an event 5 (208*e*) is generated. When the transceiver is used by any player, an event 6 (208*f*) is generated.

The above-described events 1 (208*a*)-5 (208*e*) are determined by the CPU 38 on the basis of the game program for video game apparatus 30*a*, and the event 6 (208*f*) is determined by the CPU 38 on the basis of an operation input from the child device 100.

Figure 42:
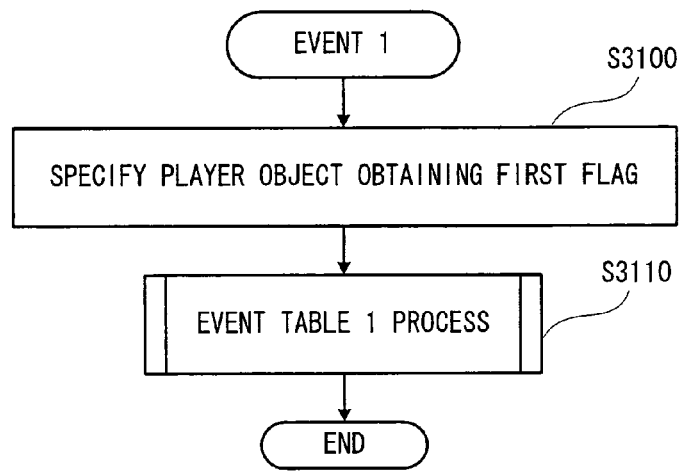
FIG. 42 is a flowchart showing one example of an events processing subroutine in FIG. 30.

First, with reference to FIGS. 42 and 43, a process of the event 1 is described. When the first flag is obtained by any player object, by determining that the event 1 (208*a*) is generated in step S208, the process in event 1 is performed in step S300. A description is made on a case that the first flag is obtained by the player 600*a*.

The CPU 38 executes a following process on the basis of the game program for video game apparatus 30*a*. That is, in step S3100, the player object obtaining the first flag is specified. In the succeeding step S3110, an event table 1 processing is performed.

With reference to FIG. 43, a description is made on the event table 1 processing in detail. The CPU 38 executes a following process. That is, in step S3112, a status changing process is performed. Here, the possessor of the first flag in the flag status 40*d* and 18*c* is changed to the player 600*a*, and the ranking point in the player object status 40*b* and 18*a* of the player object 702*a* (802*a*) is added with 10 points.

Herein, the ranking point is simply described. The ranking point is a point for deciding a ranking indicative of the progress of the game of each player, and one who has the greatest number of points becomes the first, and one who has the smallest number of points becomes the last. A ranking point is added every time that a flag is obtained, an item is obtained, and so forth. For example, 10 points are added when the first flag is obtained, and 5 points are added when the item is obtained. Furthermore, an allocation is made such that the later the flag is obtained, the greater the number of points is added. For example, the number of points to be added when the first flag is obtained is 10 points while 50 points are added when the fifth flag is obtained, and 90 points are added when the ninth flag is obtained. Thus, since the number of the ranking point to be obtained is greater as the game progresses, even if the difference in the ranking point between the player in the first ranking and the last player in the ranking is spread, the last player in the ranking can come back by one chance, capable of increasing interest in the game.

In a facilitator sound changing process in step S3114, a message 1 is set to the facilitator sound buffer 40*a*. For example, a message indicative of "CONGRATULATIONS, 600*a*. YOU GOT THE FIRST FLAG." In a sound effect generating process in step S3116, a sound effect 1 (flag obtaining fanfare) is set in the sound effect buffer 40*a*. In a facilitator operation processing in step S3118, a facilitator operation pattern 1 is set in the facilitator operation buffer 40*a*. As the facilitator operation pattern 1, an image in which the facilitator object 900 turns his sight line (eyes) on the player 600*a* that obtains the flag and smiles at him is selected. More specifically, in a four-player game, the facilitator object 900 turns his sight line shown in the uppermost drawing in FIG. 13 with respect to the player 600*a* who plays the game by connecting his child device 100 to the connector 34*a* and is displayed smiling. In another screen processing in step S3120, the color of the first flag is changed to the color of the player object that obtains the first flag. The respective player objects 702*a*-702*d* (802*a*-802*d*) are illustrated in different colors, and the color of the first flag is changed to the color of the player object 702*a* (802*a*).

In step S3122, a child screen changing processing is performed. First, a flag indicating that an effect 1 is performed on the individual screen of the child device 100 operated by the player 600*a* that has obtained the first flag is set. Here, the effect 1 is a process for displaying a message of "CONGRATULATIONS" for five seconds. Next, the number of obtained flags to be displayed on the individual screen is set to be renewed with respect to all the child devices 100. Then, the color of the flag displayed on the individual screen is set to be renewed with respect to all the child devices 100.

It is noted that a BGM changing processing is not performed in the event table 1 processing.

Although a process in a case where the player object 702*a* (802*a*) obtains the first flag is described in the above description, the same process is performed in a case where another player object obtains another flag. For example, in a case where the player object 702*b* (802*b*) obtains the second flag, a message indicative of "CONGRATULATIONS, 600*b*. YOU GOT THE SECOND FLAG." is set to the facilitator sound buffer 40*a* in step S3114, and the color of the second flag is changed to the color of the player object 702*b* (802*b*) in step 3120. Another step is performed in the same manner as the above description.

Figure 44:
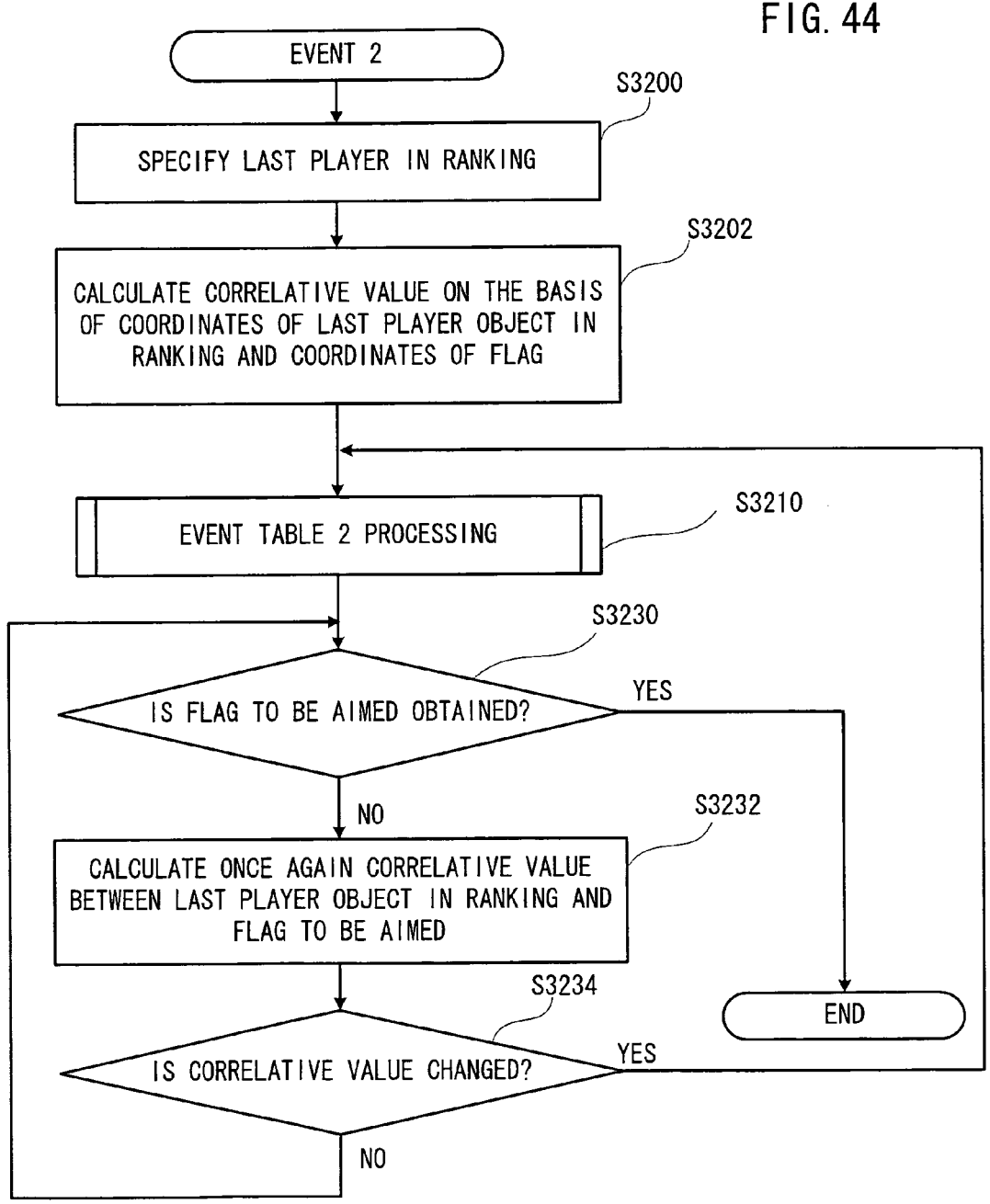
FIG. 44 is flowchart showing another example of the various events processing subroutine in FIG. 30.

Next, with reference to FIGS. 44 and 45, a process of the event 2 is described. In a case where a ranking point between the player in the first ranking and the last player in the ranking is equal to or more than a 100 point spread, and the condition occurs for the first time, by determining that the event 2 (208*b*) occurs in step S208, the process of the event 2 is performed in step S300. Here, a description is made on a case where the player 600*a* is the last in the ranking, and is spread from the player in the first ranking by 100 points or more.

With reference to FIG. 44, the CPU 38 executes a following processing on the basis of the game program for video game apparatus 30*a*. That is, in step S3200, the last player in the ranking is designated (specified). More specifically, the last player 600*a* in the ranking is specified by detecting the ranking points in the each player object status 40*b*, 18*a* and comparing them. In step S3202, a correlative value is calculated on the basis of the coordinates position (40*b*, 18*a*) of the last player object in the ranking 702*a* (802*a*) and a coordinates position (40*d*, 18*c*) of the flag to be obtained next. Here, the correlative value indicates a bearing or a direction of the position of the flag viewed from the position of the player object. For example, as the correlative value, there are data corresponding to the "east", "west", "south", "north", "southeast", "southwest", "northeast", "northwest", etc., that indicate a direction of the flag to be obtained next when viewed from the player object. In the following step S3210, an event table 2 processing is performed.

With reference to FIG. 45, a description is made of the event table 2 processing in detail. The CPU 38 executes the following process. That is, a status changing process is performed in step S3212. Here, the correlative value calculated in step S3202 is set to the correlative value status 40*f* and 18*e*. As shown in FIG. 37 (*b*), in a case where the flag to be obtained next is present in the northwest when viewed from the player object, data corresponding to the "northwest" is set as the correlative value.

In a facilitator sound changing process in step S3214, a message 2 based on the set correlative value is selected, and set to the facilitator sound buffer 40*a*. Herein, as the message 2, sound data of the message indicative of "600*a*, ADVANCE IN THE NORTHEAST DIRECTION" is selected from the parent device game data 30*b*. In a BGM changing process in step S3216, a BGM2 is set to the BGM buffer 40*a*. The BGM 2 is sound data for outputting a fanfare urging the player. In a facilitator operation processing in step S3218, a facilitator operation pattern 2 is set to the facilitator operation buffer 40a. The facilitator operation pattern 2 is an image in which the facilitator object 900 looks at the last player in the ranking 600a with a worried face. In another screen processing in step S3220, a frame of the common screen 300 is changed to the color red.

In a child device screen changing process in step S3222, the display level 6 shown in FIG. 38 (a) is set as the display information to be displayed on the individual screen 800 of the player 600a. That is, as information to be displayed on the individual screen 800 of the player 600a, all of the hint (support) information of the "standard display" and "display 1"-"display 6" are selected.

It is noted that a sound effect generating process is not performed in the event table 2 processing.

After completion of the event table 2 processing described above, it is determined whether or not the flag as an object is obtained in the following step S3230. When it is determined that the flag is not obtained, a correlative value between the last player object 702a (802a) in the ranking and the flag as the object is calculated once again in the following step 3232. In step S3234, it is determined whether or not the correlative value calculated once again changes. When it is determined the correlative value does not change, the process returns to step S3230 to repeat the process in steps S3230-S3234.

On the other hand, if it is determined that the correlative value changes, the process returns to step S3210 to repeat the process in steps S3210-S3234. For example, if the correlative value is changed from the "northwest" to the "north" in accordance with the movement of the last player object 702a (802a) in the ranking, by determining that the correlative value is changed to the "north" in step S3234, the "north" is set as the correlative value in step S3212. In addition, in step S3214, a message indicative of "600a, ADVANCE IN THE NORTH DIRECTION" is set as the message 2. Thus, the event table 2 processing is performed depending on the correlative value between the last player object 702a (802a) in the ranking and the flag, and whereby, it is possible to adequately give an advice to support the progress of the game of the player 600a by the image display and the sound output.

In above-described step S3230, if it is determined that the flag is obtained, the event 2 processing is completed. At this time, the information to be displayed on the individual screen of the last player 600a in the ranking is set to display level 1 as a default.

Figure 46:
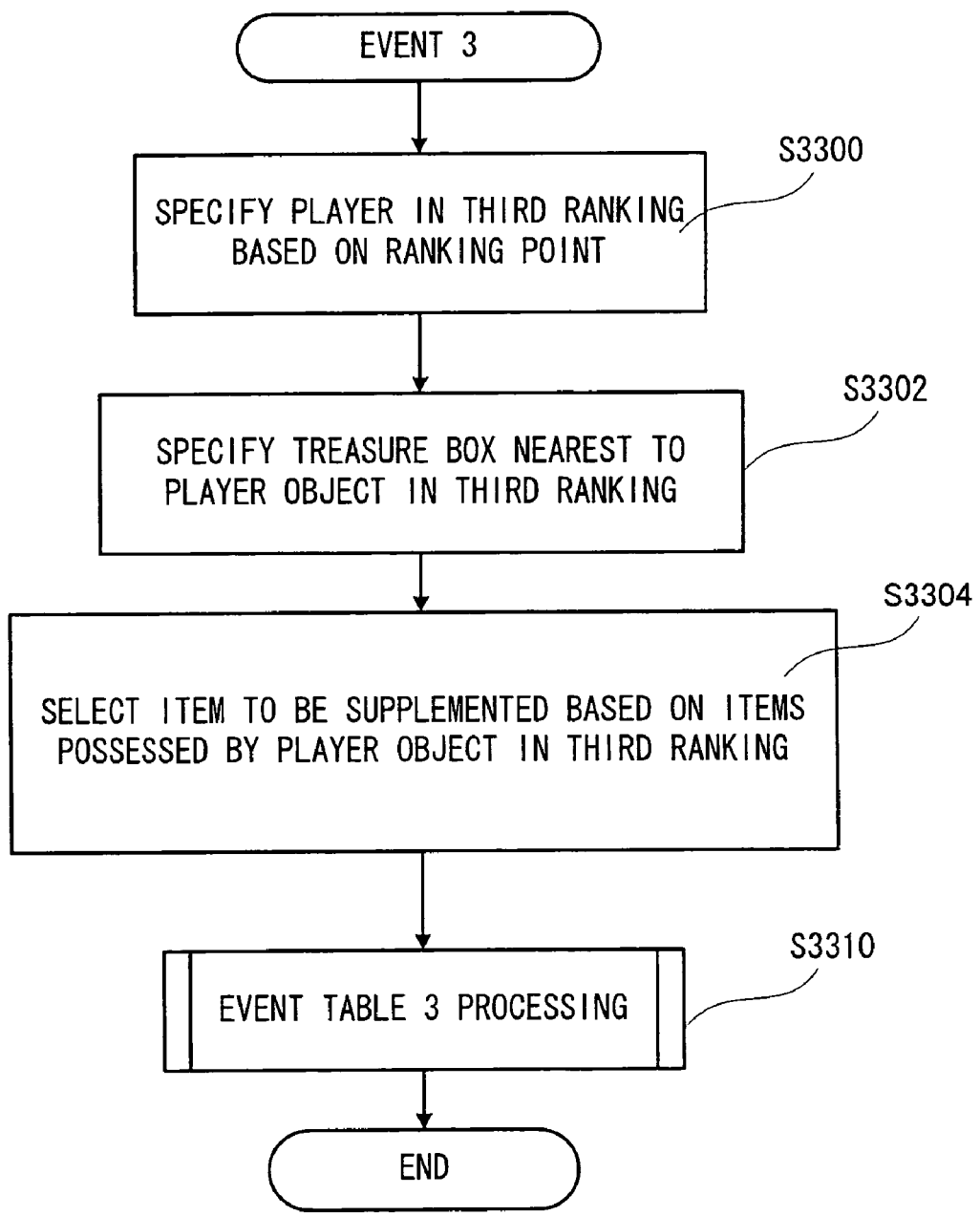
FIG. 46 is a flowchart showing the other example of an events processing subroutine in FIG. 30.
Figure 48:
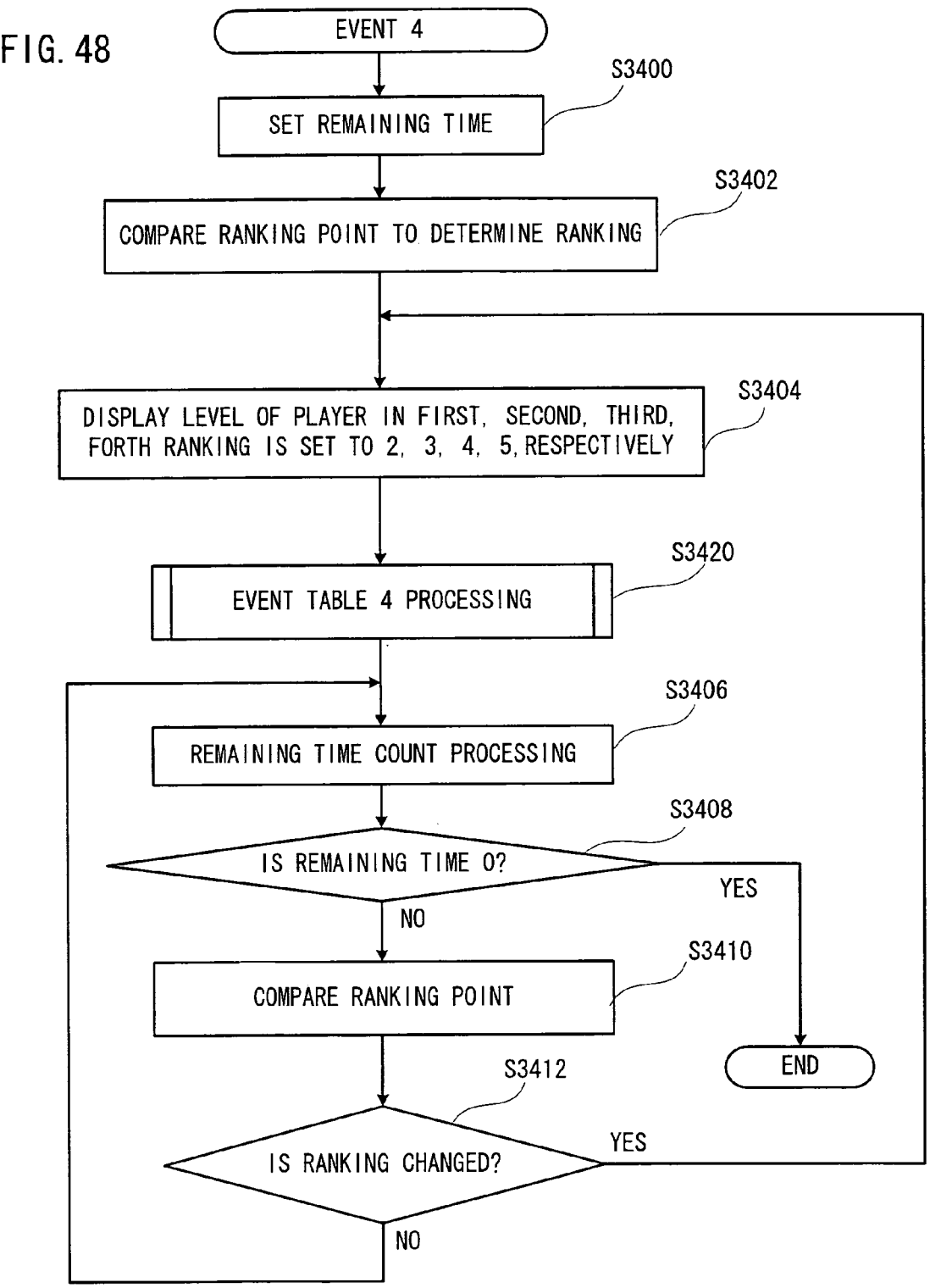
FIG. 48 is a flowchart showing a further example of an events processing subroutine in FIG. 30.

Next, with reference to FIG. 46 and FIG. 47, a description is made on an event 3 processing. When the bonus time comes during the game, by determining that the event 3 (208c) occurs in step S208, the event 3 processing is performed in step S300. The bonus time occurs every predetermined time period, and is for performing a process to arrange an item for helping the player in the lower ranking near the player in the lower ranking. As the player in the lower ranking, any one of the players ranked third and the player ranked fourth is selected at random in the four-player game, for example. A description is made in a case where the player ranked third is selected here.

The CPU 38 executes a following process on the basis of the game program for video game apparatus 30a. That is, in step S3300, the player ranked third is specified (designated) on the basis of the ranking points. By detecting the ranking points in the each player object status 40b, 18a and comparing them, a player having the second lowest ranking points is specified. In step S3302, a treasure box that locates the nearest to the player object ranked third is specified. More specifically, a distance is calculated on the basis of the coordinates position (40b, 18a) of the player object ranked third and the coordinates position (40e, 18d) of each treasure box to specify the nearest treasure box. In step S3304, an item to be supplemented is selected on the basis of the possessed or carried item of the player object ranked third. More specifically, on the basis of the possessed item shown in FIG. 39, items that the player ranked third does not have are listed to select one item at random from them. For example, in a case where the player ranked third is the player 600a, one item such as the "skate shoes", for example, is selected at random from among all of items except the four items of "transceiver", "bingo card", "camera", and "medal" that are possessed by the player 600a with reference to FIG. 39. In succeeding step S3310, an event table 3 processing is performed.

With reference to FIG. 47, a description is made on the event table 3 processing in detail. The CPU 38 performs a following processing. That is, in a status changing process in step S3312, the item selected in step S3304 is set to the treasure box specified in preceding step S3302.

In a facilitator sound changing process in step S3314, sound data of a message 3 indicative of "ITEM IS ADDED TO TREASURE BOX" is selected from the parent device game data 30b so as to be set to the facilitator sound buffer 40a. In a sound effect generating process in step S3316, sound data of a sound effect 3 sounding an alarm indicative of addition of an item is selected from the parent device game data 30b so as to be set to the sound effect buffer 40a. In a facilitator operation processing in step S3318, a facilitator operation pattern 3 is set to the facilitator operation buffer 40a. The facilitator operation pattern 3 is an image in which the facilitator takes a brief look at the player ranked third.

In a child device screen changing process in step S3320, the treasure box in which the item is put with a lid covering it is set.

It is noted that in the event table 3 processing, the BGM changing process and another screen processing are not performed.

Thus, since by executing the event 3, the item that the player object ranked the lowest has not processed yet is added to the treasure box the nearest to the player object, it is possible to make a situation where the player object ranked the lowest can easily obtain the item for advantageously advancing the game, capable of increasing interest as a game. Although the player object ranked the lowest is designated, and an item for advantageously advancing the game is selected to be added to the treasure box the nearest to the player object ranked the lowest in this exemplary illustrative embodiment, the method is not limited thereto. For example, it is appropriate that the player object in the upper ranking is designated, and an item for preventing the progress of the game is selected so as to be added to the treasure box the nearest to the player object in the upper ranking. Furthermore, the item may be directly arranged or may be falling from above rather than be added to the treasure box.

The special event time comes during the progress of the game, by determining that the event 4 (208d) occurs in step S208, a process of the event 4 is performed in step S300. The special event time occurs at an arbitrarily set time, and a processing for displaying various support information depending on the ranking of each player is performed on the individual screen of each child device 100.

The CPU 38 executes a following process on the basis of the game program for video game apparatus 30a. That is, in step S3400, a setting is made such that a remaining time of the special event time is one minute, for example. In step S3402, the ranking points of the respective player objects are detected and compared with each other to determine the ranking of the respective players. In step S3404, the display level of the individual screen of the player in the first ranking is set to 2, the display level of the individual screen of the player ranked second is set to 3, the display level of the individual screen of the player ranked third is set to 4, and the display level of the individual screen of the last player in the ranking is set to 5. In the succeeding step S3420, an event table 4 processing is performed.

With reference to FIG. 49, a description is made on the event table 4 processing in detail. The CPU 38 executes a following processing. That is, in a facilitator sound changing processing in step S3422, a message 4 is set to the facilitator sound buffer 40a. The message 4 is output of the sound of "LUCKY TIME FOR GIVING SERVICE INFORMATION TO PERSON IN LOWER RANKING!". In a facilitator operation processing in step S3424, a facilitator operation pattern 4 is set to the facilitator operation buffer 40a. The facilitator operation pattern 4 is an image in which the facilitator performs a movement of looking over all the players and then looking a fixed point again.

In a child device screen changing process in step S3426, the displaying information to be displayed on the individual screen 800 of each player is set on the basis of the display level set to each player. As can be understood from FIG. 38 (a), with respect to the player ranked first to whom the display level 2 is set, the support information of "standard display" and "display 1" is set so as to be selected and displayed on the individual screen 800. Similarly, with respect to the player ranked second to whom the display level 3 is set, the support information of "standard display", "display 1", "display 2", and "display 3" is set so as to be selected and displayed on the individual screen 800. With respect to the last player in the ranking to whom the display level 4 is set, the support information of "standard display", "display 1", "display 2", "display 3", "display 4", and "display 5" is set so as to be selected and displayed on the individual screen 800. Thus, the number of support information to be displayed on each individual screen is different depending on the ranking of each player.

It is noted that in the event table 4 processing, a status changing processing, a sound effect generating process, a BGM changing processing, and another screen processing are not performed.

After completion of the process in the above-described event table 4 processing, in the succeeding step S3406, a remaining time period counting process is performed. Next, in step S3408, it is determined whether or not the remaining time period is 0. If it is determined that the remaining time period is not 0, the ranking points of the respective player objects are compared in the following step S3410. In the next step S3412, as a result of the comparison, it is determined whether or not the rankings of the respective players are changed. When it is determined that the rankings of the respective players are not changed, the process returns to step S3406 so as to repeat the process in steps S3406-S3412.

On the other hand, when it is determined that the rankings are changed in step S3412, the process returns to step S3404 so as to repeat the process in steps S3404-S3412.

When it is determined that the remaining time period becomes 0 in step S3408 described above, the event 4 processing is ended. At this time, the information to be displayed on the individual screen of each player is set such that the display level 1 as a default, i.e., only the "standard display" is displayed.

Thus, by processing event 4, it is possible to change the number of support information to be displayed on each individual screen depending on the ranking of each player. More specifically, the higher the player is ranked, the smaller the number of support information to be displayed, while the lower the player is ranked, the greater the number of support information to be displayed. That is, more support information being advantageous for the player ranked the lowest is presented, and whereby, it is possible to create a competitive game state where the respective players are closer to one another in the progress of the game, capable of increasing the interest of the game.

Figure 50:
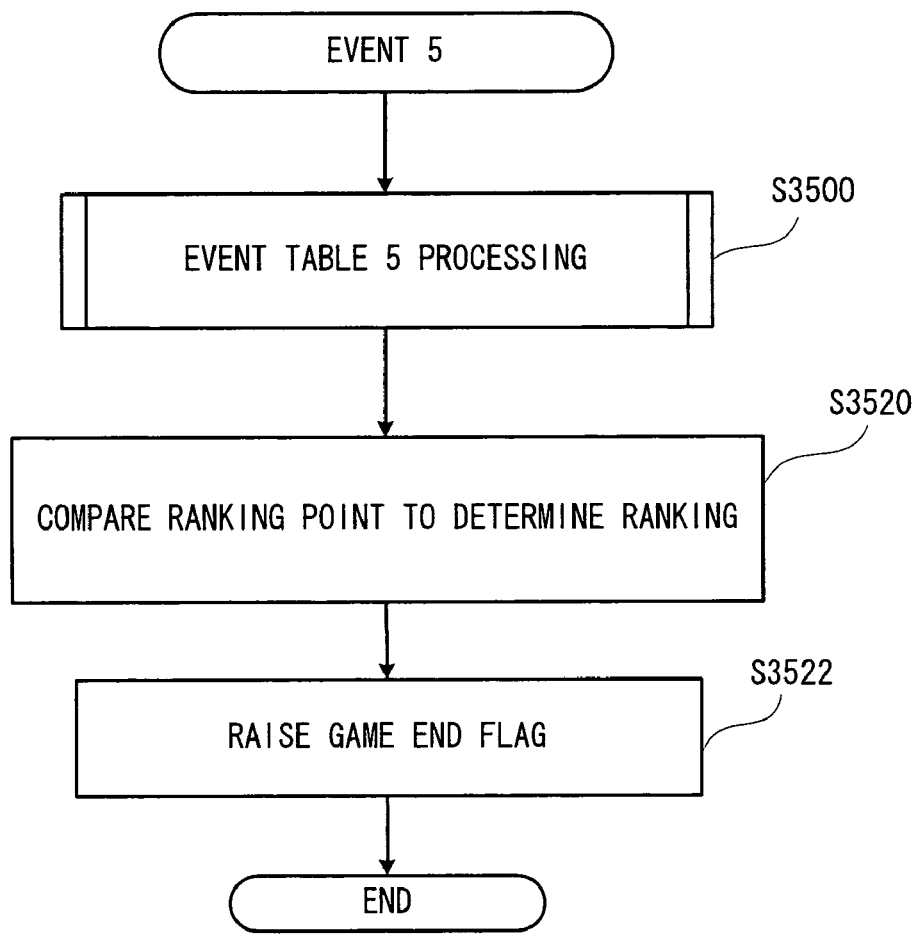
FIG. 50 is a flowchart showing another example of an events processing subroutine in FIG. 30.

Next, with reference to FIG. 50 and FIG. 51, a description is made on an event 5 processing. When the last flag (ninth flag herein) is obtained during the progress of the game by any player object, by determining that the event 5 (208e) is generated in step S208, the event 5 processing is performed in step S300.

The CPU 38 executes a following process on the basis of the game program for video game apparatus 30a. That is, in step S3500, the event table 5 processing is performed.

With reference to FIG. 51, a description is made on the event table 5 processing in detail. The CPU 38 executes a following process. That is, in step S3502, a status changing process is performed. Herein, the possessor of the ninth flag in the flag status 40d and 18c is changed to the player who obtains the flag, and the ranking point in the player object status 40b and 18a of the player who obtains the flag is given with 90 points.

In the facilitator sound changing process in step S3504, a message 5 is set to the facilitator sound buffer 40a. For example, as the message 5, "THANK YOU FOR YOUR WORK. GAME OVER" is selected. In a sound effect generating process in step S3506, a sound effect 5 (ending fanfare) is set to the sound effect buffer 40a. In a BGM changing process in step S3508, a BGM 5 (ending theme) is set to the BGM buffer 40a. In a facilitator operation processing in step S3510, a facilitator operation pattern 5 is set to the facilitator operation buffer 40a. The facilitator operation pattern 5 is an image in which the facilitator faces the front and takes a bow. In another screen processing in step S3512, the entire map 700 is subjected to a blackout.

In a child device screen changing process in step S3514, an ending image is set to be displayed on the individual screens 800 of all the players.

After completion of the above-described event table 5 processing, in succeeding step S3520, the ranking points of the respective player objects are detected and compared to determine a final ranking of the respective players. In step S3522, a game over flag is set to complete the event 5 processing.

Figure 52:
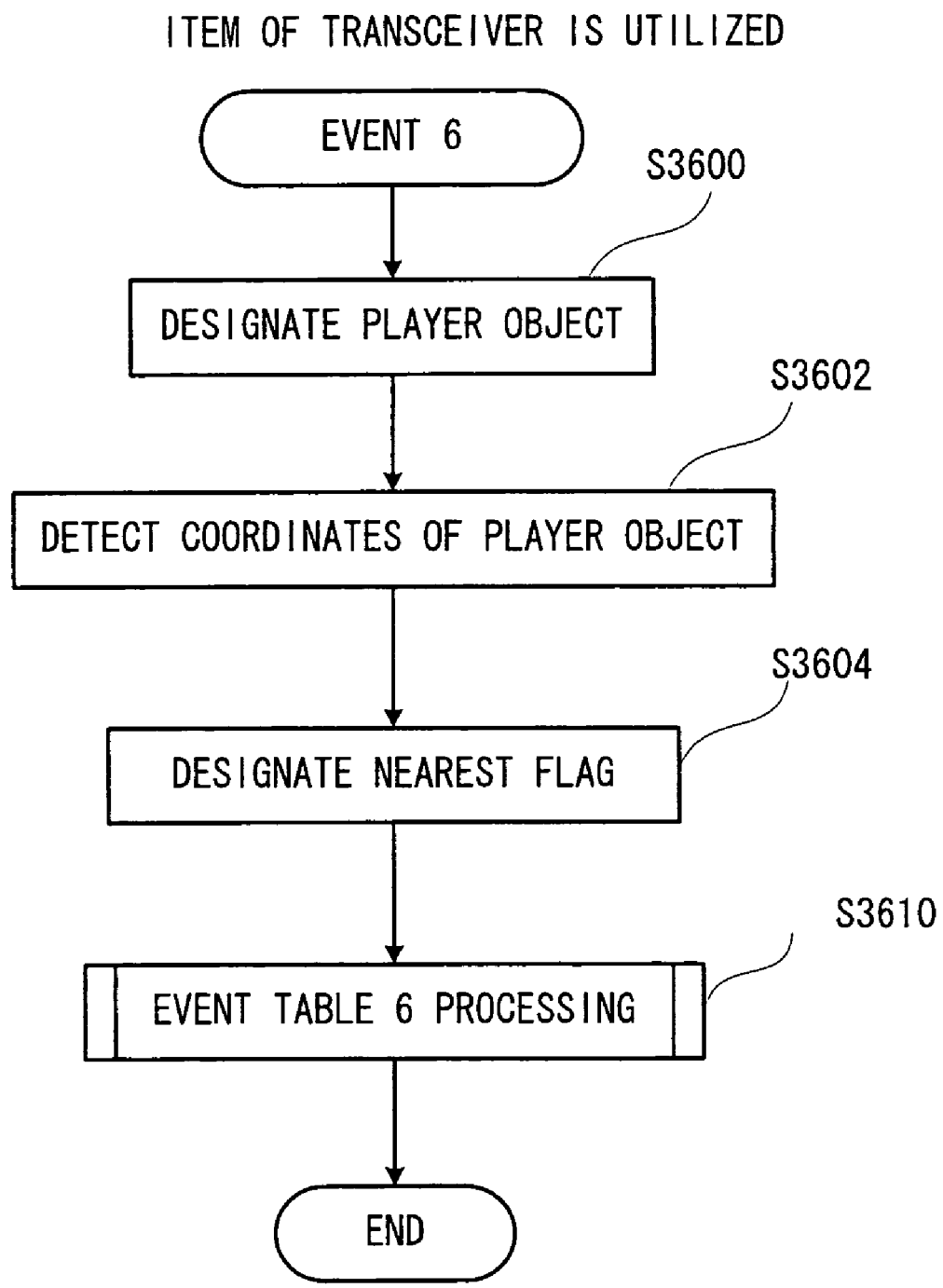
FIG. 52 is a flowchart showing the other example of an events processing subroutine in FIG. 30.

Next, with reference to FIGS. 52 and 53, a description is made of an event 6 processing. When any player uses an item of "transceiver", by determining that the event 6 (208f) occurs in step S208, the event 6 processing is performed in steps S300 to S3610.

The CPU 38 executes a following process on the basis of the game program for video game apparatus 30a. That is, in step S3600, a player object specifying process is performed. More specifically, it is determined which player uses the transceiver item. This is realized by detecting from which child device 100 operated by any player the controller data (controller additional data D128) including the data indicative of utilizing the transceiver is sent.

Next, in step S3602, a coordinates position of the player object utilizing the transceiver is specified.

Then, in step S3604, a flag the nearest to the player object coordinates position is detected.

According to the data detected in steps S3600-S3604, an event table 6 processing is performed in step S3610.

With reference to FIG. 53, a description is made on the event table 6 processing in detail. The CPU 38 executes a following processing. That is, in a facilitator sound changing processing in step S3612, a message 6 is set to the facilitator sound buffer 40a. The message is for instructing advantageous hint information comprehensible only to the player utilizing the "transceiver". For example, in a case of informing the player of a position of the flag to be obtained next, which direction the flag is located by rendering the player object the base point on the basis of the coordinates positions of the player object and the flag, and a message of "FLAG TO BE OBTAINED NEXT IS ON YOUR RIGHT" is selected. In a sound effect generating process in step S3614, a sound effect 6 (mysterious fanfare) is set to the sound effect buffer 40a. In a facilitator operation processing in step S3616, a facilitator operation pattern 6 is set to the facilitator operation buffer 40a. The facilitator operation pattern 6 is an image in which the facilitator object 900 performs a movement to turn to the player utilizing the transceiver. Furthermore, it is appropriate that the facilitator object 900 is not turned to the player utilizing the transceiver so as not to inform other players of the position of the flag. In this case, the facilitator object 900 is displayed so as to look around, and so forth.

In the child screen changing process in step S3618, a setting is made such that a message of "LISTEN TO HINT" is displayed on only the individual screen 800 of the player utilizing the "transceiver".

It is noted that in the event table 6 processing, a status changing processing, a BGM changing processing, and another screen processing are not performed.

Thus, by processing the event 6, the hint information comprehensible only to the player utilizing the "transceiver" is output by sound, and therefore, it is possible to perform a sound output only to a specific player.

In this manner, when the hint is outputted by sound by use of the "transceiver", in a case where the respective players use the "transceiver" a lot, it is possible that sound data (message) is stacked over a permissible amount in the facilitator sound buffer 40a. Here, it is appropriate that for solving such the disadvantage, in a case where the sound data of a predetermined amount or more is stacked in the facilitator sound buffer 40a, or in a case where an event of stacking the sound data in the facilitator sound buffer 40a is generated at one time or a predetermined times or more, in order to prohibit the use of the "transceiver", a message indicative of "IMPOSSIBLE TO USE TRANSCEIVER", etc., is displayed on the CRT 300 and/or the LCD 20" so as not to execute the event 6 even if the player uses the "transceiver". Or, as a method of prohibiting the use of the "transceiver", it is appropriate that the "transceiver" among the items is not selected. Thus, by prohibiting the use of the "transceiver", it is possible to prevent the facilitator sound processing from being overflowed. In addition, although the amount of the sound data is increased more or less, the sound data for outputting the sound indicative of "IMPOSSIBLE TO USE TRANSCEIVER" may be stacked in the facilitator sound buffer 40a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-player game apparatus that is connectable with a plurality of operating devices outputting operating information as operation data, each of said plurality of operating devices being operable by a different player, said game apparatus executing a game by displaying an image on a common display viewable by all players operating said operating devices, said game apparatus comprising:

a connected state detector for detecting which of the plurality of operating devices are connected to said game apparatus;
an object data output mechanism for outputting object data to display an object on said common display;
a direction determining mechanism for assigning a different direction for each player corresponding to a connected state of each player's respective operating device detected by said connected state detector;
an object data changing mechanism for changing, when an event to be executed for each player occurs, object data output by said object data output mechanism depending on which direction a player relating to said event is assigned to by said direction determining mechanism; and
an image data output mechanism for outputting image data to display an image on said display on the basis of the object data to be changed by said object data changing mechanism, wherein
a direction of said object is set, and said object data determining mechanism determines the object data such that the direction of said object is changed in accordance with the assigned direction of the player corresponding to said event.

2. A game apparatus according to claim 1, wherein
said game apparatus further includes a plurality of connectors aligned in an array, and
said direction determining mechanism determines a direction to be assigned for each player operating said connected operating devices in an order of alignment of said operating devices.

3. A game apparatus according to claim 2, wherein said direction determining mechanism changes said direction depending upon the number of operating devices connected.

4. A game apparatus according to claim 1, wherein said object is an object representative of a person including eyes, and said object data determining mechanism determines the object data such that the eyes of said object are turned to a direction of the player corresponding to the event.

5. A game apparatus according to claim 1, wherein said object is an object representative of a weapon, and said object data determining mechanism determines the object data such that a firing position of said weapon is determined depending on a direction of the player corresponding to the event.

6. A multi-player game apparatus according to claim 1 further including a plurality of connectors for respective connection to said plurality of operating devices, said plurality of connectors having a predetermined physical arrangement so that in use, operating devices connected with said plurality of connectors are generally disposed at locations corresponding to the predetermined physical arrangement of said plurality of connectors.

7. A control method of a game apparatus that is operated by at least one player, connects to a plurality of operating devices, and executes a game by displaying an image on a display, comprising:

(a) detecting which of said operating devices is connected;
(b) outputting object data to display an object on said display;
(c) assigning a direction for the at least one player in response to which operating device(s) are connected, wherein each player is assigned a direction which corresponds with a connected state of the player's operating device;

(d) determining, when an event to be executed for the player occurs, object data to be output depending on which direction the player relating to said event is assigned to; and (e) outputting image data to display an image on said display on the basis of the object data to be output, wherein a direction of said object is set, and the object data is determined such that a direction of said object is changed in accordance with the assigned direction of the player corresponding to said event.

8. A control method according to claim 7, further including a plurality of aligned connectors for connection to said plurality of operating devices, and the method includes determining a direction to be assigned for each player operating said operating device connected to said connectors in an order of alignment of said connectors.

9. A control method according to claim 8, wherein in said direction of each player is changed depending upon the number of operating devices connected to said connectors.

10. A control method according to claim 7, wherein said object is an object representative of a person including eyes, and the object data is determined such that the eyes of said object are turned to a direction of the player corresponding to the event.

11. A control method according to claim 7, wherein said object is an object representative of a weapon, and the object data is determined such that a firing position of said weapon is determined depending on a direction of the player corresponding to the event.

12. A non-transitory computer-readable storage medium storing an information processing program to be executed by a processor of a game apparatus that is operated by at least one player, connects to a plurality of operating devices, and executes a game by displaying an image on a display, the program causing the processor to perform:

(a) detecting which of said operating devices is connected;

(b) outputting object data to display an object on said display;

(c) assigning a direction for the at least one player in response to which operating device(s) are detected as connected, wherein each player is assigned a direction which corresponds with a connected state of the player's operating device;

(d) determining, when an event to be executed for the player occurs, object data to be output depending on which direction the player relating to said event is assigned to; and (e) outputting image data to display an image on said display on the basis of the object data to be output wherein a direction of said object is set, and the object data is determined such that a direction of said object is changed in accordance with the assigned direction of the player corresponding to said event.

13. A multi-player game system that is connectable with a plurality of operating devices outputting operating information as operation data, each of said plurality of operating devices being operable by a different player, said game system executing a game by displaying an image on a common display viewable by all players operating said operating devices, said game system comprising:

a connected state detector for detecting which of the plurality of operating devices are connected to said game system;

an object data output mechanism for outputting object data to display an object on said common display;

a direction determining mechanism for assigning a different direction for each player corresponding to a connected state of each player's respective operating device detected by said connected state detector;

an object data changing mechanism for changing, when an event to be executed for each player occurs, object data output by said object data output mechanism depending on which direction a player relating to said event is assigned to by said direction determining mechanism; and an image data output mechanism for outputting image data to display an image on said display on the basis of the object data to be changed by said object data changing mechanism, wherein a direction of said object is set, and said object data determining mechanism determines the object data such that a direction of said object is changed in accordance with the assigned direction of the player corresponding to said event.

* * * * *